(12) United States Patent
Ichishi et al.

(10) Patent No.: US 6,220,517 B1
(45) Date of Patent: Apr. 24, 2001

(54) AIR-CONDITIONING DEVICE

(75) Inventors: Yoshinori Ichishi, Kariya; Takayoshi Kawai, Hoi-gun; Yuji Ito, Okazaki; Katsuhiko Samukawa, Obu; Yuichi Kajino, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/295,997

(22) Filed: Apr. 21, 1999

(30) Foreign Application Priority Data

| Apr. 22, 1998 | (JP) | 10-112435 |
| Apr. 24, 1998 | (JP) | 10-115419 |
| Apr. 24, 1998 | (JP) | 10-115420 |
| Apr. 27, 1998 | (JP) | 10-117416 |

(51) Int. Cl.$^7$ .................................................. F24F 7/00
(52) U.S. Cl. .................. 236/49.3; 236/91 C; 165/42; 165/203; 165/204; 62/186; 62/244; 62/408; 454/75
(58) Field of Search ................. 236/49.3, 91 C, 236/91 E, 91 R; 165/203, 204, 42; 62/186, 408, 144; 454/75

(56) References Cited

U.S. PATENT DOCUMENTS

| 4,408,712 | * | 10/1983 | Naganoma et al. | 236/13 |
| 4,930,698 | * | 6/1990 | Takegawa et al. | 236/49.3 |
| 4,978,061 | * | 12/1990 | Ogihara et al. | 236/49.3 |
| 5,291,748 | * | 3/1994 | Ueda | 62/179 |
| 5,372,015 | * | 12/1994 | Suzuki et al. | 62/228.4 |
| 5,452,587 |   | 9/1995 | Honda et al. . | |
| 5,860,593 | * | 1/1999 | Heinle et al. | 236/91 C |
| 5,937,941 | * | 8/1999 | Gach | 165/204 |

FOREIGN PATENT DOCUMENTS

| 56-86815 | 7/1981 | (JP) . |
| 3-8003 | 1/1991 | (JP) . |
| 4-163223 | 6/1992 | (JP) . |
| 6-195323 | 7/1994 | (JP) . |

OTHER PUBLICATIONS

Toyota Progres—Advanced Model Operation Manual (published on May 14, 1998), pp. 5–60–5–61.

* cited by examiner

*Primary Examiner*—Corrine McDermott
*Assistant Examiner*—Marc Norman
(74) *Attorney, Agent, or Firm*—Harness, Dickey & Pierce, PLC

(57) ABSTRACT

Temperatures in a Dr side air-conditioning zone and a Pa side air-conditioning zone are controlled highly independently of each other without temperature interference between each zone. A room internal air temperature sensor and a room external air temperature sensor are provided. Dr side and Pa side temperature setters separately set room setpoint temperatures (Tset(Dr), Tset(Pa)) in each zone. First and second target blow-out temperature calculating portions, which include neural network, input the room setpoint temperatures and the temperature data. Then it calculates Dr side and Pa side target blow-out temperatures (TAO(Dr), TAO(Pa)) relative to each air-conditioning zones by using a neural network. Air-mixing doors separately adjusts the temperatures of conditioned air blown out from Dr side air passage and Pa side air passage to be the first and second target blow-out temperatures. Here, the neural network has the learning function, which adjusts its output to be desired data (teacher signal). Therefore, the output at a specific input condition can be adjusted without temperature interference between each zone.

15 Claims, 57 Drawing Sheets

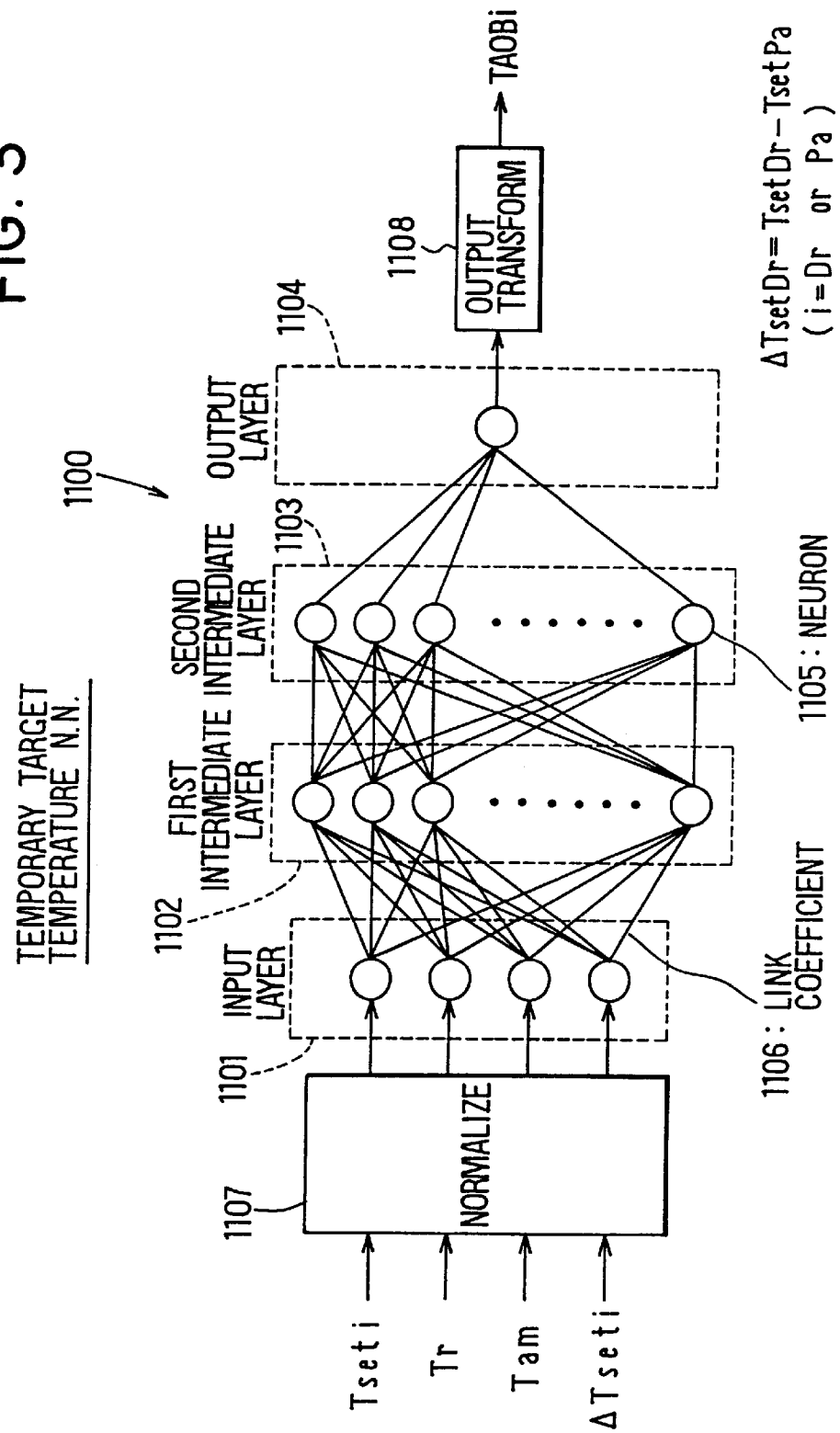

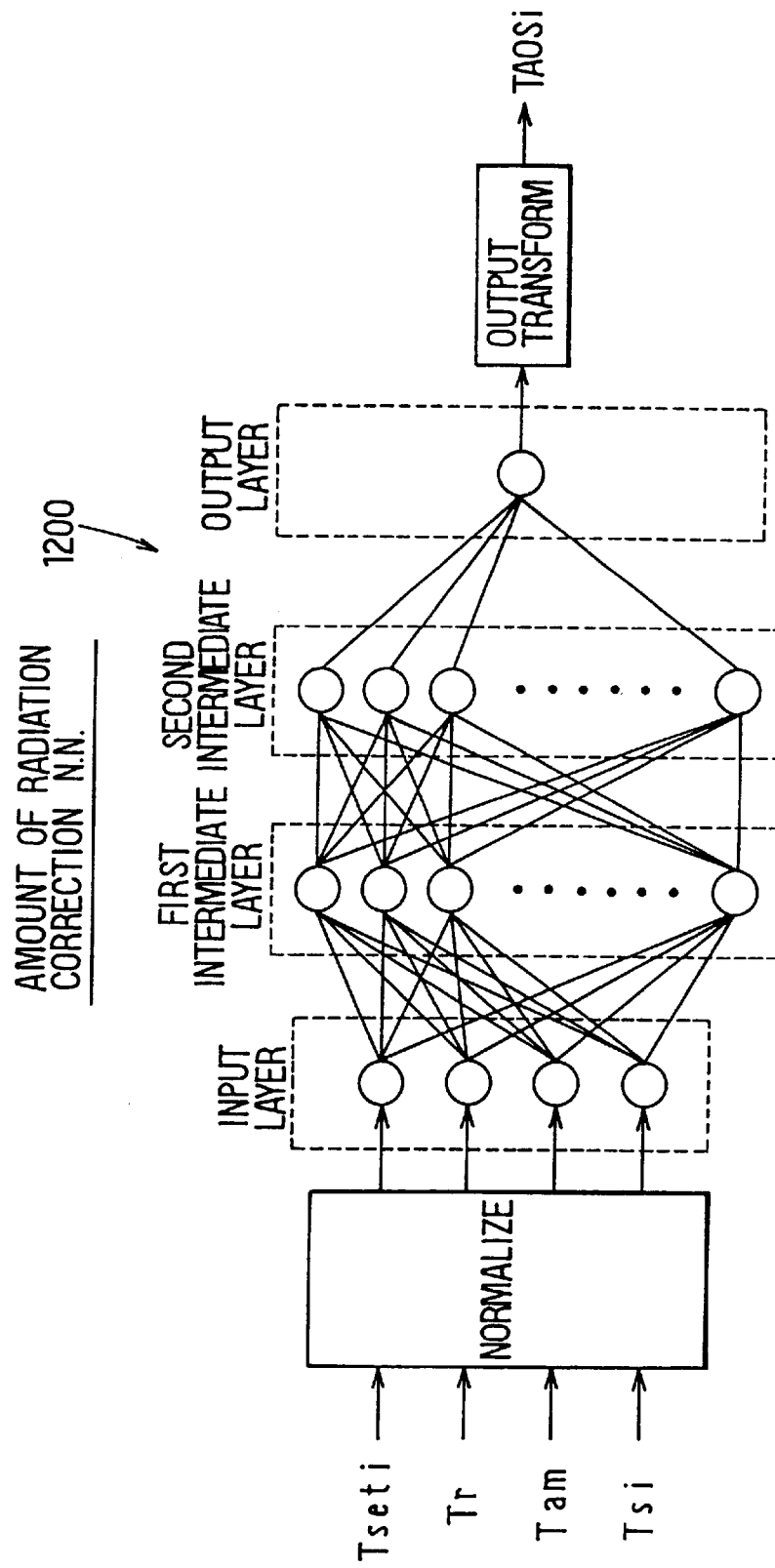

FIG. 10
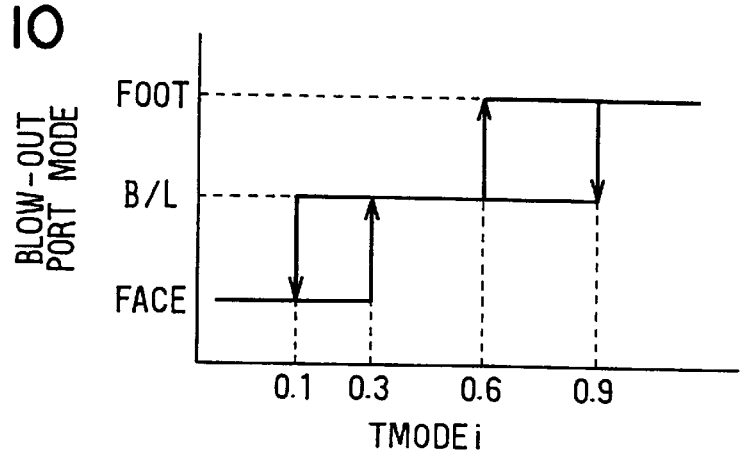
FIG. 11A
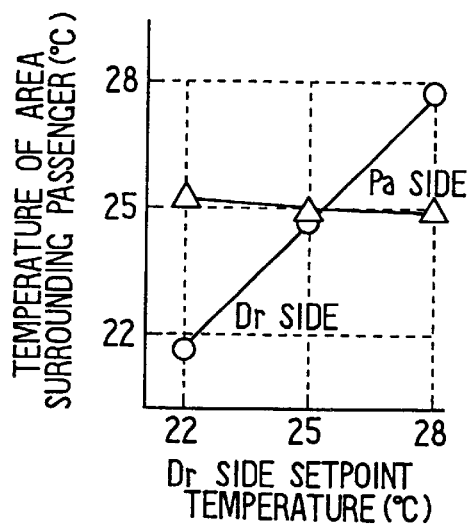
FIG. 11B
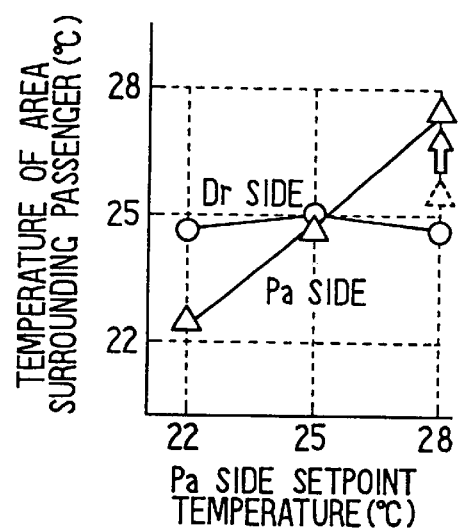
FIG. 11C
| INPUT 1 | INPUT 2 | INPUT 3 | INPUT 4 | OUTPUT |
|---------|---------|---------|---------|--------|
| TsetPa  | Tr      | Tam     | ΔTsetPa | TAOBPa |
| ⋮       | ⋮       | ⋮       | ⋮       | ⋮      |
| 28      | 25      | 10      | 3       | 35 ←50 |
| ⋮       | ⋮       | ⋮       | ⋮       | ⋮      |

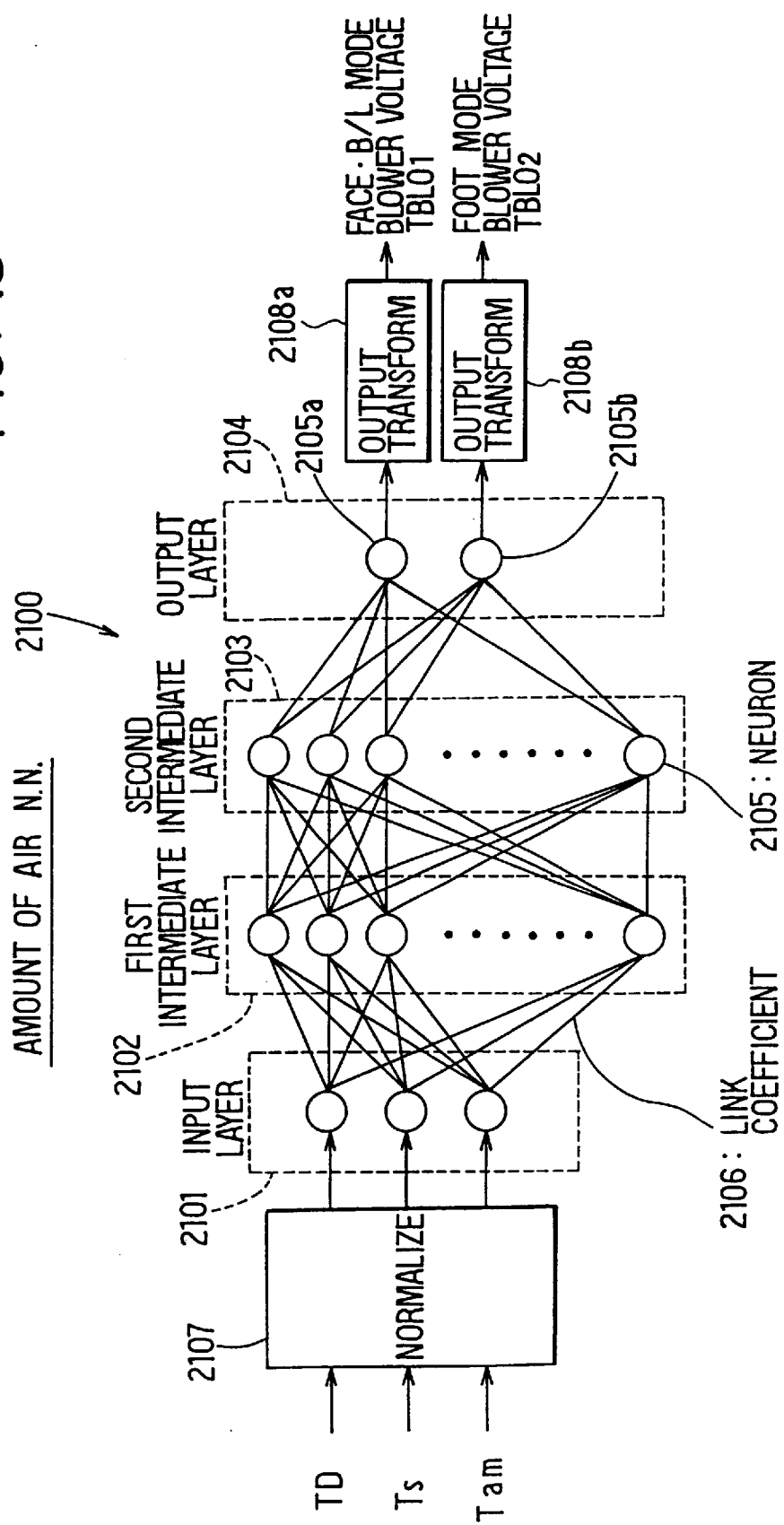

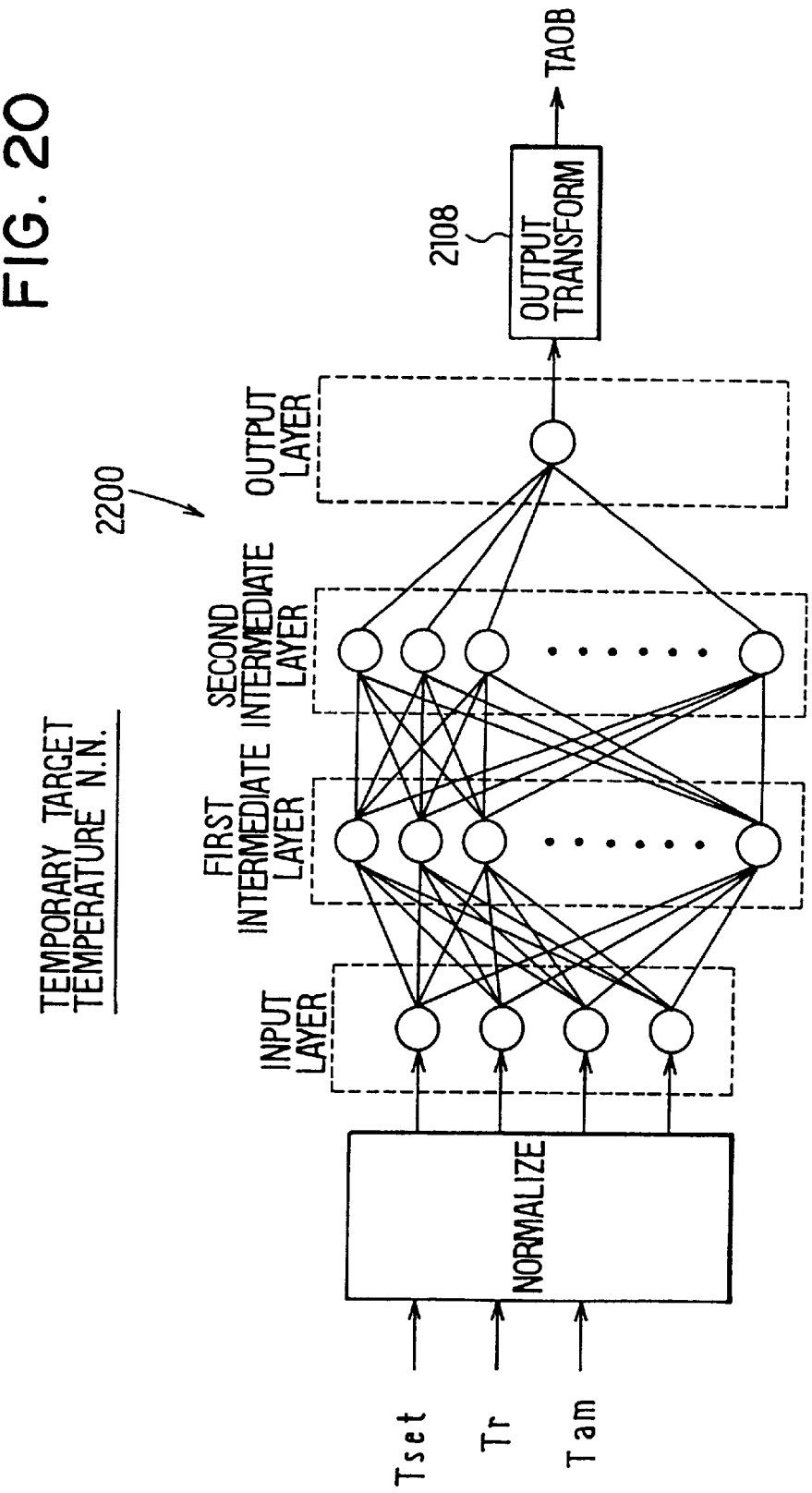

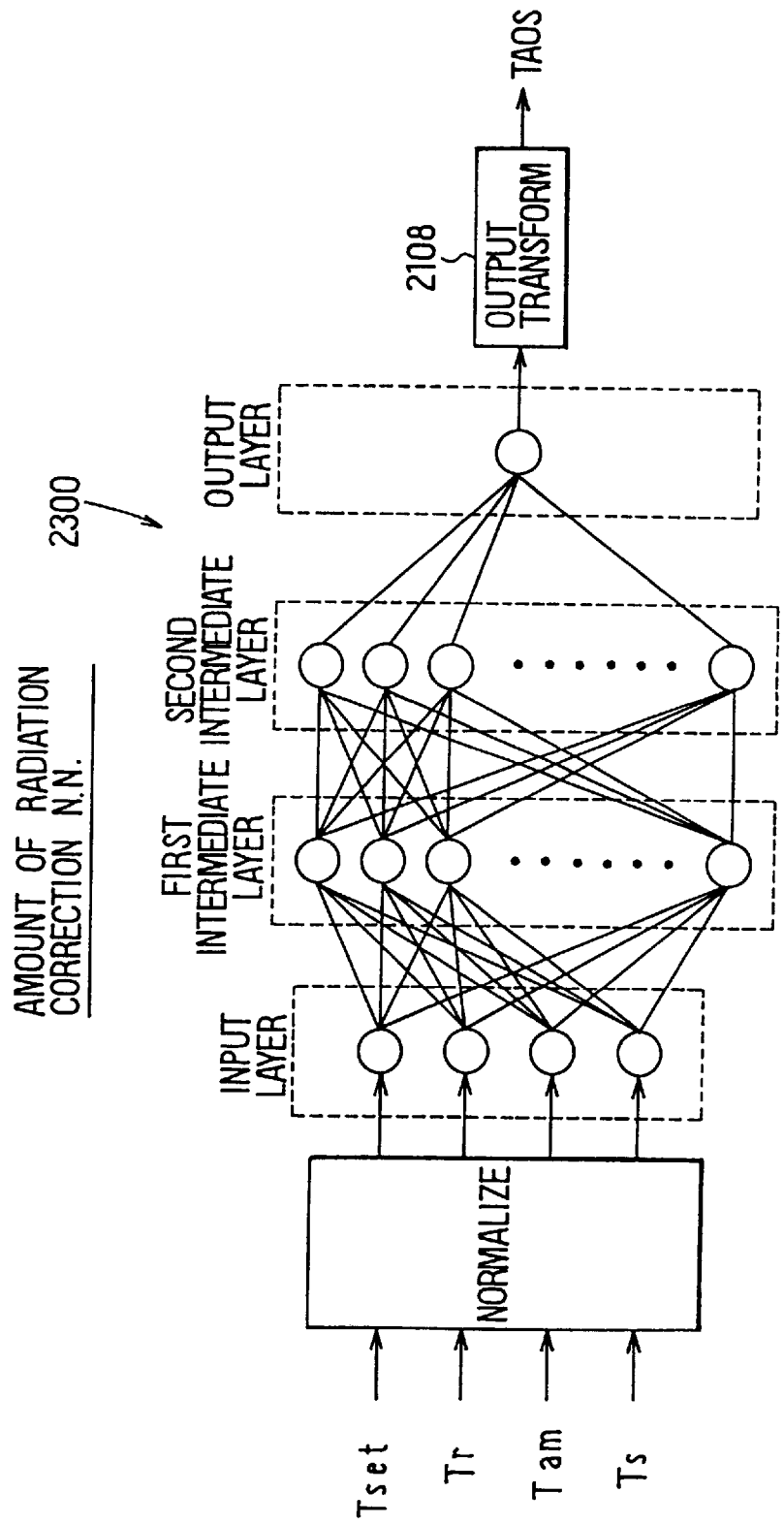

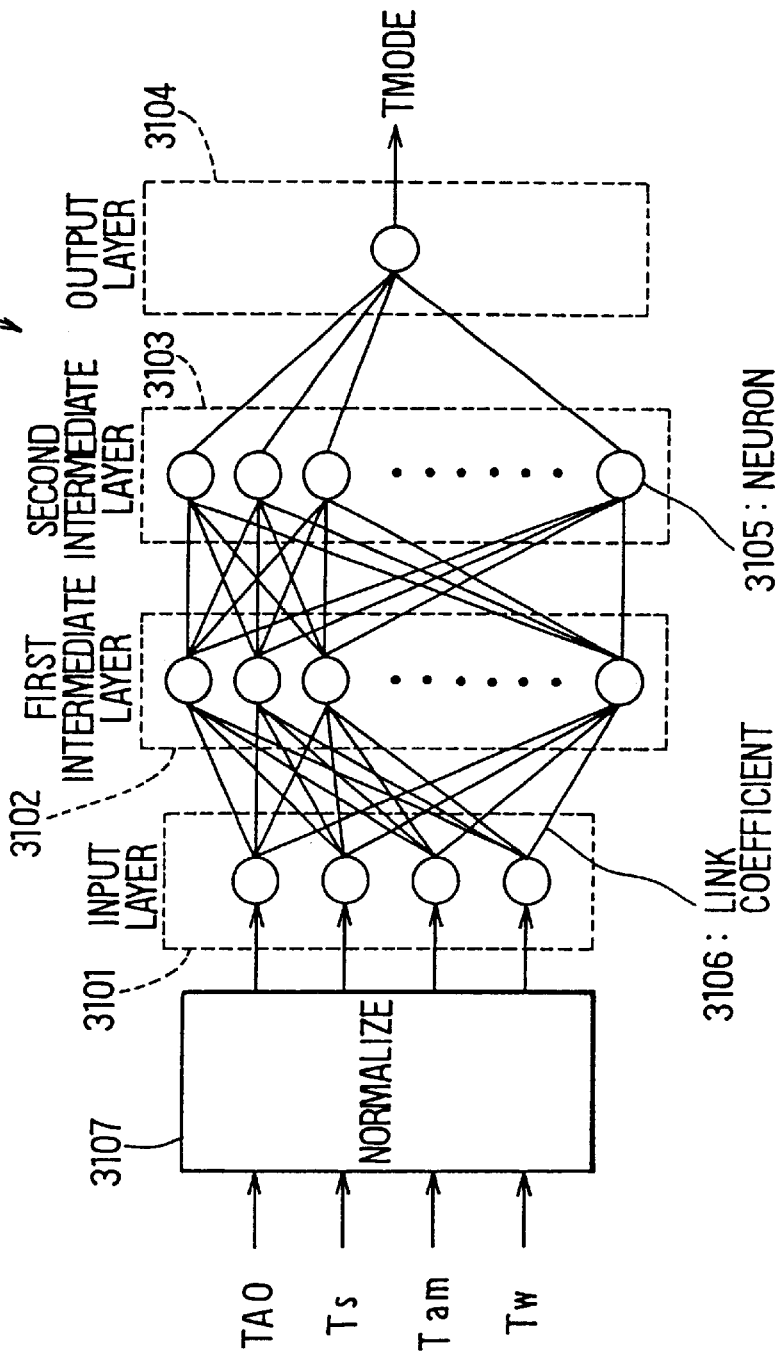

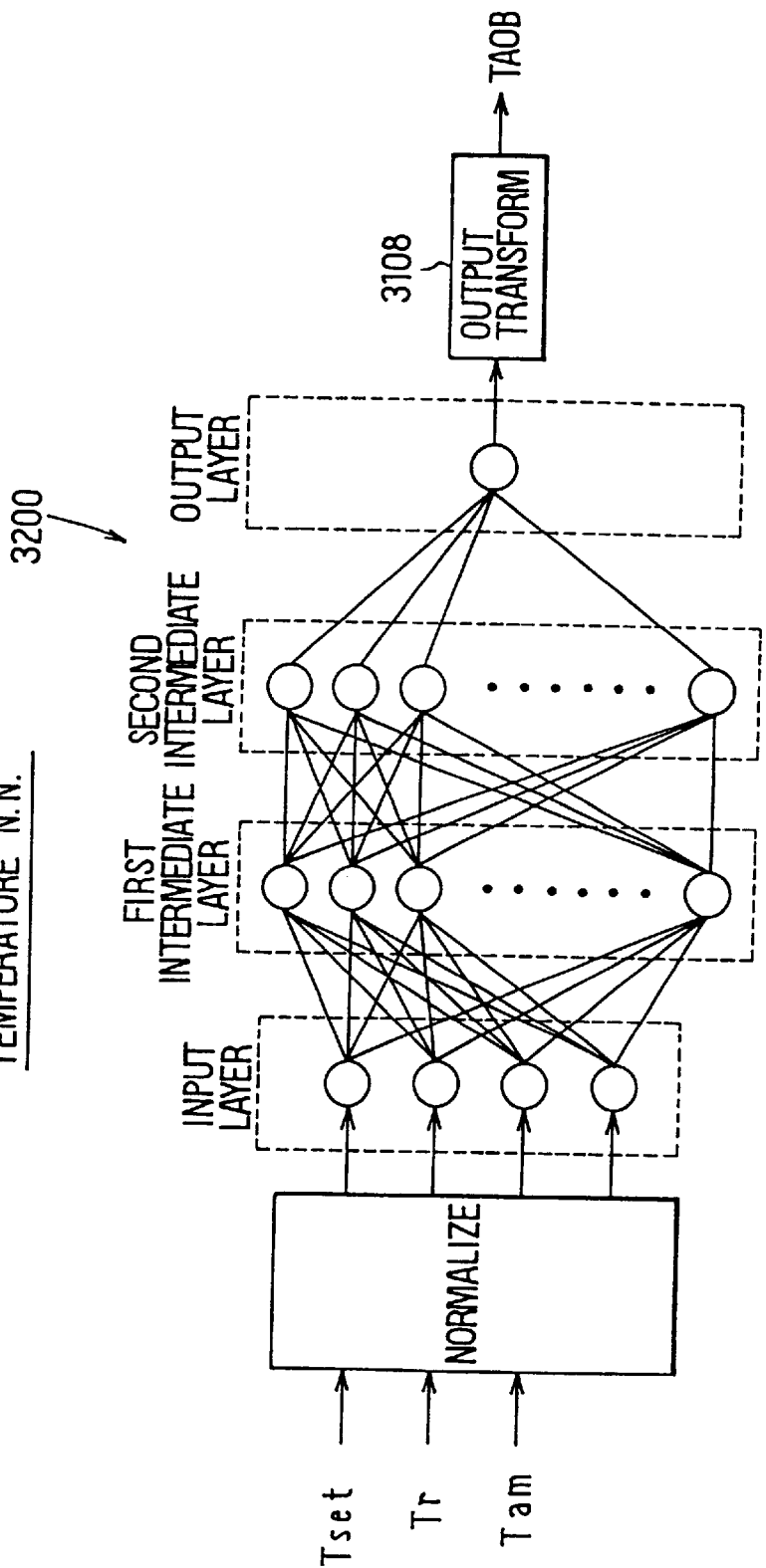

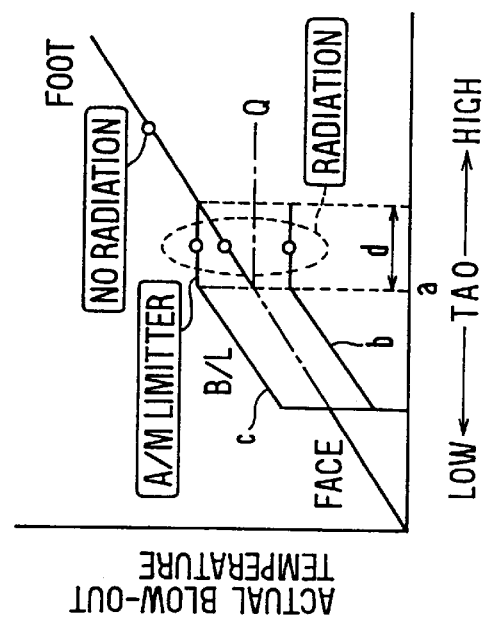
FIG. 47C
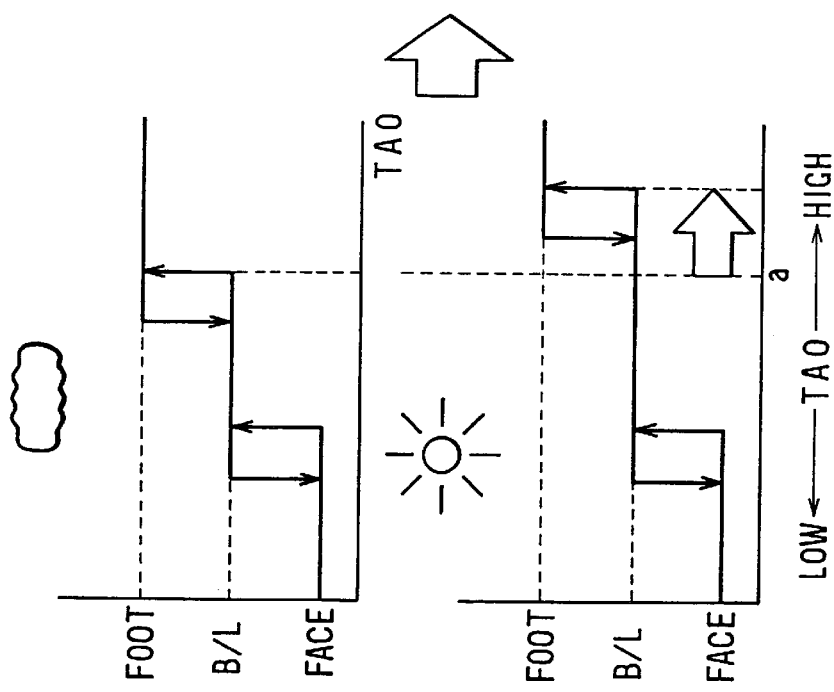
FIG. 47A
FIG. 47B

| INPUT 1 | INPUT 2 | INPUT 3 | INPUT 4 | OUTPUT |
|---------|---------|---------|---------|--------|
| TAOX | TsX | Tam | Tw | TMODE |
| ⋮ | ⋮ | ⋮ | ⋮ | ⋮ |
| 80 | 0 | −10 | 52 | 0.95 |
| 80 | 0 | −10 | 53 | 0.5 |
| 80 | 0 | −10 | 62 | 0.5 |
| 80 | 0 | −10 | 63 | 0.95 |
| ⋮ | ⋮ | ⋮ | ⋮ | ⋮ |

0.95 (FOOT MODE)
0.5 (B/L MODE)

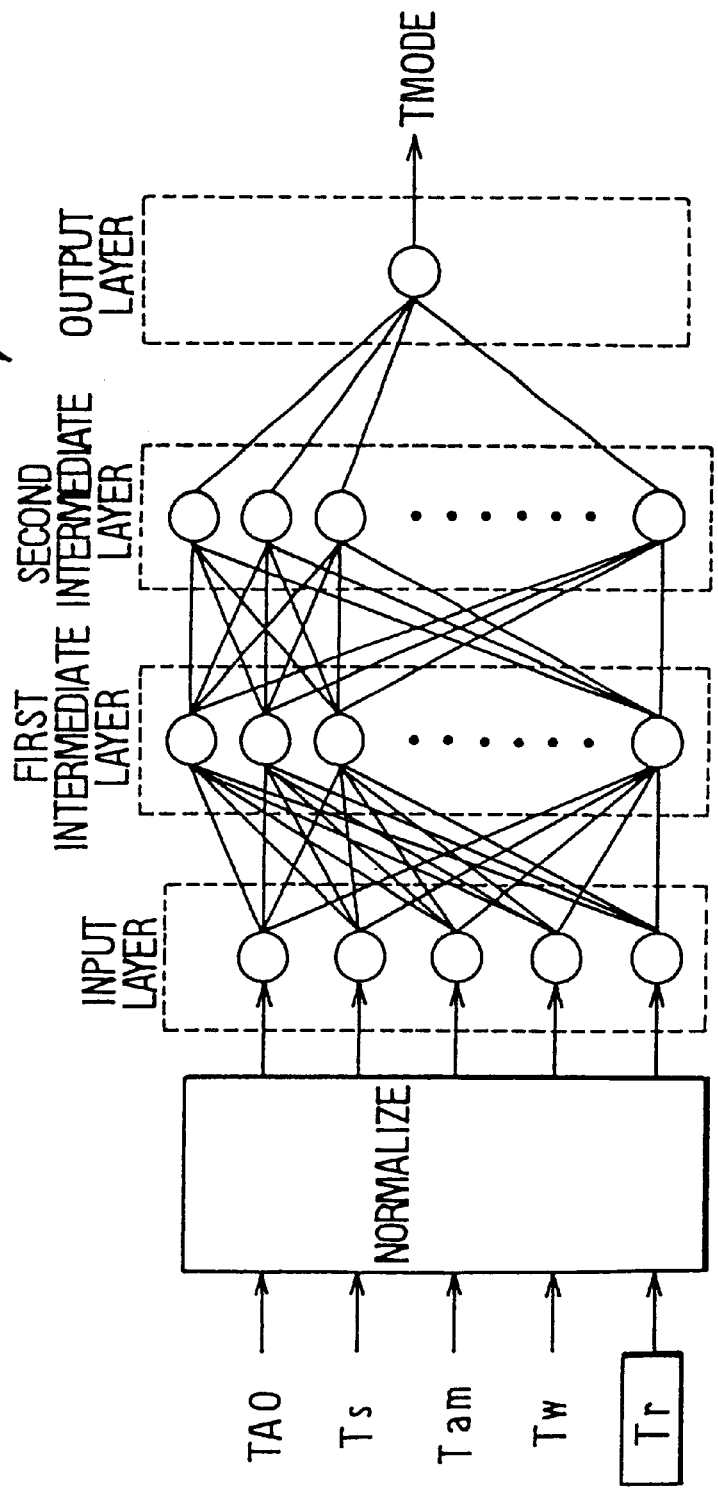

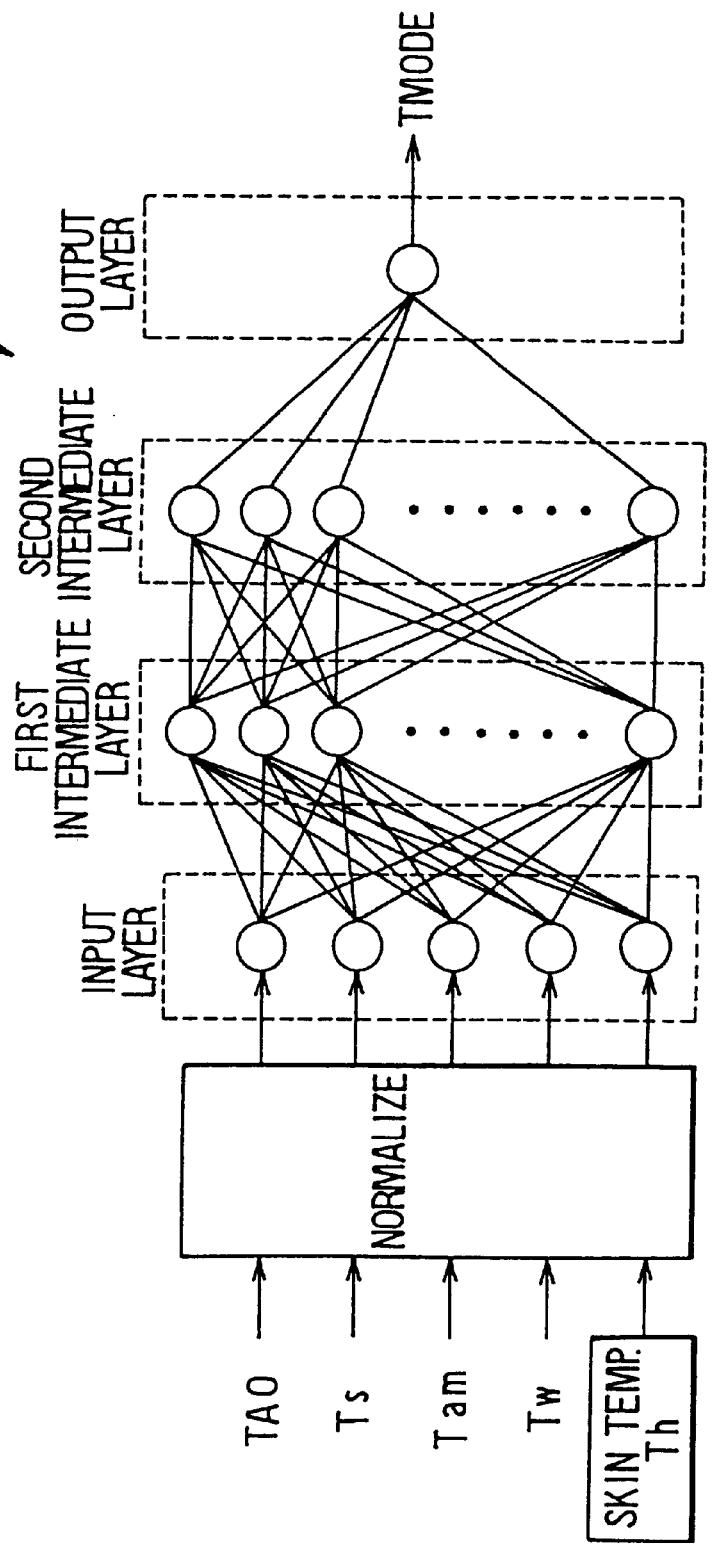

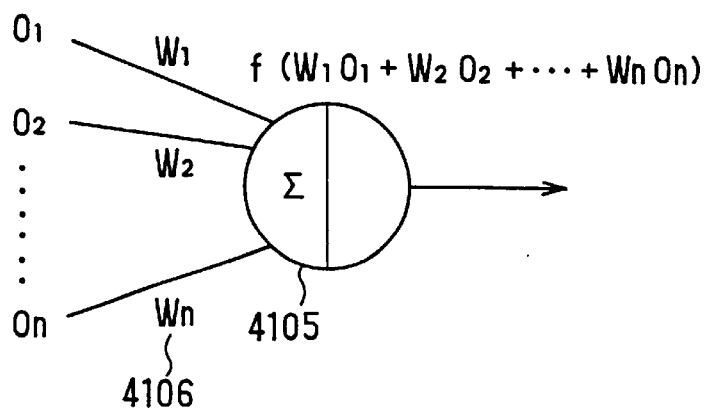
FIG. 59A
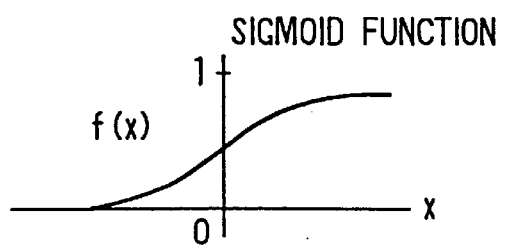
FIG. 59B
FIG. 61
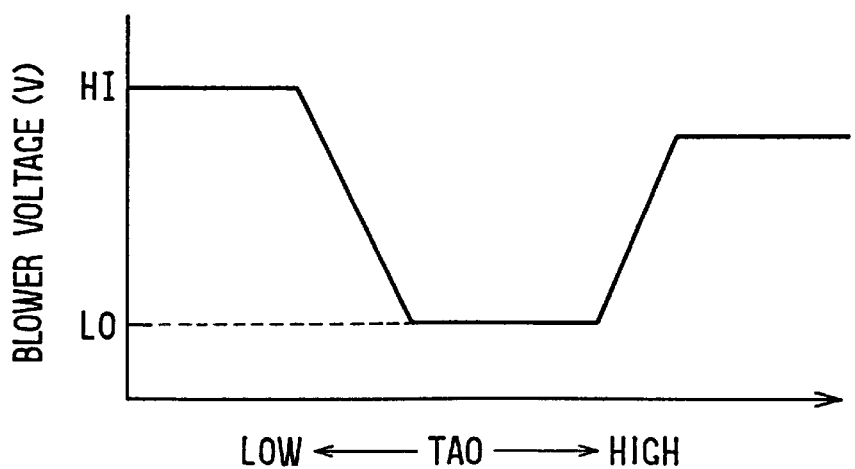

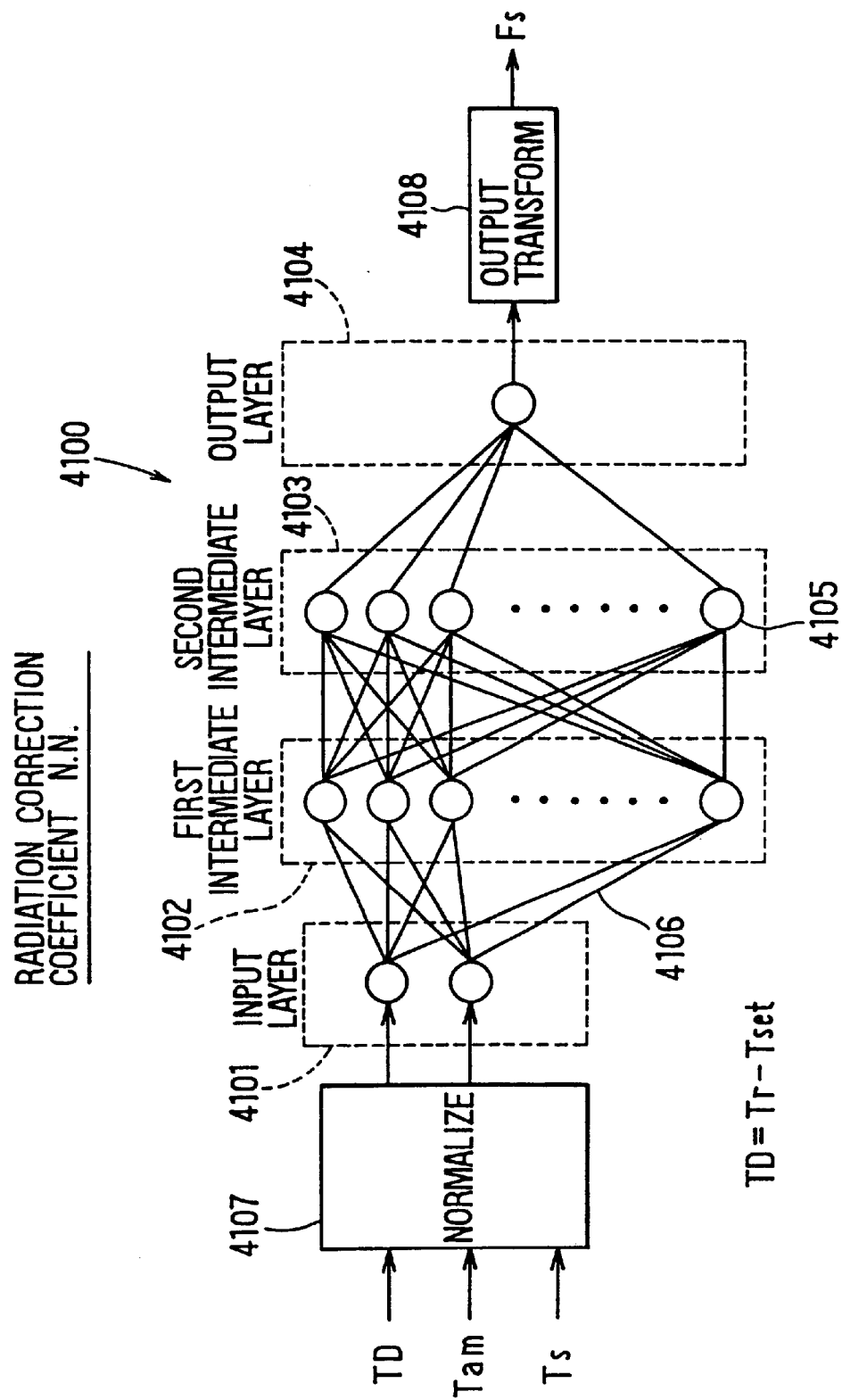

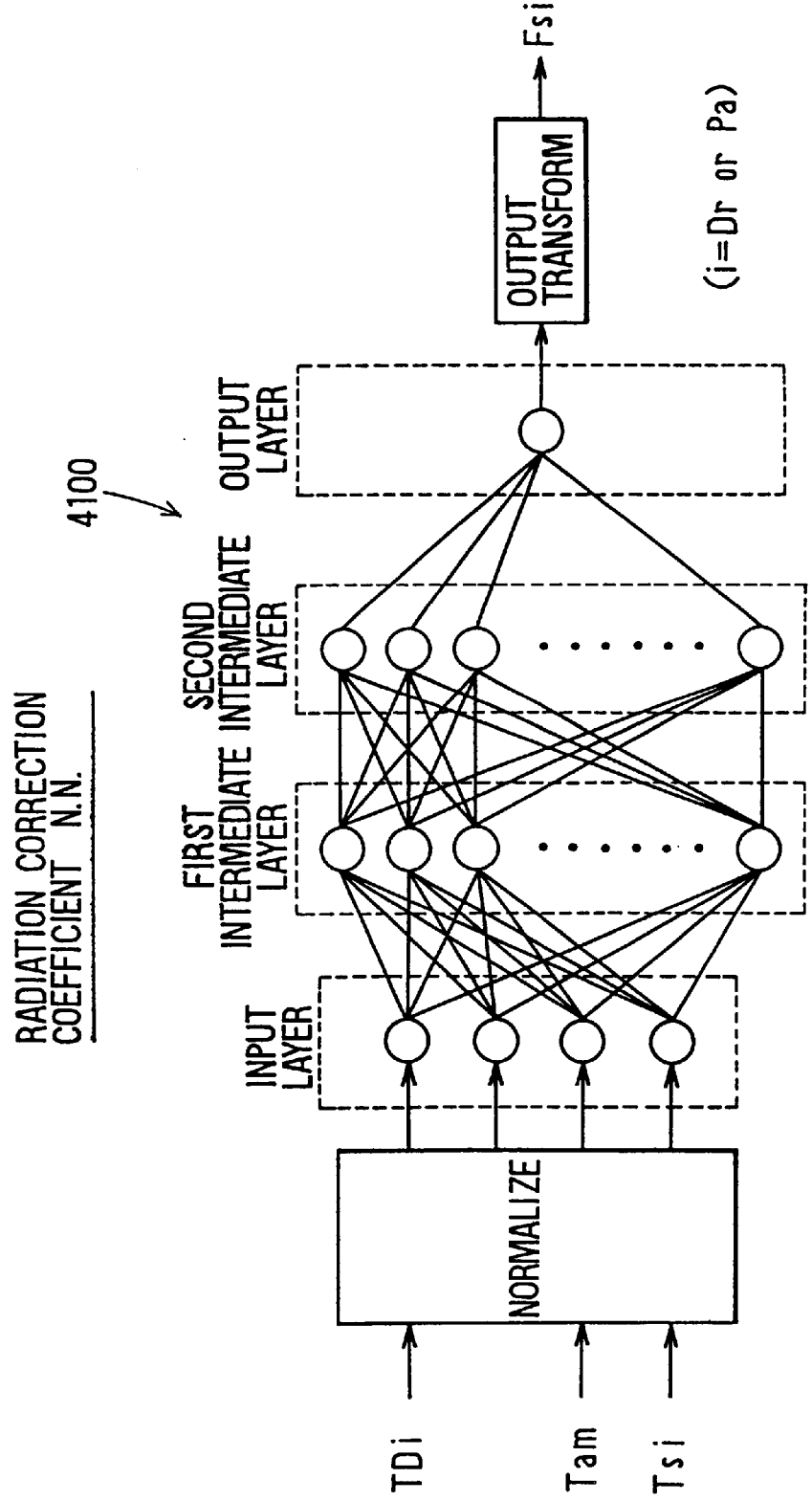

AIR-CONDITIONING DEVICE

CROSS-REFERENCE TO RELATED APPLICATIONS

This application is based upon Japanese Patent Applications No. Hei. 10-112435 filed Apr. 22, 1998, No. Hei. 10-115419 filed Apr. 24, 1998, No. Hei. 10-115420 filed Apr. 24, 1998, and No. Hei. 10-117416 filed Apr. 27, 1998, the contents of which are incorporated herein by reference.

BACKGROUND OF THE INVENTION

1. Field of the Invention

The present invention relates to an air-conditioning device for automatically controlling the temperature in a room such as a passenger component of a vehicle or a room in a building.

2. Description of Related Art

Some air-conditioning devices for controlling two or more different air-conditioning zones independently of each other have heretofore been proposed in an air-conditioning device for automobile field. When the temperatures, in a driver seat (Dr) side air-conditioning zone and in a passenger seat (Pa) side air-conditioning zone, are controlled independently, since there is no partition wall between two air-conditioning zones, temperature interference between the two air-conditioning zones may occur.

As an air-conditioning device for automobiles, which is capable of controlling independently between the two air-conditioning zones, Japanese Laid-open Patent No. 7-32854 has proposed. In this air-conditioning device, when a Dr side target blow-out temperature and a Pa side target blow-out temperature are calculated, a calculation term of difference between a Dr side setpoint temperature and a Pa side setpoint temperature are corrected by correction gain, which is decided based on an external temperature, so as to realize desired temperatures in each of the Dr side and Pa side air-conditioning zones.

This air-conditioning device aims to prevent practical temperatures of each zones from deviating from predetermined setpoint temperatures due to an influence of the external temperature, by the correction described the above.

However, the temperature interference between the two air-conditioning zones can not be conjectured only based on the external temperature and the difference between the two setpoint temperatures. Actually, the temperature interference is related to an internal temperature, a blow-out temperature, and an amount of air or the like at every timing. Therefore, the independent temperature controlling can not be operated accurately by only the correction described above.

FIGS. 12A, 12B are temperature characteristics of the independent controlling, which are experimentally confirmed. FIG. 12A shows a characteristic of a temperature of area in which surrounding passengers when the Pa side setpoint temperature is set to constant and the Dr side setpoint temperature varies from 22° C. to 28° C. FIG. 12B shows a characteristic of opposite relation.

As shown in FIG. 12A, during a varying of the setpoint temperature of Dr side, the temperature interference, which is a phenomenon, that the temperature of area surrounding passengers in Pa side is dragged by temperature changes of Dr side. Hence, a controllability of temperature of both Dr side and Pa side has no inconvenient.

However, as shown in FIG. 12B, when the setpoint temperature of the Pa side is varied, the temperature of area surrounding passengers in Pa side is decreased slightly with respect to normal temperature increasing due to an influence on Dr side. Specifically, when the Pa side setpoint temperature (Tset(Pa))=28° C., the temperature of area surrounding passengers in Pa side reaches only around 25.5° C.

In the Japanese Laid-open Patent No. 7-32854, for the purpose of offsetting the temperature interference, a correction value is calculated by multiplying the difference between two setpoint temperatures, and is added to the target blow-out temperature. FIGS. 13A, 13B are temperature characteristics when this correction is adopted. As shown in FIG. 13B, when the Pa side setpoint temperature varies, the control characteristic at the condition where Tset(Pa)=28° C. is improved, however, the correction term influences other conditions to the contrary. This is because the correction term depends on the difference between two setpoint temperatures.

In other words, from the temperature difference point of view, both the condition of which the characteristic should be improved (Dr side setpoint temperature Tset(Dr)=25° C., Pa side setpoint temperature Tset(Pa)=28° C.) and the condition of which the characteristic should be maintained (Tset(Dr)=25° C., Tset(Dr)=22° C.) are the identical (each of them is 3° C.). Therefore, the correction is adapted to other condition.

Then, a disadvantage occurs because the temperature of area surrounding passengers in Pa side is decreased below 22° C., as shown in FIG. 13B, in the condition of which the characteristic should be maintained (Tset(Dr)=25° C., Tset (Dr)=22° C.) may occur.

Similarly, as shown in FIG. 13A, a disadvantage occurs because the temperature of area surrounding passengers in Pa side is deviated from 25° C. due to temperature varying in Dr side may occur.

FIG. 14A shows a characteristic of a Dr side correction gain KDr according to the related art described the above. When the external temperature rises from T1 to T2, KDr decreases from K1 to K2. A Pa side correction gain Kpa has a similar characteristic. If the Pa side correction gain Kpa is changed from K3 to K4 at external temperature=10° C., since the relation Kpa=K4 is adopted to other condition during external temperature=10° C., the disadvantage shown in FIGS. 13A, 13B may occur.

Therefore, in order to eliminate the disadvantage, it is necessary to change the Pa side correction gain Kpa to K4 in only a particular condition, and to maintain the Pa side correction gain with K3 without change in the other conditions.

In other words, a control logic, which can change the correction gain in only the particular condition, is needed. However, environment conditions, of which the air-conditioning device for automobiles faces, include a wide variety of parameters such as the external temperature, an amount of solar radiation (hereinafter, radiation amount), a speed of the automobile and the like. Therefore, it is extremely difficult to investigate a relationship of factors at which these environment conditions influence to the temperature control characteristic one by one, to quantify the influence of the relationship, and to decide the blow-out temperature control logic corresponds to the influence, because it needs huge processes.

On the other hand, in another conventional automatically control air-conditioning device for vehicles, as shown in Japanese Laid-open Patent No. 6-195323, calculates an air amount by using a neural network based on an internal air temperature and an external air temperature of the vehicle, a setpoint temperature, and a radiation amount.

In this kind of air-conditioning device, during a normal operation after the internal air temperature reaches the setpoint temperature, when a blow-out port mode is either in a FACE mode or in a BI-LEVEL (B/L) mode, the air amount is increased in proportion to the radiation amount so as to increase a cooled air feeling (felt by a driver or a passenger), during high solar radiation.

Here, when the blow-out port mode is in a FOOT mode, since the temperature in a passenger component rises due to the radiation, an increase of amount of conditioned air (hereinafter, air amount) is not needed. Therefore, the air amount is not increased in proportion to the radiation amount.

According to the above-mentioned conventional device, when the air amount is changed in proportion to radiation during a normal operation, the following disadvantage may occur.

The number of output of the air amount, which is calculated by the neural network, is only one independent of the blow-out port mode. Therefore, when the blow-out port mode is switched among the FACE mode, the B/L mode and the FOOT mode, the air amount needs to be changed step by step during high radiation.

This disadvantage will be explained in detail with reference to FIG. 25. In FIG. 25, the ordinate represents a blower voltage which determines the air amount to the passenger component, the abscissa represents a difference TD (=Tr−Tset) between the internal air temperature Tr in the passenger compartment and the setpoint temperature Tset. This difference TD is zero around center of an area A on the abscissa, and is in a plus at the right side on the abscissa and in a minus at the left side on the abscissa.

In the FOOT mode, when the difference TD is in around zero in the normal operation area A, the blower voltage is set to the minimum voltage $E_2$ independent of radiation. On the other hand, in the FACE mode or the B/L mode, the blower voltage is increased from $E_2$ to $E_4$ in proportion to radiation. Since this changes (increasing), which is an amount of changes $\Delta E$ of the blower voltage due to mode switching, does not have continuously (step by step changes), a learning of the neural network becomes difficult.

Further the conventional device inputs data such as the internal air temperature, the external temperature, the setpoint temperature and the radiation amount to the neural network. The total number of data is desired to reduce so as to reduce the number of intermediate layers and neurons in the neural network, and to reduce the total calculation time of the neural network enough to converge the learning of link coefficients between the neurons.

A further conventional automatically control air-conditioning device for vehicles, as shown in Japanese Laid-open Patent No. 56-86815, calculates a target blow-out temperature TAO, which is used for maintaining a temperature in a passenger component. Then it controls a temperature adjuster (e.g., air-mixing door or hot water valve) so that a temperature of air blown to the passenger compartment approaches the target blow-out temperature TAO. The target blow-out temperature TAO is calculated as follows:

$$TAO = Kset \times Tset - Kr \times Tr - Kam \times Tam - Ks \times Ts + C$$

Here, Tr is an internal air temperature, Tam is an external air temperature, Ts is a radiation amount to the passenger compartment, Kset is a temperature set gain, Kr is an internal air temperature gain, Kam is an external air temperature gain, Ks is a radiation amount gain, and C is an correction constant value.

One of a Face mode for blowing air to a face area of the passenger, a FOOT mode for blowing air to a foot area of the passenger, and bi-level (B/L) mode for blowing air to both the face area and the foot area of the passenger, is selected based on the target blow-out temperature TAO.

FIGS. 46A–46C show blow-out port control based on the TAO. The blow-out port mode is changed to the FACE mode→the B/L mode→the FOOT mode, in proportion to a rising of TAO.

According to this conventional device, if heat load conditions for the vehicle are same, the TAO will be same value. Therefore, in this case, the blow-out port mode will be set to be same mode. However, a heat feeling of the passenger due to surrounding condition is different from the heat load condition. Hence, a uniform switching of the blow-out port mode based on the TAO may make an air-conditioning feeling worse.

These air-conditioning feeling will be explained with reference to FIGS. 46A–46C. FIG. 46A shows a condition of the external air temperature Tam is 10° C. (rather warm), and cloudiness (less solar radiation). FIG. 46B shows a condition of the external air temperature Tam is 0° C. (rather cold), and fairy (much solar radiation). In these two conditions, both of the TAO will be the same value "a", therefore, the FOOT mode is selected uniformly.

However, in the case of FIG. 46B, the passenger will feel hot due to the radiation to the upper body, even if the external air temperature is rather low, and will want more cooled air to the upper body. That is, in this case, it is desired to select the B/L mode to improve the air-conditioning feeling. Therefore, the conventional device could not control the blow-out port mode in view of the radiation.

Furthermore, the external air temperature and a temperature of hot water to a heat exchanger also influence the air-conditioning feeling. However, the conventional device also could not control the blow-out port mode in view of these factors.

In order to resolve the above-mentioned inconvenience, it can be thought the following structure as shown in FIGS. 47A, 47B. That is, two maps including a no radiation map (FIG. 47A) and a radiation map (FIG. 47B) are provided as a characteristic switching map between the blow-out port mode and the TAO. when it is in the radiated condition, as shown in FIG. 47B, a switching point of the B/L mode will be changed to a high temperature side. Similarly, the same method can be adopted for the external temperature, and the hot water temperature.

However, the structure in FIGS. 47A, 47B may increase memory portion (ROM) of an air-conditioning electrical control unit, because it needs additional maps.

Further, environment conditions, of which the air-conditioning device for automobiles faces, include a wide variety of parameters such as the external temperature, an amount of solar radiation, a speed of the automobile and the like. Therefore, it is extremely difficult to investigate a relationship of factor at which these environment conditions influence the temperature control characteristic one by one, to quantify the influence of the relationship, and to decide the blow-out temperature control logic corresponds to the influence, because it needs huge processes.

Then, another disadvantage of Japanese Laid-open Patent No. 56-86815 will be explained. In this conventional device, the amount radiation Ts is included as a calculation term in the equation of the target blow-out temperature TAO. Therefore, even if it is at the timing just after the air-conditioning device starts in winter (warm-up), TAO is calculated as low temperature. Then, a warm-up time may be long time. The warm-up time corresponds to a period between the temperature adjuster is adjusted from maximum heating position to temperature region and a room temperature rises to the setpoint temperature.

In order to solve the above-mentioned disadvantage, Japanese Laid-open Patent No. 4-163223 is proposed. In this device, when a temperature difference (Tr−Tset) between the internal air temperature Tr of the passengers component and the setpoint temperature Tset is minus, the radiation amount Ts as the calculation term (amount on radiation correction) is decreased in proportion to an increasing of the absolute value of the temperature difference.

According to an investigation, it is found the following facts. That is, when the radiation amount correction is decided only based on the temperature difference (Tr−Tset), it may be impossible to calculate the radiation amount correction for various surrounding conditions. That is, even if the temperature difference is equal, the TAO is desired to be high temperature by decreasing the radiation amount correction when the external air temperature is extremely low like in winter, so as to shorten the warm-up time.

Similarly, even if the temperature difference is equal, the TAO is desired to be low temperature by decreasing the radiation amount correction when there is little solar radiation, so as to shorten the warm-up time.

In winter, since an angle of the sun is rather small, the solar radiation is likely to be radiated to upper body of the passenger. In such a case, when the internal air temperature reaches the setpoint temperature (Tr−Tset≈0) as the result of heating, an operation of will be normal operation. Then, the passenger may feel hot due to the radiation. Therefore, it is desired to set TAO low temperature by increasing the radiation amount correction during much radiation in the normal operation so as to set the blow-out port mode to B/L mode to blow cooled air from a face blow-out port.

SUMMARY OF THE INVENTION

The present invention was accomplished in view of the above-mentioned circumstances. First object is to provide an air-conditioning device for controlling the air-conditioning temperatures in a first air-conditioning zone and in a second air-conditioning zone highly independently of each other by restricting temperature interference between the first air-conditioning zone and the second air-conditioning zone.

A neural network, which is one of information process system, has a characteristic to correct its output to be desired data (teacher signal) automatically, by adjusting link coefficients (synapse weights) between each neurons in each layers in the neural network automatically (i.e., learning function). The present inventions aim at correcting the target blow-out temperature only at a specific condition without increasing an engineer's process, by using the automatic adjusting function of link coefficients between the neurons in the neural network.

Furthermore, second object is to provide an air-conditioning device, which calculate an air amount by using a neural network, of which learning can be simplified.

Also, third object is to provide an air-conditioning device, which calculate an air amount by using a neural network, of which total calculation time can be decreased.

Furthermore, fourth object is to provide an air-conditioning device, which can control a blow-out port mode finely in accordance to air-conditioning feeling of user.

Furthermore, fifth object is to provide an air-conditioning device, which can calculate a radiation amount correction accurately to improve an air-conditioning feeling of user.

In order to accomplish one of the above-mentioned object, the present invention provides an air-conditioning device includes a first and a second temperature adjusters, and a first and a second target blow-out temperature calculating portions for input setpoint temperatures (Tset(Dr), Tset(Pa)) of a first and a second air-conditioning zones, an internal air temperature (Tr) detected by a temperature data detector, and an external air temperature (Tam) detected by the temperature data detector, to calculate a first and a second target blow-out temperatures (TAO(Dr), TAO(Pa)) of each air-conditioning zones by using a neural network. Here, the first and the second temperature adjusters are controlled so that the blow-out temperatures of air-conditioned air from each air passages relative to the first and the second air-conditioning zones can correspond to the first and the second target blow-out temperatures (TAO(Dr), TAO(Pa)).

According to the present invention, the first and the second target blow-out temperatures (TAO(Dr), TAO(Pa)) related to each air-conditioning zones are calculated via the neural network. The neural network has the learning function, which adjusts the link coefficients (synapse weights) between each neurons in each layers in the neural network automatically to correct its output to be desired data (teacher signal). Therefore, the output at a specific input condition can be adjusted, by changing the teacher signal at the specific input condition and then adjusting the link coefficients (synapse weights) automatically in advance.

Furthermore, since the neural network adjusts its whole link coefficients so that the desired outputs (teacher signal) at the other input condition are maintained even if the output at the specific input condition is changed. Therefore, the change of the output at the specific input condition does not influence the outputs at the other input conditions.

Hence, when the setpoint temperatures of the first and the second air-conditioning zones are changed, both temperatures of the area surrounding passengers in the first and the second air-conditioning zones are highly independent controlled with accurately, without the temperature interference between each zones.

BRIEF DESCRIPTION OF THE DRAWINGS

FIG. 3 is a schematic diagram of a neural network of temporary target temperature calculating portion of the first embodiment;

FIG. 5 is a schematic diagram of a neural network of radiation amount correction calculating portions of the first embodiment;

FIG. 10 is a diagram of characteristics illustrating a calculation of the blow-out port mode according to the first embodiment;

FIGS. 11A, 11B are diagrams of control characteristics of temperatures of area surrounding passengers in Dr side and Pa side according to the first embodiment;

FIG. 11C is a diagram illustrating a relationship between input signals and output signal of neural network;

FIG. 18 is a schematic diagram of a neural network of air amount calculating portion of the second embodiment;

FIG. 20 is a schematic diagram of a neural network of temporary target temperature calculating portion of the second embodiment;

FIG. 21 is a schematic diagram of a neural network of radiation amount correction calculating portion of the second embodiment;

FIG. 39 is a schematic diagram of a neural network of blow-out port mode calculating portion of the fourth embodiment;

FIG. 41 is a schematic diagram of a neural network of temporary target temperature calculating portion of the fourth embodiment;

FIGS. 46A–46C and 47A–47B are diagrams illustrating a switching characteristic of a blow-out port mode according to a related art;

FIG. 47C is a diagram illustrating a switching characteristic of a blow-out port mode according to fourth embodiment;

FIG. 51 is a schematic diagram of a neural network of blow-out port mode calculating portion of a fifth embodiment;

FIG. 52 is a schematic diagram of a neural network of blow-out port mode calculating portion of a sixth embodiment;

FIGS. 59A, 59B are diagram and graph for explaining an output calculating procedure of neural network;

FIG. 61 is a diagram of characteristics illustrating a calculation of a blower voltage according to the ninth embodiment;

FIG. 67 is a schematic diagram of a neural network of a radiation correction coefficient calculating portion of the eleventh embodiment;

FIG. 71 is a schematic diagram of a neural network of a radiation correction coefficient calculating portion of the thirteenth embodiment.

DETAILED DESCRIPTION OF THE PREFERRED EMBODIMENTS (First Embodiment)

Figure 1:
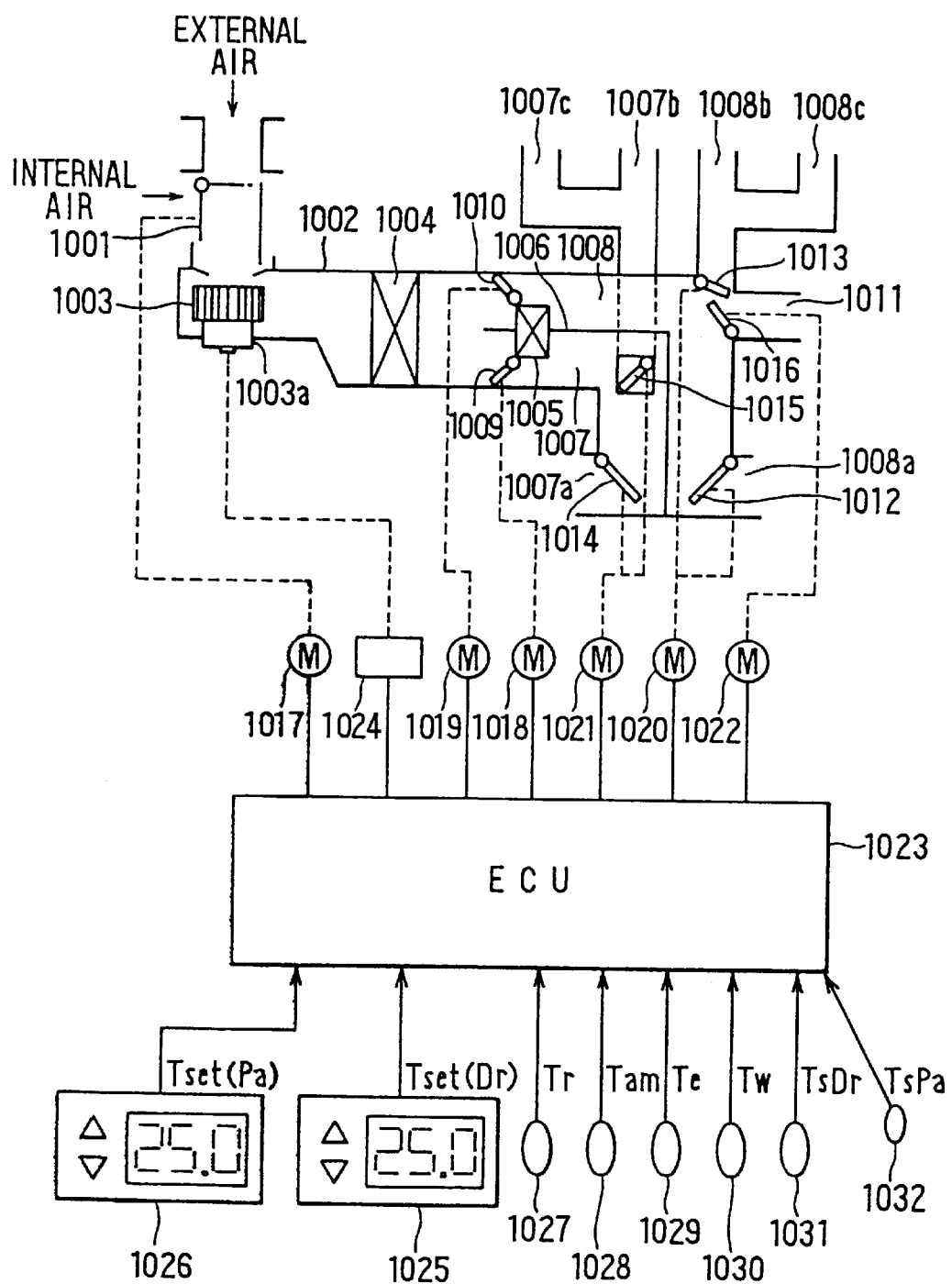
FIG. 1 is a diagram illustrating the constitution of whole system of an air-conditioning device according to a first embodiment of the present invention.

A first embodiment of the present invention will be described hereinafter with reference to FIGS. 1–11B. FIG. 1 is a diagram illustrating the constitution of whole system of an air-conditioning device for automobiles (vehicles), which is capable of controlling independently between a driver seat (Dr) side air-conditioning zone and a passenger seat (Pa) side air-conditioning zone in a passenger component. In FIG. 1, an internal air/external air change-over door 1001 is arranged at the most upstream side of air flow in the air-conditioning device. One of an external air and an internal air is selectively introduced into an air duct 1002 by moving the door 1001.

A blower 1003, an evaporator 1004 and a heater core 1005 are arranged from upstream side to downstream side in the air duct 1002. The evaporator 1004 is a cooling heat exchanger for cooling an air by absorbing an evaporating latent heat of a refrigerant in a refrigerating cycle from air. The heater core 1005 is a heating heat exchanger for heating air with heat from a hot water (engine coolant) from a vehicle engine (not shown).

A partitioning wall 1006 is arranged from the heater core 1005 portion to its downstream side in the air duct 1002 to divide the air duct 1002 into a Dr side air passage 1007 and a Pa side air passage 1008.

A Dr side air-mixing door 1009 is arranged at the upstream of the heater core 1005 in the Dr side air passage 1007. The Dr side air-mixing door 1009 adjusts a ratio of two air amount in the Dr side air passage 1007, an amount of heated air passed through the heater core 1005 and an amount of cooled air by-passed the heater core 1005. A Pa side air-mixing door 1010 is arranged at the upstream of the heater core 1005 in the Pa side air passage 1008, and adjusts a ratio of two air amount in the Pa side air passage 1008. Here, the two air amount are an amount of heated air passed through the heater core 1005 and an amount of cooled air by-passed the heater core 1005.

At the most downstream side of the Dr side air passage 1007 and the Pa side air passage 1008, foot blow-out ports 1007a, 1008a, face blow-out ports 1007b, 1007c, 1008b, 1008c, and a defroster blow-out port 11 are provided. Here, the foot blow-out ports 1007a, 1008a are provided to blow the conditioned air onto the feet of the passengers. The face blow-out ports 1007b, 1007c, 1008b, 1008c are provided at each of center portion and side portion in the passenger compartment to blow the conditioned air to the upper half of the body of the passengers. The defroster blow-out port 1011 is provided to blow the conditioned air to a windshield.

In the Dr side air passage 1007 and the Pa side air passage 1008, blow-out port change-over doors 1012–1016 are arranged to selectively open/close the blow-out ports 1007a–1007c, 1008a–1008c and 1011. Each of predetermined blow-out modes, such as a FACE mode (FACE), a BI-LEVEL mode (B/L mode), and a FOOT mode (FOOT) or the like can be set with respective to each ports 1007, 1008, independently, by changing the open/close condition of the doors 1012–1016.

Here, a control system for controlling the air-conditioning device will be explained. The internal air/external air changing door 1001, the Dr side air-mixing door 1009, the Pa side air-mixing door 1010, and the blow-out port change-over doors are driven by servomotors 1017–1022. The servomotors 1017–1022 are controlled by outputs of an air-conditioning electric control device 1023 (hereinafter, called "ECU 1023"). A motor 1003a of the blower 1003 is also controlled by the output of the ECU 1023 via a control circuit (motor applied voltage control circuit) 1024. The ECU 1023 includes a microcomputer and its peripheral circuits.

A Dr side temperature setter (first temperature setter) 1025 is provided to set a Dr side setpoint temperature Tset(Dr) of the Dr side air-conditioning zone relative to the Dr side air passage 1007, and output the setpoint temperature Tset(Dr) to the ECU 1023. A Pa side temperature setter (second temperature setter) 1026 is provided to set a Pa side setpoint temperature Tset(Pa) of the Pa side air-conditioning zone relative to the Pa side air passage 1008, and output the setpoint temperature Tset(Pa) to the ECU 1023. Both temperature setters 1025, 1026 are provided independently of each other.

As temperature data detectors, an internal air sensor 1027 is arranged to detect an internal air temperature Tr. An external air sensor 1028 is arranged to detect an external air temperature Tam. An evaporator temperature sensor 1029 is arranged to detect a cooling temperature (blow-out air temperature) of the evaporator 1004. A water temperature sensor 1030 is arranged to detect a temperature Tw of hot water flowing into the heater core 1005.

Furthermore, a Dr side radiation sensor 1031 is arranged to detect a (solar) radiation amount TsDr to the Dr side air-conditioning zone, and a Pa side radiation sensor 1032 is arranged to detect a (solar) radiation amount TsPa to the Pa side air-conditioning zone.

Figure 2:
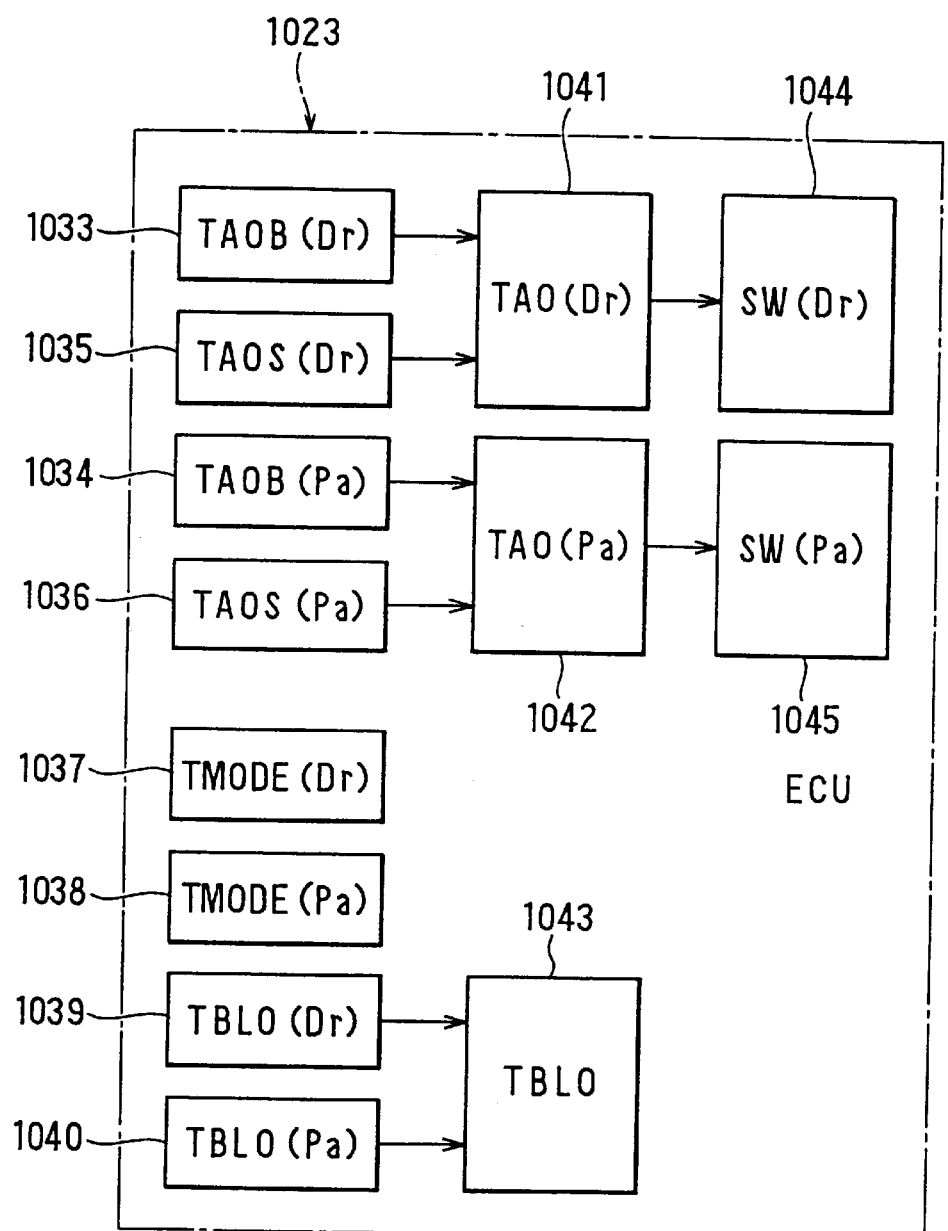
FIG. 2 is a block diagram of main functions of the first embodiment.

Control functions processed by the microcomputer in the ECU 1023 are generally divided as shown in FIG. 2. The ECU 1023 includes first and second temporary target temperature calculating portions 1033, 1034, first and second radiation amount correction calculating portions 1035, 1036, first and second blow-out port mode calculating portions 1037, 1038, first and second air amount calculating portion 1039, 1040, first and second target temperature calculating portions 1041, 1042, an air amount calculating portion 1043, a Dr side air-mixing door opening degree calculating portion 1044, a Pa side air-mixing door opening degree calculating portion 1045.

Here, the first temporary target temperature calculating portion 1033 calculates a Dr side temporary target blow-out temperature TAOB(Dr). The second temporary target temperature calculating portion 1034 calculates a Pa side temporary target blow-out temperature TAOB(Pa).

The first temporary target temperature calculating portion 1033 includes a neural network 1100 as shown FIG. 3, and inputs the signals including the internal air temperature Tr, the external air temperature Tam, setpoint temperature Tset (Dr) from the Dr side temperature setter 1025 and a setpoint temperature difference Δ TsetDr, which is a difference of the both setpoint temperatures Tset(Dr) and Tset(Pa). And the first temporary target temperature calculating portion 1033 calculates the Dr side temporary target blow-out temperature TAOB(Dr) based on the input signals via the neural network 1100.

Similarly, the second temporary target temperature calculating portion 1034 includes a neural network 1100 as shown FIG. 3, inputs the signals including the internal air temperature Tr, the external air temperature Tam, setpoint temperature Tset(Pa) from the Pa side temperature setter 1026, and a setpoint temperature difference ΔTsetPa, which is a difference of the both setpoint temperatures Tset(Dr) and Tset(Pa). The second temporary target temperature calculating portion 1034 calculates the Pa side temporary target blow-out temperature TAOB(Pa) based on the input signals via the neural network 1100.

The first radiation amount correction calculating portion 1035 calculates a Dr side radiation amount correction TAOS (Dr). The second radiation amount correction calculating portion 1036 calculates a Pa side radiation amount correction TAOS(Pa).

The first blow-out port mode calculating portion 1037 calculates a Dr side blow-out port mode signal TMODE(Dr). The second blow-out port mode calculating portion 1038 calculates a Pa side blow-out port mode signal TMODE(Pa).

Furthermore, the first air amount calculating portion 1039 calculates a blower voltage level TBLO(Dr) which decides a Dr side air amount. The second air amount calculating portion 1040 calculates a blower voltage level TBLO(Pa) which decides a Pa side air amount.

Figure 7:
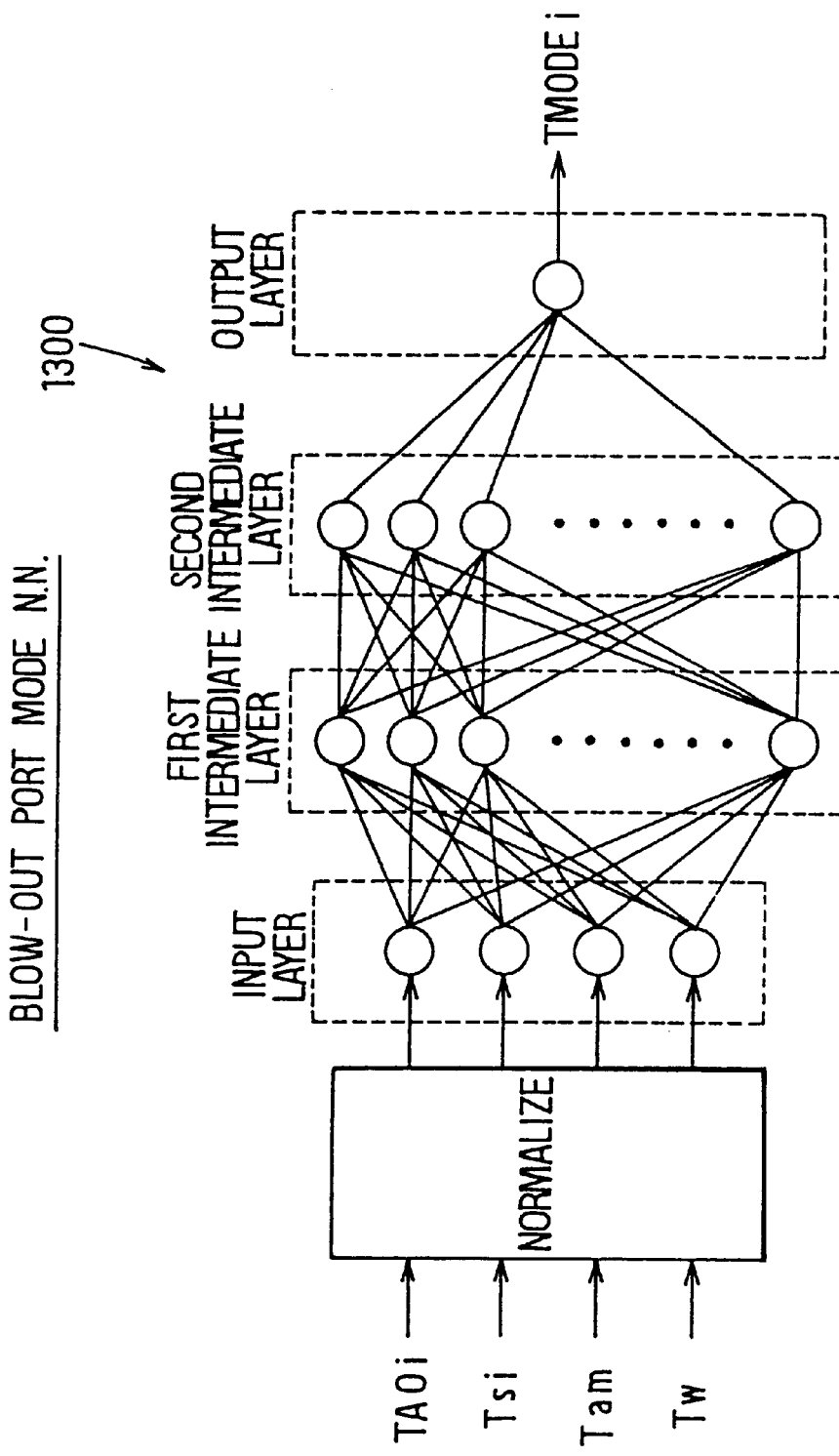
FIG. 7 is a schematic diagram of a neural network of blow-out port mode calculating portion of the first embodiment.
Figure 8:
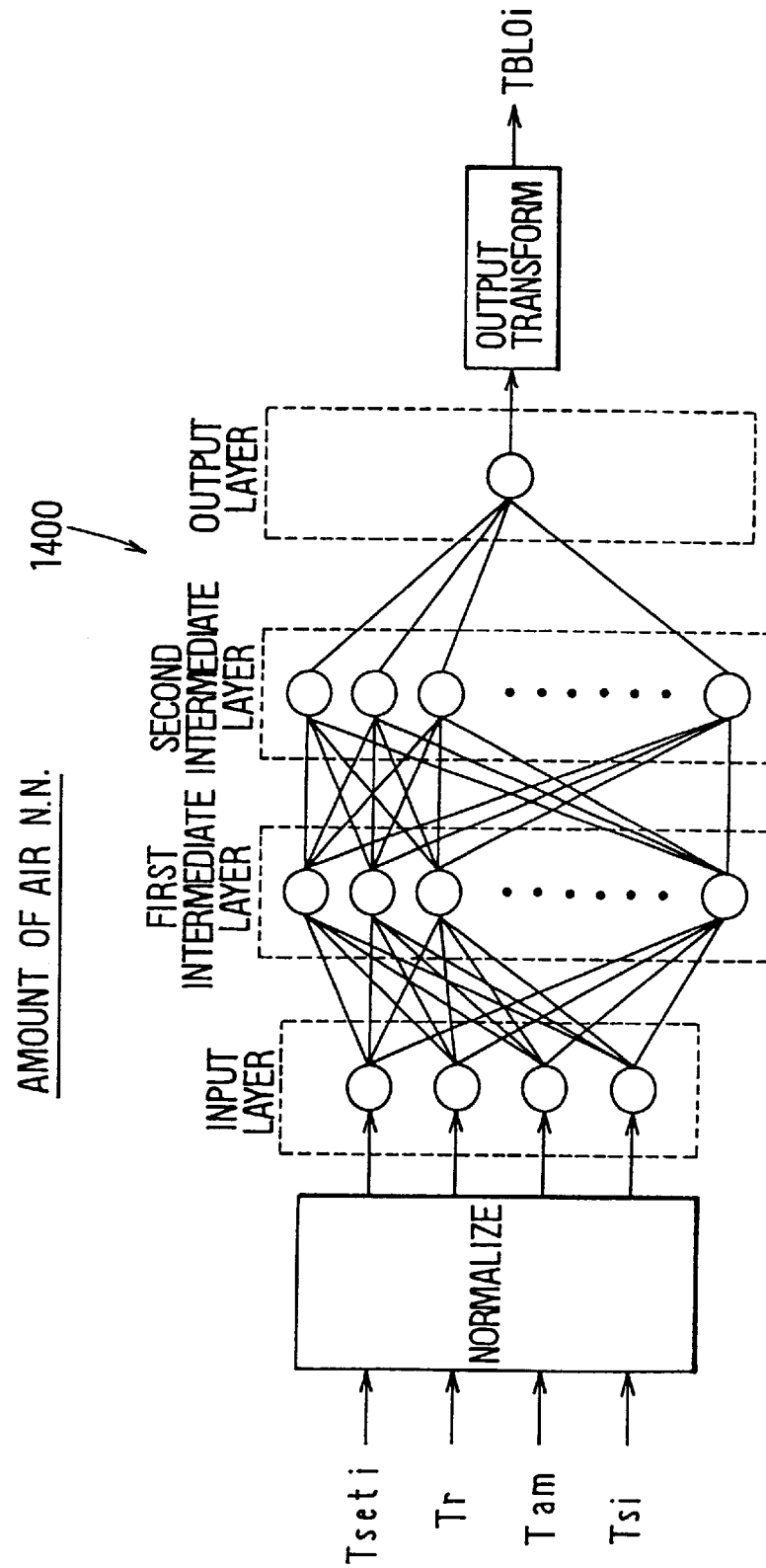
FIG. 8 is a schematic diagram of a neural network of air amount calculating portion of the first embodiment.

The first and the second radiation amount correction calculating portions 1035, 1036 include a neural network 1200 as shown in FIG. 5. The first and the second blow-out port mode calculating portions 1037, 1038 include a neural network 1300 as shown in FIG. 7. The first and the second air amount calculating portions 1039, 1040 include a neural network 1400 as shown in FIG. 8.

The first target temperature calculating portion 1041 calculates a Dr side final target blow-out temperature TAO (Dr) based on the output of the first temporary target temperature calculating portion 1033 and the output of the first radiation amount correction calculating portion 1035. The second target temperature calculating portion 1042 is provided to calculate a Pa side final target blow-out temperature TAO(Pa) based on the output of the second temporary target temperature calculating portion 1034 and the output of the second radiation amount correction calculating portion 1036.

The air amount calculating portion 1043 calculates blower voltage level TBLO corresponding to the final amount on air, based on an average of the blower voltage levels TBLO(Dr), TBLO(Pa), which are calculated by the first and second air amount calculating portions 1039, 1040.

The Dr side air-mixing door opening degree calculating portion 1044 calculates a Dr side air-mixing door opening degree SW(Dr) based on the TAO(Dr) output from the first target temperature calculating portion 1041, and a Pa side air-mixing door opening degree calculating portion 1045 to calculate a Pa side air-mixing door opening degree SW(Pa) based on the TAO(Pa) output from the second target temperature calculating portion 1042.

The constitutions of the neural networks 1100–1400 will be explained. Since the constitutions of the neural networks 1100–1400 are substantially equal, these constitutions are explained based on the neural network 1100 with reference to FIGS. 3, 4A, 4B.

As shown in FIG. 3, the neural network 1100 includes an input layer 1101, a first intermediate layer 1102, a second intermediate layer 1103, and output layer 1104. Each of the input layer 1101, the first and the second intermediate layers 1102, 1103 has a plurality of neurons 1105, and output layer has one neuron 1105. Each of neurons 1105 in the input layer 1101 is connected to each of neurons 1105 in the first intermediate layer 1102 with a certain link coefficient (synapse weight) 1106. Similarly, each of neurons 1105 in the first intermediate layer 1102 is connected to each of neurons 1105 in the second intermediate layer 1103 with a certain link coefficient 1106. Each of neurons 1105 in the second intermediate layer 1103 is connected to the neuron 1105 in the output layer 1104 with a certain link coefficient 1106. These neurons 1105 are formed by memories in the ECU 1023 in an actual circuit, and the neural network 1100 is formed by combined memories.

The neural network 1100, which is a network having a layered structure, has a Back Propagation Learning Function that can automatically correct the link coefficients 1106 between each neurons among the input layer 1101, the first and second intermediate layers 1102, 1103, and output layer, so as to adjust its output to a desired value (teacher signal) related to input signals such as Tseti, Tr, Tam, ΔTseti.

When the teacher signal is changed, the link coefficients 1106 are adjusted by repeatedly "learning" so as to correct the output to be the changed teacher signal related to the input signals. In other words, based on a large number of desired data (teacher signals), a correlation function (link coefficients 1106) is automatically generated. The teacher signals are determined to desired values obtained by an experience or the like (desired output for the input signals).

In the layered structure neural network 1100, there is no connection among each of the neurons 1105 in an identical layer, but the neurons 1105 in each layer are connected to only neurons 1105 in forward and backward layers. The link coefficients 1106 between each neuron 1105 in each layer represent weights of connections (magnitude). The larger the weight of connection, the larger an amplitude of signal, which is output from each neuron 1105 and propagated to neurons 1105 in backward layer.

Here, the input signals (Tseti, Tr, Tam, Δtseti) are normalized to 0–1 value before inputting to the neural network 1100 by a normalize portion 1107. The output signal from the neural network 1100 is transformed in reverse procedure of the normalize portion 1107 by an output transform portion 1108. For example, actual detected internal temperature Tr detected by the internal air sensor is normally in a range from 0° C. to 50° C. This detected value is assigned to a certain value in a range from 0 to 1 in the normalize portion 1107, and is output to the input layer 1101 in the neural network 1100. Since the output signal from the output layer 1104 is a value in the range from 0 to 1, this output signal is transformed to the actual value corresponding to the sensor signal in the reverse procedure by using a predetermined transformation map in the output transform portion 1108.

The environment conditions, of which the air-conditioning device for vehicle faces, are variable, as described above. Therefore, the number of the teacher signals, which are desired values related to the various environment conditions, will be enormously.

Therefore, in a designing process of the ECU 1023, the learning is executed by a high-speed calculator including a neural network, which is the same as the neural network 1100, before being mounted to the vehicle. The high-speed calculator calculates the link coefficients 1106 so that the output of the neural network is to be desired teacher signals for various input signals. Then, the calculated coefficients 1106 are memorized in a memory portion (ROM) corresponding to each neural network 1100, 1200, 1300, 1400 in each of the calculating portions of the ECU 1023 shown in FIG. 2.

Therefore, when the ECU 1023 is mounted on the vehicle, the link coefficients 1106 among the neurons 1105 in each layer of the neural networks 1100–1400 have been set to predetermined value.

Figure 4A:
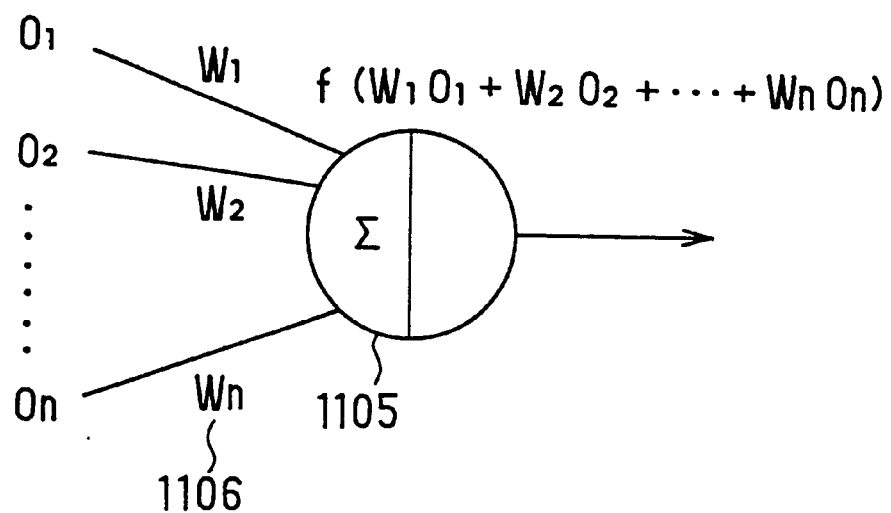
FIGS. 4A, 4B are diagram and graph for explaining a output calculating procedure of neural network.
Figure 4B:
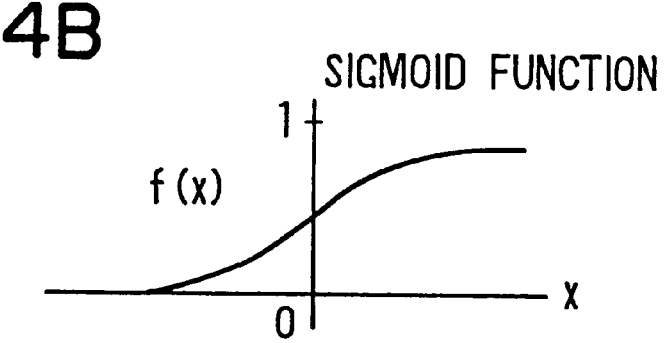

After being mounted on the vehicle, the neural networks 1100–1400 in each layer calculate an output for input signals as shown in FIG. 4A. Specifically, in each of the neurons 1105, each of the input signals $O_1$–$O_n$ is multiplied by each of the corresponding coefficients 1106 ($W_1$–$W_n$), and multiplied values are adapted to a so-called sigmoid function as shown FIG. 4B. The calculated results of the sigmoid function are output to the neurons 1105 in backward layer. These calculations are repeated between each layer to decide a final output.

Since the neural network 1100 in each calculating portion of mounted ECU 1023 is previously set so that the desired value for the various input signals $O_1$–$O_n$ can be obtained, learning for correction of the link coefficients is not needed.

Therefore, the neural network 1100 of the first and second temporary target temperature calculating portions 1033, 1034 output the desired teacher signals as the temporary target blow-out temperature TAOBi related to the change of the input signals (Tseti, Tr, Tam, Δtseti). Here, a subscript "i" represents either "Dr" or "Pa", and will be used hereinafter as the same meaning.

The Dr side temporary target blow-out temperature TAOB (Dr) calculated by the neural network 1100 of the first temporary target temperature calculating portions 1033 is input to the first target temperature calculating portion 1041 which calculates the Dr side final target blow-out temperature TAO(Dr). The Pa side temporary target blow-out temperature TAOB(Pa) calculated by the neural network 1100 of the second temporary target temperature calculating portions 1034 is input to the first target temperature calculating portion 1042 which calculates the Pa side final target blow-out temperature TAO(Pa).

Figure 6A:
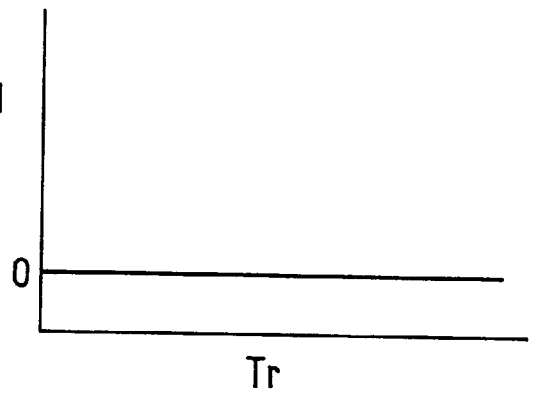
FIGS. 6A–6C are diagram of characteristics illustrating the radiation amount correction calculating portions.
Figure 6B:
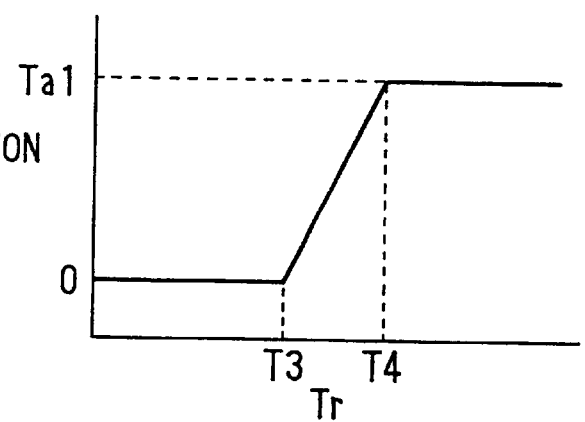
Figure 6C:
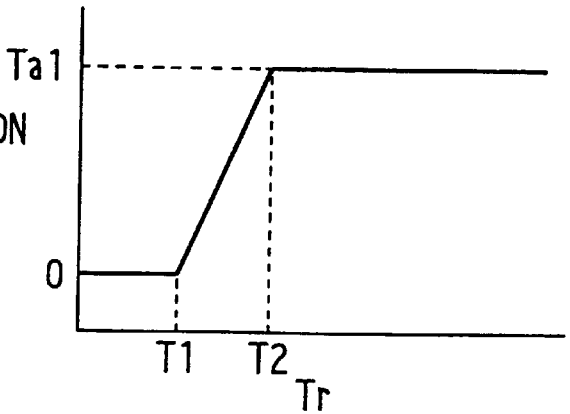

The neural network 1200 of the first and second radiation amount correction calculating portions 1035, 1036 output the desired teacher signals as the radiation amount correction TAOSi relate to the change of the input signals (Tseti, Tr, Tam, Δtseti). Next, a calculation procedure of the radiation amount correction TAOSi will be explained with reference to FIGS. 6A–6C. In FIGS. 6A–6C, the abscissa represents the internal air temperature Tr.

FIG. 6A shows that the radiation amount correction TAOSi is set to zero, independent of the setpoint temperature Tseti, the external air temperature Tam, and the water temperature Tw, when the radiation amount Tsi=0.

FIG. 6B shows a characteristic of the radiation amount correction TAOSi when the radiation amount Tsi=1 kW/m$^2$, the setpoint temperature Tseti=25° C., the external air temperature Tam=<–10° C. The radiation amount correction TAOSi is risen from TAOSi=0 at the point the internal air temperature Tr=T3, and is saturated with Ta1 at the point the internal air temperature Tr=T4, independent of the water temperature Tw, Further, FIG. 6C shows the characteristic of the radiation amount correction TAOSi when the radiation amount Tsi=1 kW/m$^2$, the setpoint temperature Tseti=25° C., the external air temperature Tam=>10° C. The radiation amount correction TAOSi is risen from TAOSi=0 at the point the internal air temperature Tr=T1. Then, it is saturated with Ta1 at the point the internal air temperature Tr=T2, independent of the water temperature Tw, Here, the internal air temperature has a relationship of T1<T2<T3<T4.

When the external air temperature Tam is within a range of –10° C. and 10° C., the internal air temperature Tr at the time the radiation amount correction TAOSi rises is set to intermediate temperature between T1 and T3, and the internal air temperature Tr at the time the radiation amount correction TAOSi saturates is set to intermediate temperature between T2 and T4.

According to the characteristic of the radiation amount correction TAOSi shown in FIGS. 6A–6C, when the internal air temperature Tr is in a low temperature field (warm-up control field when a heating is started in winter), the internal air temperature is risen mainly by the radiation without the radiation correction. On the other hand, when the internal air temperature Tr is in a high temperature field which is higher that a given temperature, the radiation correction is executed so that the variation on internal air temperature control of the passenger component due to the radiation can be restricted.

In the first and the second target temperature calculating portions 1041, 1042, the final target blow-out temperatures TAOi are calculated by the following equation:

$$TAOi = TAOBi - TAOS \quad (1)$$

In the Dr side air-mixing door opening degree calculating portion 1044 and the Pa side air-mixing door opening degree calculating portion 1045, the Dr side air-mixing door opening degree SW(Dr) and the Pa side air-mixing door opening degree SW(Pa) are calculated based on the TAO(Dr) and TAO(Pa), which are output from the first and the second target temperature calculating portion 1041, 1042, the temperature Te of the evaporator 1004, and the water temperature Tw of the heater core 1005, by using the following equation:

$$Swi(\%) = (TAOi - Te)/(Tw - Te) \times 100 \quad (2)$$

The neural networks 1300 as shown in FIG. 7, which constitutes either of the first and the second blow-out port mode calculating portions 1037, 1038, calculate and output the desired value as the blow-out port mode signal TMODE (Dr) on the Dr side and the blow-out port mode signal TMODE(Pa) on the Pa side, respectively, in relation to the changes of input signals (TAOi, Tsi, Tam, Tw).

The neural networks 1400 as shown in FIG. 8, which constitutes either of the first and the second air amount calculating portions 1039, 1040, calculate and output the desired value as the Dr side blower voltage level TBLO(Dr), the Pa side blower voltage level TBLO(Pa), respectively, in relation to the changes of input signals (Tseti, Tr, Tam, Tsi).

Figure 9:
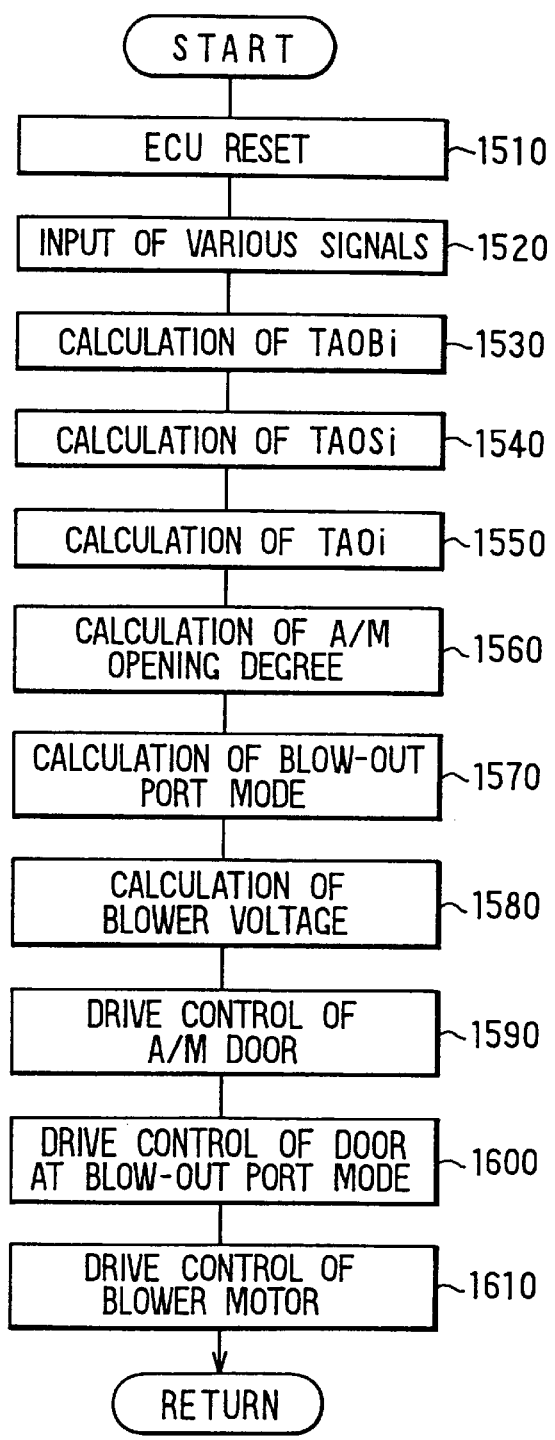
FIG. 9 is a flow chart illustrating a control flow according to the first embodiment.

The control flow according to the preferred embodiment will be explained with reference to a flow chart shown in FIG. 9. This control routine starts from a control switch signal, which starts the air-conditioning device.

At step 1510, the air-conditioning ECU 1023 is reset. At step 1520, the ECU 1023 inputs the output signals from each sensors such as the internal air temperature Tr, the external air temperature Tam, and the signals from the Dr side temperature setter 1025 and the Pa side temperature setter 1026.

At step 1530, the temporary target blow-out temperatures TAOBi are calculated via the neural network 1100, shown in FIG. 3. The step 1530 corresponds to the first and the second temporary target temperature calculating portions 1033, 1034 in FIG. 2.

At step 1540, the amounts of radiation corrections TAOSi are calculated via the neural network 1200, shown in FIG. 5. The step 1540 corresponds to the first and the second radiation amount correction calculating portions 1035, 1036 in FIG. 2.

At step 1550, the final target blow-out temperatures TAOi are calculated by the equation (1). The step 1550 corresponds to the first and the second target temperature calculating portions 1041, 42.

At step 1560, the air-mixing door opening degrees Swi are calculated by the equation (2). The step 1560 corresponds to the Dr side air-mixing door opening degree calculating portion 1044 and the Pa side air-mixing door opening degree calculating portion 1045.

At step 1570, the blow-out port mode signals TMODEi are calculated via the neural network 1300, shown in FIG. 7. The step 1570 corresponds to the first and the second blow-out port mode calculating portions 1037, 1038. Here, outputs in the blow-out port mode signals TMODEi have characteristics that these outputs increase in proportion to an increasing of the target blow-out temperature TAOi. One of the FACE mode (FACE), the B/L mode, and the FOOT mode (FOOT), which are shown in FIG. 10, is determined based on the output TMODEi from the neural network 1300.

At step 1580, the Dr side blower voltage level TBLO(Dr) and the Pa side blower voltage level TBLO(Pa) are calculated via the neural network 1400, shown in FIG. 8. Then, both of the blower voltage levels TBLO(Dr), TBLO(Pa) are averaged to obtain final blower voltage levels TBLO. The step 1580 corresponds to the air amount calculating portions 1039, 1040, and 1043.

At steps 1590–1610, each of actuators such as motors 1017–1022 and the motor applied voltage control circuit 1024 as shown in FIG. 1 are controlled so as to correspond to the above-mentioned calculated values.

Next, merits of this preferred embodiment, in which the target blow-out temperatures TAOi are calculated via the neural networks 1100, 1200, will be explained in detail.

Figure 12A:
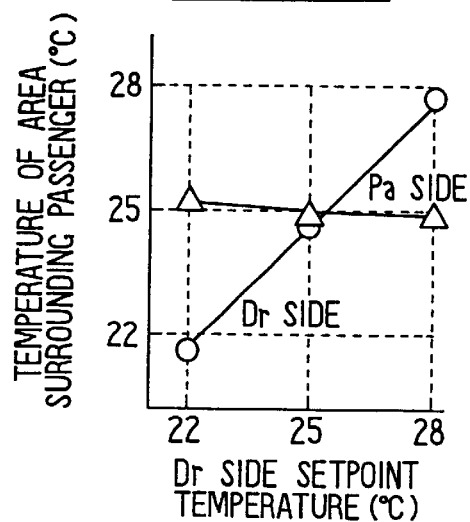
FIGS. 12A, 12B are diagrams of control characteristics of temperatures of area surrounding passengers in Dr side and Pa side.
Figure 12B:
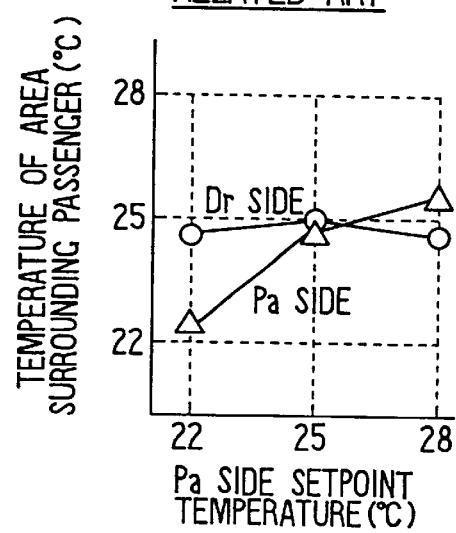
Figure 13A:
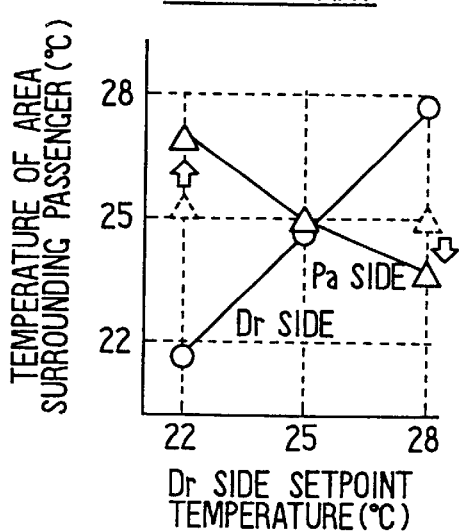
FIGS. 13A, 13B are diagrams of control characteristics of temperatures of area surrounding passengers in Dr side and Pa side according to related art.
Figure 13B:
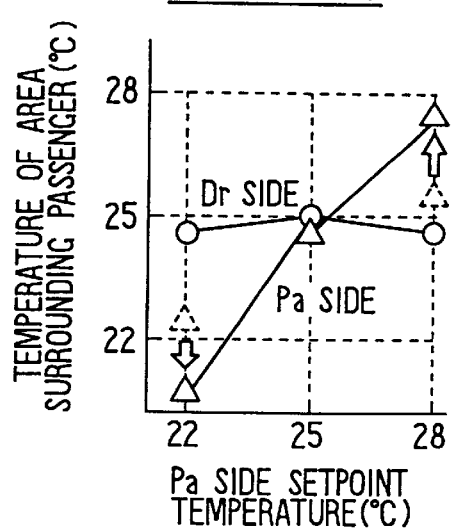
Figure 14A:
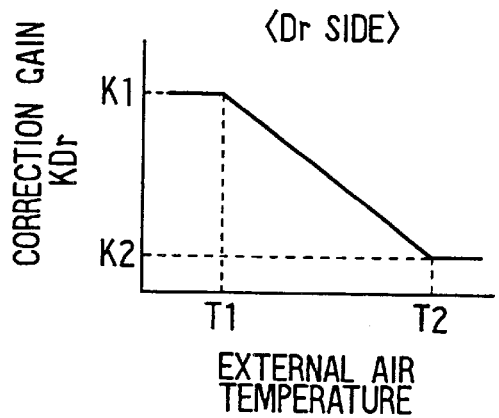
FIGS. 14A, 14B are diagrams illustrating a setting procedure of correction gain of a target blow-out temperature according to the related art.
Figure 14B:
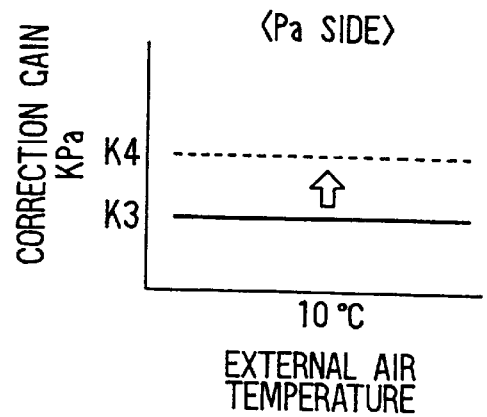
Figure 15A:
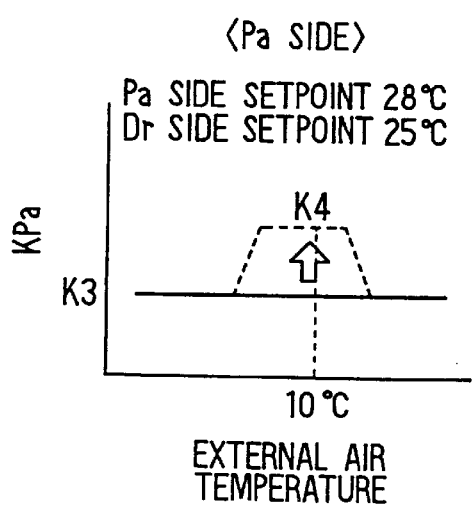
FIGS. 15A, 15B are diagrams illustrating a setting procedure of correction gain according to the related art.
Figure 15B:
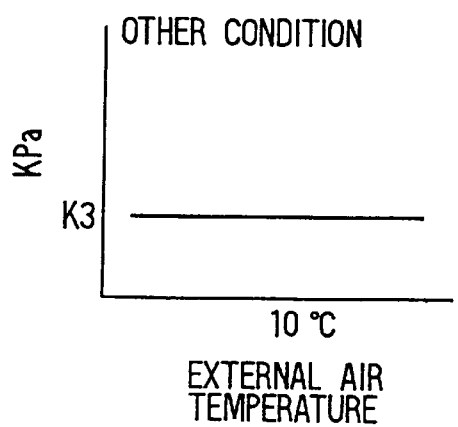

FIG. 11C is a diagram illustrating a relationship between input signals 1–4 and output signal (teacher signal) of neural network 1100. When the input signals 1–4 are 28° C., 25° C., 10° C., 3° C., and the output signal is 50° C., the output signal is changed from 50° C. to 35° C. in case the disadvantage (temperature of area surrounding passengers in Pa side is 25.5° C.), shown in FIG. 12, occurs.

Here, the neural network has the learning function, which adjusts the link coefficients (synapse weights) 1106 between each neurons in each layers in the neural network automatically to correct its output to be desired data (teacher signal). Therefore, the output at a specific input condition can be adjusted, by changing the teacher signal at the specific input condition and then adjusting the link coefficients 1106 automatically in advance.

By above-mentioned changing of output (change from 50° C. to 35° C.), the temperature of area surrounding passengers in Pa side can be controlled to substantially 28° C. as set, when the Pa side setpoint temperature Tset(Pa)= 28° C.

Furthermore, since the neural network adjusts its whole link coefficients 1106 so that the desired outputs (teacher signal) at the other input condition are maintained even if the output at the specific input condition is changed. Therefore, the output change at the specific input condition does not influence the outputs at the other input conditions.

As shown in FIGS. 11A, 11B, when both the Dr side and Pa side setpoint temperatures are changed, both temperatures of the area surrounding passengers in the Dr side and Pa side are highly independent controlled with accuracy, without the temperature interference between each sides.

Furthermore, since the correction of the link coefficients 1106 are adjusted automatically by using the learning function of the neural network, it will not be essential for the engineers to construct a complicated control logic such that the desired output can be obtained only at specific input condition. Hence, engineer's process can be eliminated substantially.

Since the complicated process is not needed, a capacitance of a memory (ROM) of a computer, which constitutes an air-conditioning electric control device, can be decreased.

Furthermore, the temporary target blow-out temperatures TAOBi are calculated via the neural network 1100 shown in FIG. 3. The amounts of radiation corrections TAOSi are calculated via the neural network 1200 shown in FIG. 5. The final target blow-out temperatures TAOi are calculated by the equation (1) based on the TAOBi and TAOi. Therefore, since the radiation amount signal Tsi can be eliminated from the input signals, the number of input signals to the neural network 1100 can be decreased. Then, the number of intermediate layers can be decreased, and the layered structure of the neural network 1100 can be simplified.

Now, it is acceptable to combine above-mentioned two neural networks 1100, 1200 to one neural network to calculate the final target blow-out temperature TAOi directly by the combined neural network, in place of the independent two neural networks 1100, 1200.

Here, the setpoint temperatures (Tset(Dr), Tset(Pa)) of each the first and the second air-conditioning zones, which are input to the first and the second target blow-out temperature calculating portions, require at least one of the setpoint temperatures Tset(Dr) or Tset(Pa) of each air-conditioning zones relative to each calculating portions. It is acceptable for this device to input a temperature difference ΔTseti between the setpoint temperatures Tset(Dr) and Tset (Pa) in addition to the selected the setpoint temperature, or to input both of the setpoint temperatures Tset(Dr) and Tset(Pa).

In other words, at least one of the setpoint temperatures Tset(Dr) or Tset(Pa) of each air-conditioning zones relative to each calculating portions is input. And further a signal, of which reflects an influence from the setpoint temperature of the opposite side air-conditioning zone, is input to calculate the target blow-out temperature.

The first embodiment can be also modified as follows.

(1) The neural network 1100 inputs the ΔTseti, which is temperature difference between the setpoint temperatures Tset(Dr) and Tset(Pa), as one of input signals when the temporary target blow-out temperatures TAOBi are calculated. However, when the Dr side temporary target blow-out temperature TAOB(Dr) is calculated, it is acceptable to input the setpoint temperatures Tset(Dr) and Tset(Pa) instead of the ΔTseti. Also, when the Pa side temporary target blow-out temperature TAOB(Pa) is calculated, it is acceptable to input the setpoint temperatures Tset(Pa) and Tset(Dr) instead of the ΔTseti. This way can also control both temperatures of the area surrounding passengers in the Dr side and Pa side independently and accurately.

(2) In the first embodiment, the blow-out modes of each the Dr side air passage 1007 and the Pa side air passage 1008 are determined independently each other. However, it is acceptable to determine the blow-out modes of each the Dr side air passage 1007 and the Pa side air passage 1008 to identical blow-out mode. In this case, a TAOX, which is an average of the first and the second target blow-out temperatures TAO(Dr) and TAO(Pa), and a TsX, which is an average of the radiation amount TsDr to the Dr side air-conditioning zone and the radiation amount TsPa to the Pa side air-conditioning zone, are input as the input to the neural network 1300 to calculate the blow-out port mode signal TMODE.

(3) In the first embodiment, the blow-out port mode and air amount (blower voltage level) are calculated via the neural networks 1300, 1400. However, it is acceptable to calculate the blow-out port mode and air amount (blower voltage level) by conventional calculation based on the TAOi without neural networks.

(4) The learning method of the neural network can be replaceable with Semi Newton method or the like instead of the above-mentioned back propagation method.

(5) Several of calculations for air-conditioning control are executed via the neural networks 1100–1400. However, it is replaceable with fuzzy control system instead of the neural networks 1100–1400.

That is, in the fuzzy system, both a membership function and a fuzzy rule table are changed. By this changing, the desired outputs at the other input condition are maintained even if the output at the specific input condition is changed, and the output change at the specific input condition does not influence the outputs at the other input conditions. Therefore, it can also control both temperatures of the area surrounding passengers in the Dr side and Pa side (shown in FIGS. 11A, 11B) independently and accurately as well as the air-conditioning device using above-mentioned neural networks.

Here, the air-conditioning device using above-mentioned neural networks is superior to the air-conditioning device using the fuzzy in the point of view of total process of the engineers.

(6) In the first embodiment, the air-mixing doors 1009, 1010, which are the temperature adjuster to adjust the blow-out air temperature to each Dr side air-conditioning zone and the Pa side air-conditioning zone in a passenger component independently, are arranged in the Dr side air passage 1007 and the Pa side air passage 1008 independently. However, it is replaceable with the following structure. That is, the heater cores 1005 are independently arranged in the Dr side air passage 1007 and the Pa side air passage 1008. A Dr side hot water valve is arranged to control amount of hot water flowing into the heater core 1005 of the Dr side air passage 1007 or control a temperature on the hot water. A Pa side hot water valve is arranged to control amount of hot water flowing into the heater core 1005 of the Pa side air passage 1008 or control a temperature on the hot water. Then, the blow-out air temperature to each Dr side air-conditioning zone and the Pa side air-conditioning zone in a passenger component are adjusted independently by the two hot water valves.

(7) The present invention can be adaptable to another air-conditioning device, which has plurality of air-conditioning zone, and is needed to control each of temperature of blow-out air to each zones independently.

(8) The neural networks 1100–1400 are replaceable with recurrent type neural networks.

(Second Embodiment)

Figure 16:
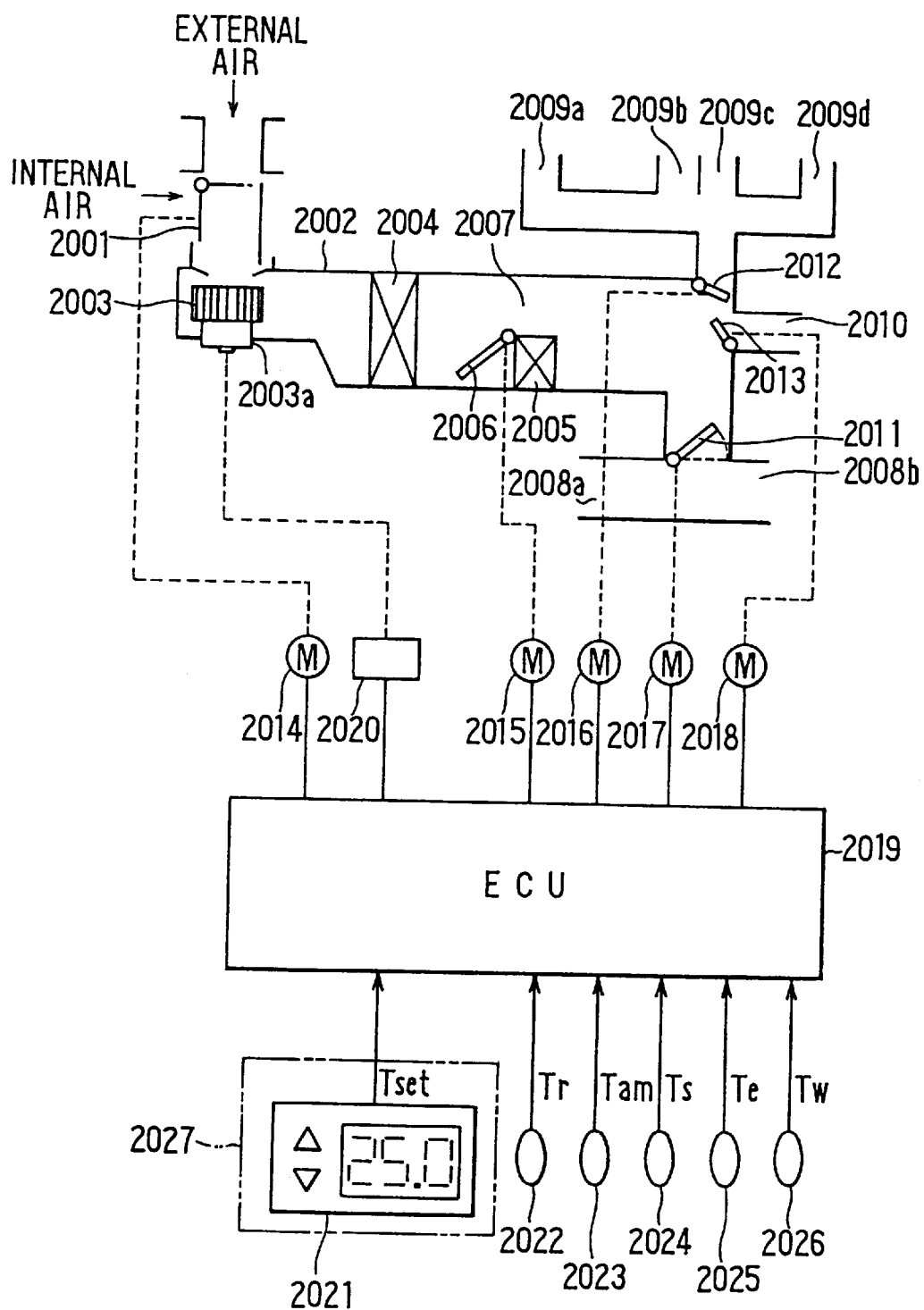
FIG. 16 is a diagram illustrating the constitution of whole system of an air-conditioning device according to a second embodiment of the present invention.

A second embodiment of the present invention will be described hereinafter with reference to FIGS. 16–24 and 26–29. FIG. 16 is a diagram illustrating the constitution of whole system of an air-conditioning device for automobiles. In FIG. 16, an internal air/external air change-over door 2001 is arranged at the most upstream side of air flow in the air-conditioning device for automobiles. One of an external air and an internal air is selectively introduced into an air duct 2002 by moving the door 2001.

The air duct 2002 constitutes an air passage of the air-conditioning device. A blower 2003, an evaporator 2004 and a heater core 2005 are arranged from upstream side to downstream side in the air duct 2002. The evaporator 2004 is a cooling heat exchanger for cooling an air by absorbing an evaporating latent heat of a refrigerant in a refrigerating cycle from air. The heater core 2005 is a heating heat exchanger for heating air with heat from a hot water (engine coolant) from a vehicle engine (not shown).

An air-mixing door 2006 as a temperature adjuster is arranged at the upstream of the heater core 2005. The air-mixing door 2006 adjusts a ratio of two air amount, wherein an amount of heated air passed through the heater core 2005 and an amount of cooled air by-passed the heater core 2005. The adjusting the ratio of heated air and cooled air can adjusts the blow-out air temperature to a passenger component of the automobile.

At the most downstream side of the air duct 2, foot blow-out ports 2008a, 2008b, face blow-out ports 2009a–2009d, and a defroster blow-out port 2010 are provided. Here, the foot blow-out ports 2008a, 2008b are provided to blow the conditioned air onto the feet of the passengers. The face blow-out ports 2009a–2009d are provided at each of center portion and side portion in the passenger component to blow the conditioned air to the upper half of the body of the passengers. The defroster blow-out port 2010 is provided to blow the conditioned air to a windshield.

At the most downstream side of the air duct 2002, blow-out port change-over doors 2011–2013 are arranged to selectively open/close the blow-out ports 2008a, 2008b and 2009a–2009d. Each of predetermined blow-out modes, such a FACE mode (FACE), a BI-LEVEL mode (B/L mode), a FOOT mode (FOOT), and a defroster mode or the like can be set by changing the open/close condition of the doors 2011–2013.

Here, a control system for controlling the air-conditioning device will be explained. The internal air/external air changing door 2001, the air-mixing door 2006, and the blow-out port change-over doors are driven by servomotors 2014–2018. The servomotors 2014–2018 are controlled by outputs of an air-conditioning electric control device 2019 (hereinafter, called "ECU 2019"). A motor 2003a of the blower 2003 is also controlled by the output of the ECU 2019 via a motor control circuit (motor applied voltage control circuit) 2020.

An air amount blown by the blower 2003 is adjusted by the motor control circuit 2020 by way of changing a rotation speed of the motor with an applied voltage to the motor. The ECU 2019 includes a microcomputer and its peripheral circuits.

A temperature setter 2021 is provided to set a setpoint temperature Tset of the passenger component, which is input to the ECU 2019. The temperature setter 2021 is arranged an air-conditioning control panel 2027, and is manually controlled by users.

As temperature data detectors, the following sensors are provided. That is, an internal air sensor 2022 is provided to detect an internal air temperature Tr. An external air sensor 2023 is provided to detect an external air temperature Tam. A radiation sensor 2024 is provided to detect an amount of (solar) radiation Ts to the passenger component. An evaporator temperature sensor 2025 is provided to detect a cooling temperature Te (blow-out air temperature) of the evaporator 2004. A water temperature sensor 2026 is provided to detect a water temperature Tw of hot water flowing into the heater core 2005.

Figure 17:
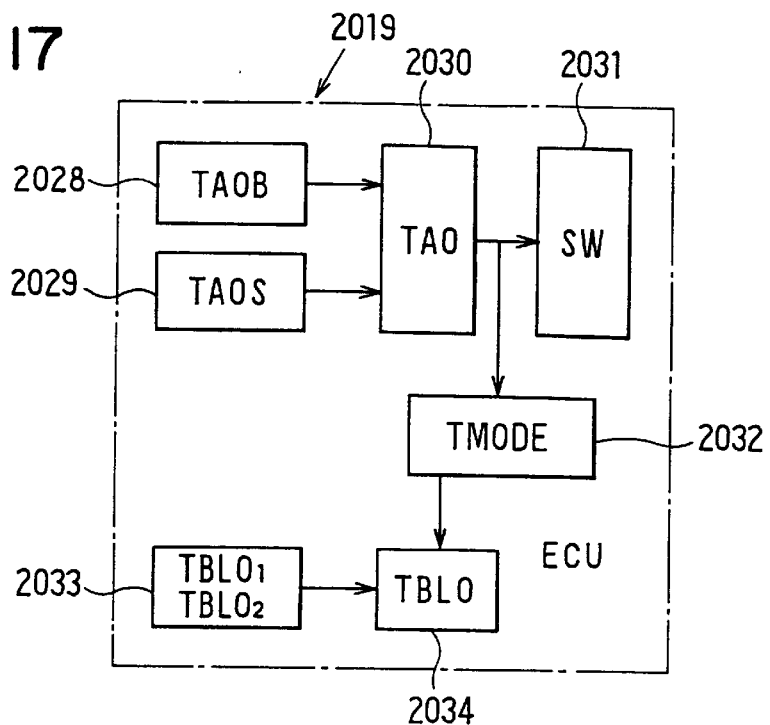
FIG. 17 is a block diagram of main functions of the second embodiment.

Control functions processed by the microcomputer in the ECU 2019 is generally divided as shown in FIG. 17. The ECU 2019 includes a temporary target temperature calculating portion 2028, a radiation amount correction calculating portion 2029, a target temperature calculating portion 2030, an air-mixing door opening degree calculating portion 2031, a blow-out port mode calculating portion 2032, an air amount calculating portion 2033, and an air amount selecting portion 2034.

Here, the temporary target temperature calculating portion 2028 calculates a temporary target blow-out temperature, and includes a neural network 2100 as shown in FIG. 20. The temporary target temperature calculating portion 2028 inputs signals including the setpoint temperature Tset, the internal air temperature Tr and the external air temperature Tam, and calculates the temporary target blow-out temperature TAOB based on the input signals via the neural network 2200.

The radiation amount correction calculating portion 2029 calculates a radiation amount correction TAOS, and includes a neural network 2300 as shown in FIG. 21. The radiation amount correction calculating portion 2029 inputs signals including the setpoint temperature Tset, the internal air temperature Tr, the external air temperature Tam and the radiation amount Ts (output signal of the radiation sensor 2024). Then the radiation amount correction calculating portion 2029 calculates the radiation amount correction TAOS based on the input signals via the neural network 2300.

The target temperature calculating portion 2030 calculates the final target blow-out temperature TAO based on the output signals from the temporary target temperature calculating portion 2028 and the radiation amount correction calculating portion 2029.

The air-mixing door opening degree calculating portion 2031 calculates an air-mixing door opening degree SW based on the final target blow-out temperature TAO from the target temperature calculating portion 2030.

Figure 22:
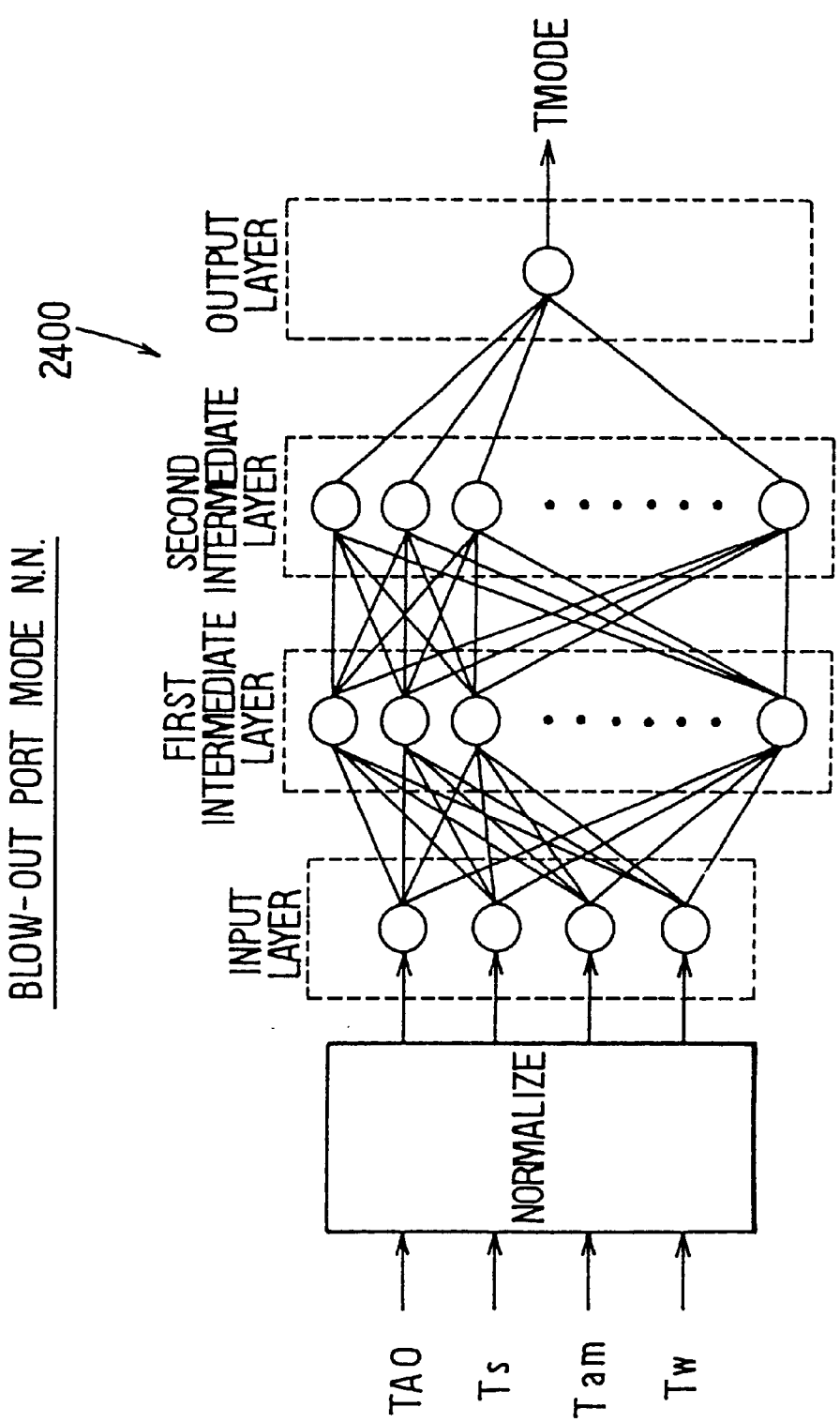
FIG. 22 is a schematic diagram of a neural network of blow-out port mode calculating portion of the second embodiment.

The blow-out port mode calculating portion 2032 calculates a blow-out port mode TMODE, and includes a neural network 2400 as shown in FIG. 22. The blow-out port mode calculating portion 2032 inputs the final target blow-out temperature TAO from the target temperature calculating portion 2030 and the detected information, which is the circumstance factor to influence a temperature sensitively of the passenger such as the radiation amount Ts, the external air temperature Tam and the water temperature Tw. Then the blow-out port mode calculating portion 2032 calculates the blow-out port mode TMODE via the neural network 2400.

The air amount calculating portion 2033 includes a neural network 2100 as shown in FIG. 18. The air amount calculating portion 2033 inputs signals including a temperature difference TD between the setpoint temperature Tset and the internal air temperature Tr (i.e., Tr−Tset), the radiation amount Ts and the external air temperature Tam. Then the air amount calculating portion 2033 calculates a blower voltage, which decides an air amount via the neural network 2100. In detail, the air amount calculating portion 2033 calculates a blower voltage $TBLO_1$ for the FACE, B/L modes, and a blower voltage $TBLO_2$ for the FOOT mode, independently.

The air amount selecting portion 2034 selects one of the blower voltage $TBLO_1$ and the blower voltage $TBLO_2$ based on the blow-out port mode, and output the selected one as a blower voltage TBLO.

The constitutions of the neural networks 2100–2400 will be explained. Since the constitutions of the neural networks 2100–2400 are substantially equal, these constitutions are explained based on the neural network 2100 with reference to FIGS. 18, 19A, 19B.

As shown in FIG. 18, the neural network 2100 includes an input layer 2101, a first intermediate layer 2102, a second intermediate layer 2103, and output layer 2104. Each of the input layer 2101, the first and the second intermediate layers 2102, 2103 has a plurality of neurons 2105, and output layer has one neuron 2105. Each of neurons 2105 in the input layer 2101 is connected to each of neurons 2105 in the first intermediate layer 2102 with a certain link coefficient (synapse weight) 2106. Similarly, each of neurons 2105 in the first intermediate layer 2102 is connected to each of neurons 2105 in the second intermediate layer 2103 with a certain link coefficient 2106. Each of neurons 2105 in the second intermediate layer 2103 is connected to the neuron 2105 in the output layer 2104 with a certain link coefficient 2106. These neurons 2105 are formed by memories in the ECU 2019 in an actual circuit, and the neural network 2100 is formed by combined memories.

The neural network 2100, which is a network having a layered structure, has a Back Propagation Learning Function. This learning function can automatically correct the link coefficients 2106 between each neurons among the input layer 2101, the first and second intermediate layers 2102, 2103, and output layer, so as to adjust its output to a desired value (teacher signal) related to input signals such as TD, Ts, Tam.

When the teacher signal is changed, the link coefficients 2106 are adjusted by repeatedly "learning" so as to correct the output to be the changed teacher signal related to the input signals. In other words, based on a large number of desired data (teacher signals), a correlation function (link coefficients 2106) is automatically generated. The teacher signals are determined to desired values obtained by an experience or the like (desired output for the input signals).

In the layered structure neural network 2100, there is no connection among each of the neurons 2105 in an identical layer, but the neurons 2105 in each layer are connected to only neurons 2105 in forward and backward layers. The clink coefficients 2106 between each neuron 2105 in each layer represent a weight of connection (magnitude). The larger the weight of connection, the larger an amplitude of signal, which is output from each neuron 2105 and propagated to neurons 2105 in backward layer.

Here, the input signals (TD, Ts, Tam) are normalized to 0–1 value before inputting to the neural network 2100 by a normalize portion 2107. The output signal from the neural network 2100 is transformed in reverse procedure of the normalize portion 2107 by output transform portions 2108a, 2108b. For example, actual detected internal temperature Tr detected by the internal air sensor is normally in a range from 0° C. to 50° C. This detected value is assigned to a certain value in a range from 0 to 1 in the normalize portion 2107, and is output to the input layer 2101 in the neural network 2100. Since the output signal from the output layer 2104 is a value in the range from 0 to 1, this output signal is transformed to the actual value corresponding to the sensor signal in the reverse procedure by using a predetermined transformation map in the output transform portions 2108a, 2108b.

Here, the output layer 2104 of the neural network 2100 for the air amount calculation includes two output neurons 2105a, 2105b. The neural network 2100 outputs the blower voltage $TBLO_1$ for the FACE, B/L modes and the blower voltage $TBLO_2$ for the FOOT mode, independently, via the two output transform portions 2108a, 2108b.

The environment conditions, of which the air-conditioning device for vehicle faces, are variable, as described above. Therefore, the number of the teacher signals, which are desired values related to the various environment conditions, will be enormously.

Therefore, in a designing process of the ECU 2019, the learning is executed by a high-speed calculator including a neural network, which is the same as the neural network 2100, before being mounted to the vehicle. The high-speed calculator calculates the link coefficients 2106 so that the output of the neural network is to be desired teacher signals for various input signals. Then, the calculated coefficients 2106 are memorized in a memory portion (ROM) corresponding to each neural network 2100, 2200, 2300, 2400 in each of the calculating portions of the ECU 2019 shown in FIG. 17.

Therefore, when the ECU 2019 is mounted on the vehicle, the link coefficients 2106 among the neurons 2105 in each layer of the neural networks 2100–2400 are set to predetermined value.

Figure 19A:
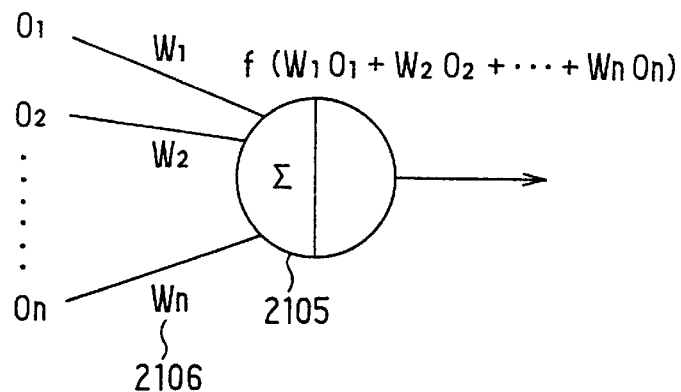
FIGS. 19A, 19B are diagram and graph for explaining an output calculating procedure of neural network.
Figure 19B:
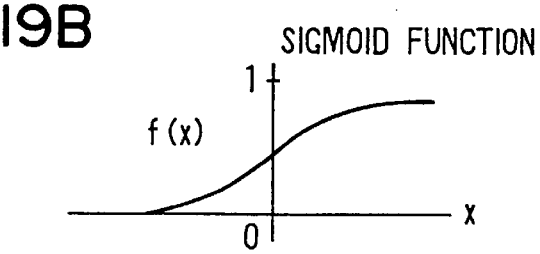

After being mounted on the vehicle, the neural networks 2100–2400 in each layer calculate an output for input signals as shown in FIG. 19A. Specifically, in each of the neurons 2105, each of the input signals $O_1$–$O_n$ is multiplied by each of the corresponding coefficients 2106 ($W_1$–$W_n$), and multiplied value are adapted to a so-called sigmoid function as shown FIG. 19B. The calculated results of the sigmoid function are output to the neurons 2105 in backward layer. These calculations are repeated between each layer to decide a final output.

Since the neural network 2100 in each calculating portion of mounted ECU 2019 is previously set so that the desired value for the various input signals $O_1$–$O_n$ on can be obtained, learning for correction of the link coefficients is not needed.

The neural networks 2100 as shown in FIG. 18 of the air amount calculating portion 2033 calculates and outputs the desired value as the blower voltage levels $TBLO_1$, $TBLO_2$, in relation to the changes of input signals (TD, Ts, Tam).

The neural network 2200 of the temporary target temperature calculating portion 2028 outputs the desired teacher signals as the temporary target blow-out temperature TAOB in relation to the change of the input signals (Tseti, Tr, Tam).

The neural network 2300 of the radiation correction calculating portion 2029 outputs the desired teacher signals as the radiation amount correction TAOS in relation to the change of the input signals (Tset, Tr, Tam, Ts).

The neural networks 2400 as shown in FIG. 22 of the blow-out port mode calculating portion 2032 calculates and outputs the desired value as the blow-out port mode signal TMODE in relation to the changes of input signals (TAO, Ts, Tam, Tw).

In the target temperature calculating portion 2030, the final target blow-out temperature TAO is calculated by the following equation:

$$TAO = TAOB - TAOS \tag{3}$$

In the air-mixing door opening degree calculating portion 2031, the air-mixing door opening degree SW is calculated based on the TAO from the target temperature calculating portion 2030, the temperature Te of the evaporator 2004, and the water temperature Tw of the heater core 2005, by using the following equation:

$$Sw(\%) = (TAO - Te)/(Tw - Te) \times 100 \tag{4}$$

Figure 23:
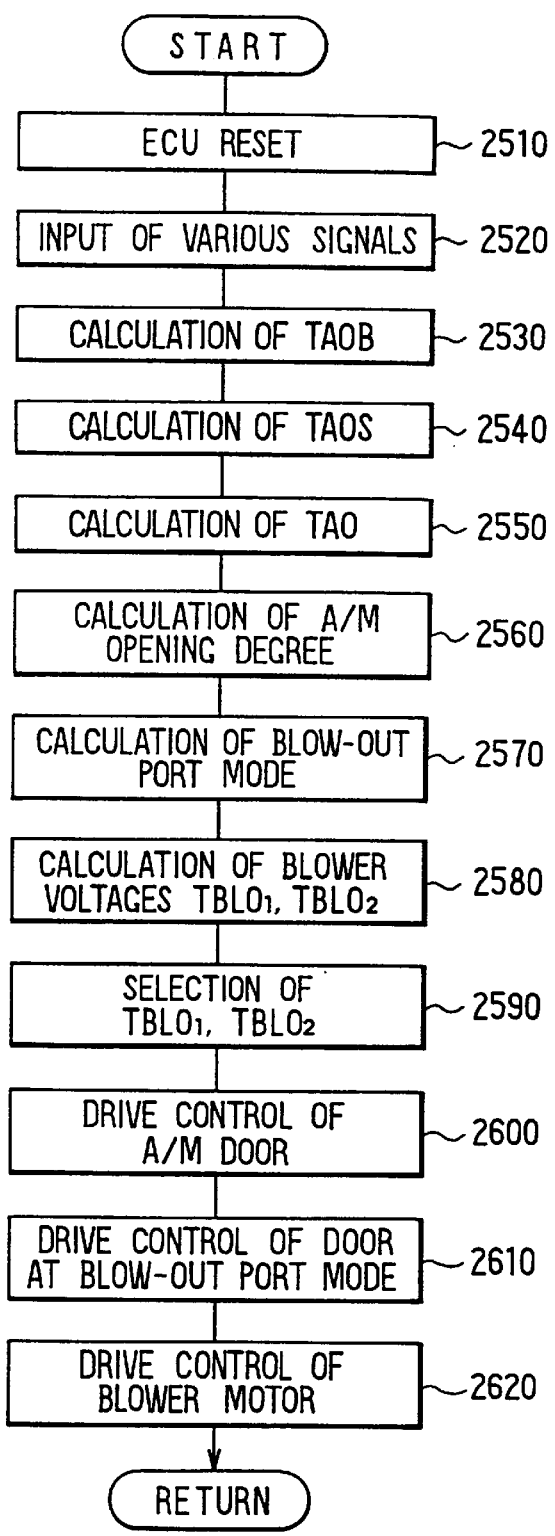
FIG. 23 is a flow chart illustrating a control flow according to the second embodiment.

The control flow according to the preferred embodiment will be explained with reference to a flow chart shown in FIG. 23. This control routine starts from a control switch signal, which starts the air-conditioning device.

At step 2510, the air-conditioning ECU 19 is reset. At step 2520, the ECU 2019 inputs the output signals from each sensor such as the internal air temperature Tr, the external air temperature Tam, and the signals from the temperature setter 2021.

At step 2530, the temporary target blow-out temperature TAOB is calculated via the neural network 2200, shown in FIG. 20. The step 2530 corresponds to the temporary target temperature calculating portion 2028 in FIG. 17.

At step 2540, the radiation amount correction TAOS is calculated via the neural network 300, shown in FIG. 21. The step 2540 corresponds to the radiation amount correction calculating portion 2029 in FIG. 17.

At step 2550, the final target blow-out temperature TAO is calculated by the equation (3). The step 2550 corresponds to the second target temperature calculating portion 2030 in FIG. 17.

At step 2560, the air-mixing door opening degree SW is calculated by the equation (4). The step 2560 corresponds to the air-mixing door opening degree calculating portion 2031 in FIG. 17.

Figure 24:
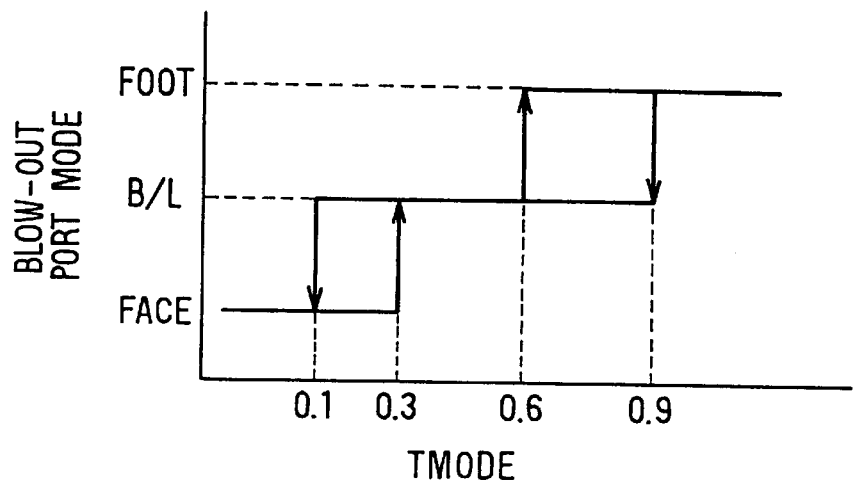
FIG. 24 is a diagram of characteristics illustrating a calculation of the blow-out port mode according to the second embodiment.

At step 2570, the blow-out port mode signal TMODE is calculated via the neural network 2400, shown in FIG. 22. The step 2570 corresponds to the blow-out port mode calculating portion 2032 in FIG. 17. Here, outputs in the blow-out port mode signal TMODE have characteristics that this output increases in proportion to an increasing of the target blow-out temperature TAO. One of a face mode (FACE), a bi-level mode (B/L), and a foot mode (FOOT), which are shown in FIG. 24, is determined based on the output TMODE from the neural network 2400.

At step 2580, the blower voltage $TBLO_1$ for the FACE, B/L modes and the blower voltage $TBLO_2$ for the FOOT mode are calculated, independently, via the neural network 2100, shown in FIG. 18. The step 2580 corresponds to the air amount calculating portion 2033 in FIG. 17.

At step 2590, one of the blower voltage $TBLO_1$ and the blower voltage $TBLO_2$ is selected based on the blow-out port mode TMODE calculated in the step 2570. The step 2590 corresponds to the air amount selecting portion 2034 in FIG. 17.

At steps 2600–2620, each of actuators such as motors 2014–2018 and the motor applied voltage control circuit 2020 as shown in FIG. 16 are controlled so as to correspond to the above-mentioned calculated values.

Figure 25:
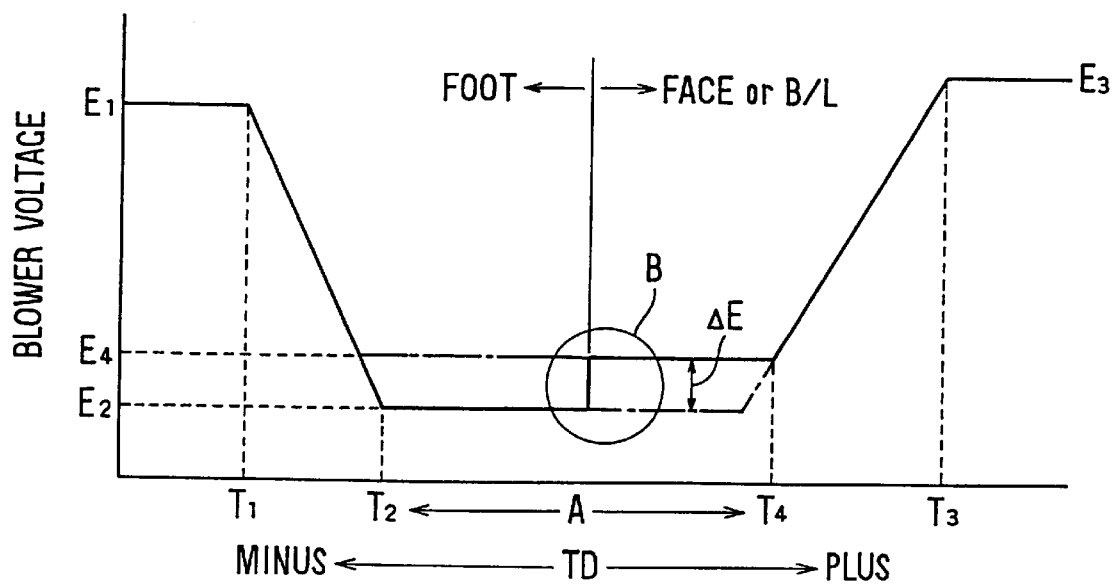
FIG. 25 is a diagram of characteristic illustrating a relationship between a switching of blow-out port mode and a blower voltage (air amount)

FIG. 25 shows the relation between the blower voltage level for deciding the air amount and the temperature difference TD (=Tr−Tset), as described the above. The temperature difference TD of the abscissa can be replaced with the internal air temperature Tr. When the internal air temperature is used as the abscissa, the right side of the abscissa represents a high temperature side, and the left side of the abscissa represents a low temperature side.

An operation when the FOOT mode is selected in a heating operation in winter will be explained. At just after the heating starts, the blower 2003 starts with the blower voltage=$E_1$, as shown in FIG. 25. After the internal air temperature Tr rises and reaches $T_1$, the blower voltage decreases from $E_1$ in proportion to temperature rising. After the internal air temperature reaches $T_2$, and approaches the setpoint temperature Tset, the operation is set to a normal operation area A, and the blower voltage is set to the minimum voltage $E_2$.

An operation when the FACE mode is selected in a cooling operation in summer will be explained. At just after the cooling starts, the blower 2003 starts with the blower voltage=the maximum voltage $E_3$ ($E_3 > E_1$). After the internal air temperature Tr falls and reaches $T_3$, the blower voltage decreases from $E_3$ in proportion to temperature falling. After the internal air temperature reaches $T_4$, and approaches the setpoint temperature Tset, the operation is set to a normal operation area A, and the blower voltage is set to voltage $E_4$.

Here, the voltage $E_4$ is set to high comparing to the voltage $E_2$, which is the FOOT mode voltage, so that the air amount increases in proportion to the radiation amount. The air amount can be increased in proportion to the voltage difference $\Delta E$ between the voltage $E_4$ and voltage $E_2$, and can be increased a cooling feeling of the passenger during the radiation in the FACE mode.

In FIG. 25, a blower voltage characteristic of the FACE mode has a voltage change of $E_3 \rightarrow E_4 \rightarrow E_1$, and one of them is determined by the blower voltage level $TBLO_1$. A blower voltage characteristic of the B/L mode using in intermediate season such as spring or autumn is the same as that of FACE mode so that the cooling feeling of the passenger can be increased during the radiation.

The voltage difference $\Delta E$ between the voltage $E_4$ and voltage $E_2$ continuously change in proportion to the amount on radiation Ts. Therefore, when the FACE mode or the B/L mode and the radiation amount Ts=0, the blower voltage decreases to $E_2$ level and then set to the same voltage as that of the FOOT mode at the normal operation area A.

A blower voltage characteristic of the FOOT mode has a voltage change of $E_1 \rightarrow E_2 \rightarrow E_3$ independent of the radiation amount, and one of them is determined by the blower voltage level $TBLO_2$.

Here, during the normal operation area A, if there is the radiation, when the blow-out port mode is changed among the FACE mode, B/L mode and the FOOT mode, the blower voltage may be changed step by step. However, in this embodiment, the blower voltage level $TBLO_1$ for the FACE mode or B/L mode and the blower voltage level $TBLO_2$ for the FOOT mode are always calculated via the neural network 2100, independently. Hence, the blower voltage level $TBLO_1$ for the FACE mode or B/L mode can be changed continuously in proportion to the radiation amount Ts.

Therefore, since it is not needed to change the output step by step during the calculation of the blower voltage level $TBLO_1$, the learning for calculating the link coefficient 2106 of the neural network 2100 can be simplified.

Furthermore, in this embodiment, the temperature difference TD (=Tr−Tset) between the setpoint temperature Tset and the internal air temperature Tr is calculated, and then the calculated value is input to the neural network 2100. Therefore, the number of input to the neural network 2100 can be decreased compared to an input way inputting both of the Tset and the Tr.

Here, it may need to input both of the setpoint temperature Tset and the internal air temperature Tr to detect whether the operation area is in a transition area, which is just after the air-conditioning device starts (the internal air temperature is changing to the setpoint temperature), or the normal operation area.

However, in this embodiment, this condition (the operation area is in the normal operation area) can be detected from the fact that the temperature difference TD between the internal air temperature Tr and the setpoint temperature Tset reaches substantially zero. Therefore, this embodiment can easily detect whether the transition area or the normal operation by inputting the temperature difference TD.

Since the number of input is decreased, the number of the layer in the neural network can be also decreased, the link coefficient can be decreased by about 25%, and the total learning time for calculating the link coefficient 2106 can be decreased largely.

It is acceptable to input both the setpoint temperature Tset and the internal air temperature Tr replaced with the temperature difference TD to the neural network 2100, if an increasing of the number of the input would be less than allowable condition.

The two blower voltage levels $TBLO_1$ and $TBLO_2$ can be calculated by using independent two neural networks 2100 replaced with the calculation by using one neural network 2100. However, it is preferable to use one neural network 2100 as this embodiment, because using one neural network 2100 does not need further process to set two neural network independently or further memories.

According to an investigation on an air amount control at the transition area just after the air-conditioning device starts in summer (so-called cool down), the following facts are found. That is, at the point the blower voltage decreases from $E_3$ (TD=$T_3$) in FIG. 25, an air-conditioning feeling for the passenger can be further improved by changing the blower voltage level based on a heat load condition at the start timing of the air-conditioning device. This mechanism will be explained hereinafter with reference to FIGS. 26–29.

FIGS. 26–29 show a characteristic of a target blower voltage (air amount) based on an average of the air amount, of which a plurality of monitor people feels comfort. In FIGS. 26–29, the ordinate represents the blower voltage (V), the abscissa represents the temperature difference TD (° C.).

Figure 26:
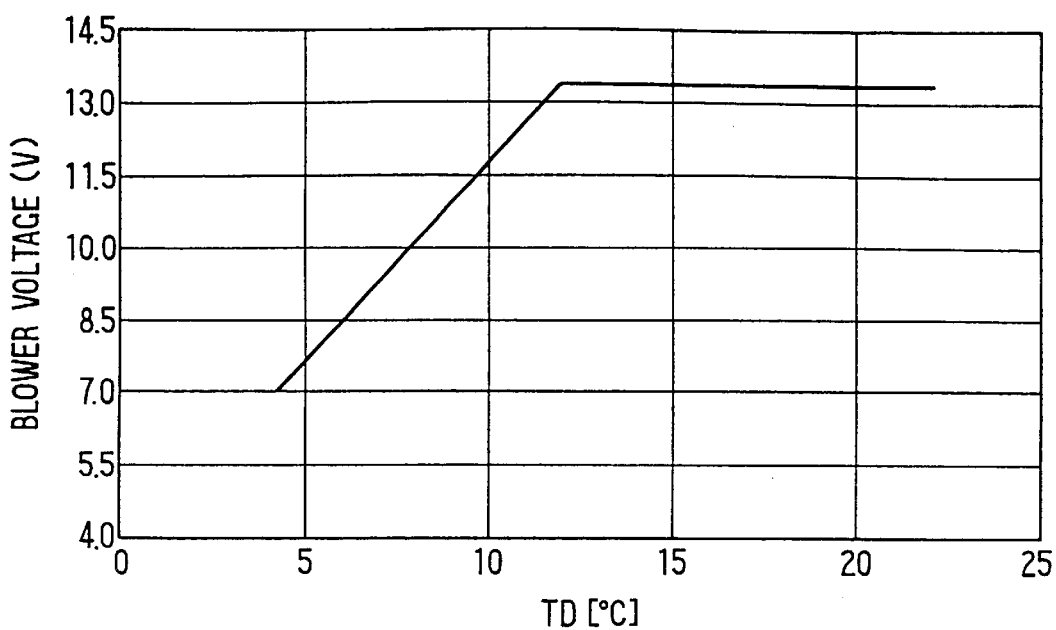
FIGS. 26–29 are diagrams of characteristic illustrating relationships between the blower voltage (air amount) and a temperature difference TD just after starting the air-conditioning in summer.

A result shown in FIG. 26 is measured under the following heat load condition. That is, at the start timing of the air-conditioning device, the external air temperature Tam is 20° C., the radiation amount Ts is 1000 W/m$^2$, initial internal air temperature Tr is 50° C., and the setpoint temperature Tset is 25° C. An air-conditioning load due to both of the external air temperature Tam and the radiation amount Ts is largest in this condition among conditions shown in FIGS. 26–29.

As shown in FIG. 26, it takes long time to reduce the temperature difference TD of which just after air-condition starts, when the air-conditioning load at the start timing of the air-conditioning device is large. Therefore, the blower voltage (air amount) is kept its maximum value (e.g., 13.3V) for a long time. In this situation, cooled air from the face blow-out ports 2009a–2009d is kept blowing to the passenger's face strongly for a while, when the FACE mode is selected. Then, the passenger may not feel comfort due to an excessive cooled air.

Therefore, in the case when the air-conditioning load at the start timing of the air-conditioning device is large, a decreasing point of TD at which starts to decrease the blower voltage is set large so that the blower voltage starts to decrease early. That is, the blower voltage (amount on air) starts to decrease at the point the TD=12° C.

Figure 27:
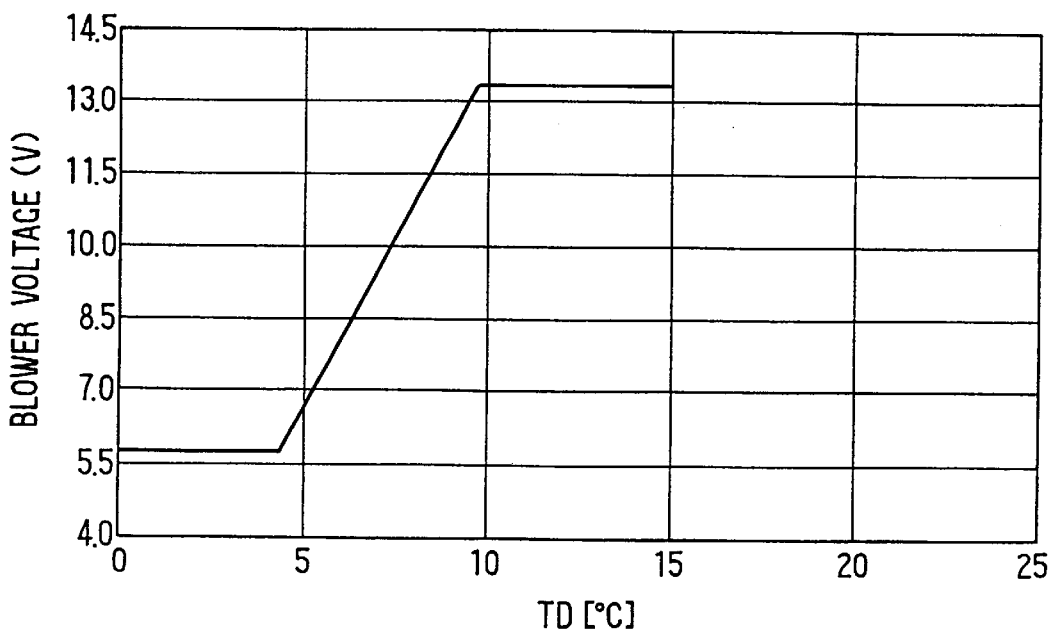

A result shown in FIG. 27 is measured under the following heat load condition. That is, at the start timing of the air-conditioning device, the external air temperature Tam is 20° C., the radiation amount Ts is 500 W/m², initial internal air temperature Tr is 40° C., and the setpoint temperature Tset is 25° C. An air-conditioning load due to both of the external air temperature Tam and the radiation amount Ts is in intermediate. In this characteristic, the blower voltage (amount on air) starts to decrease at the point the TD=9.5° C.

Figure 28:
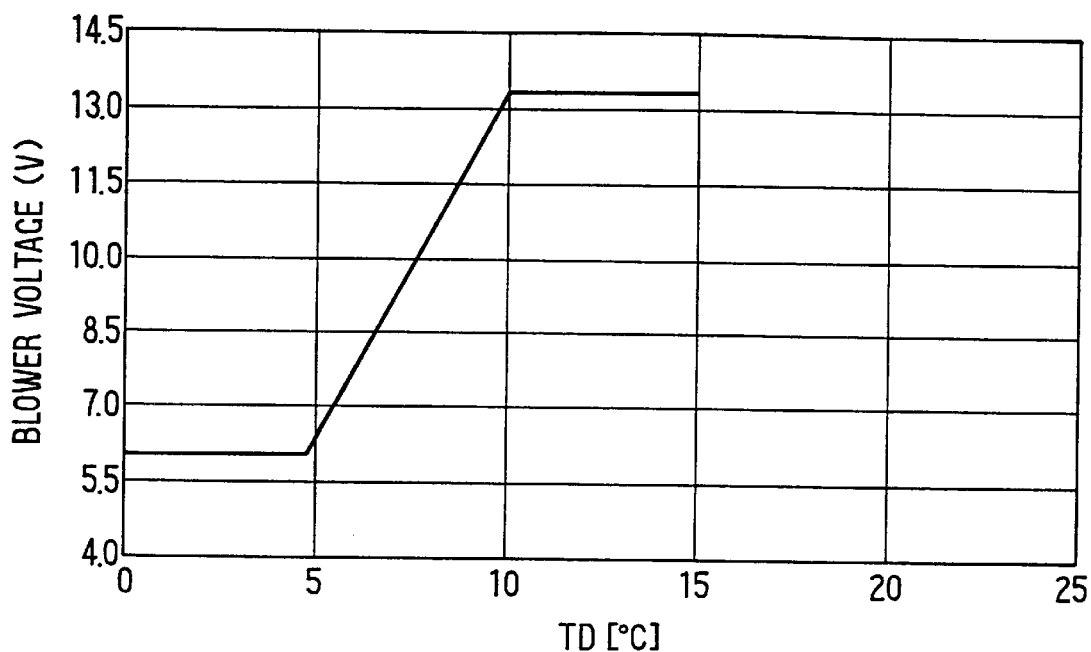

A result shown in FIG. 28 is measured under the following heat load condition. That is, at the start timing of the air-conditioning device, the external air temperature Tam is 10° C., the radiation amount Ts is 1000 W/m², initial internal air temperature Tr is 40° C., and the setpoint temperature Tset is 25° C. An air-conditioning load due to both of the external air temperature Tam and the radiation amount Ts is also in intermediate. In this characteristic, the blower voltage (amount on air) starts to decrease at the point the TD=10° C.

Figure 29:
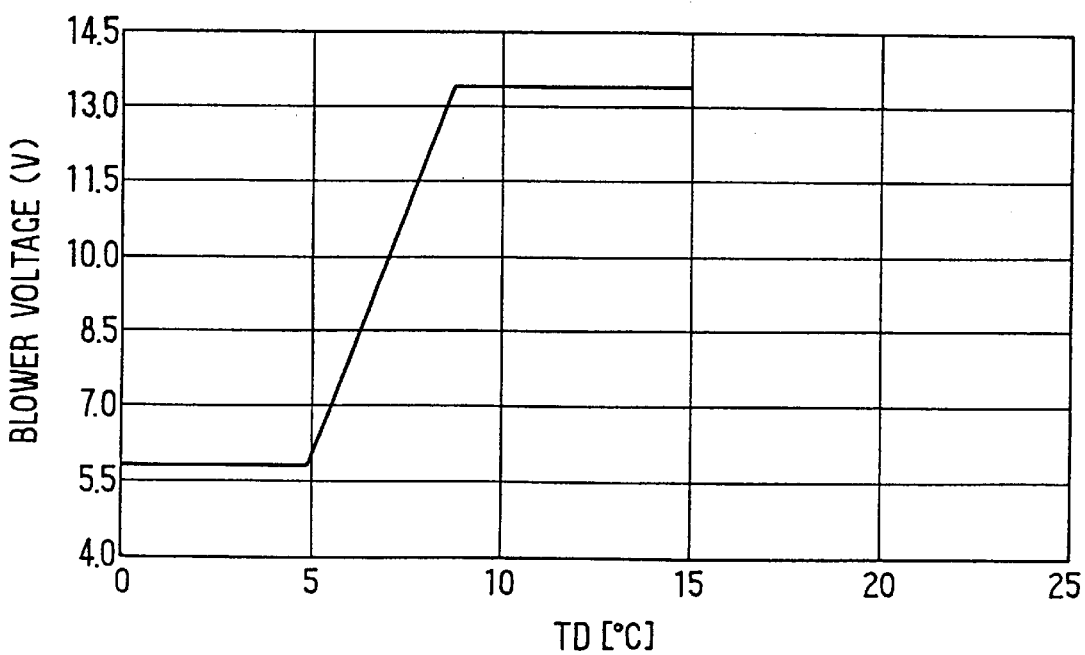
Figure 30:
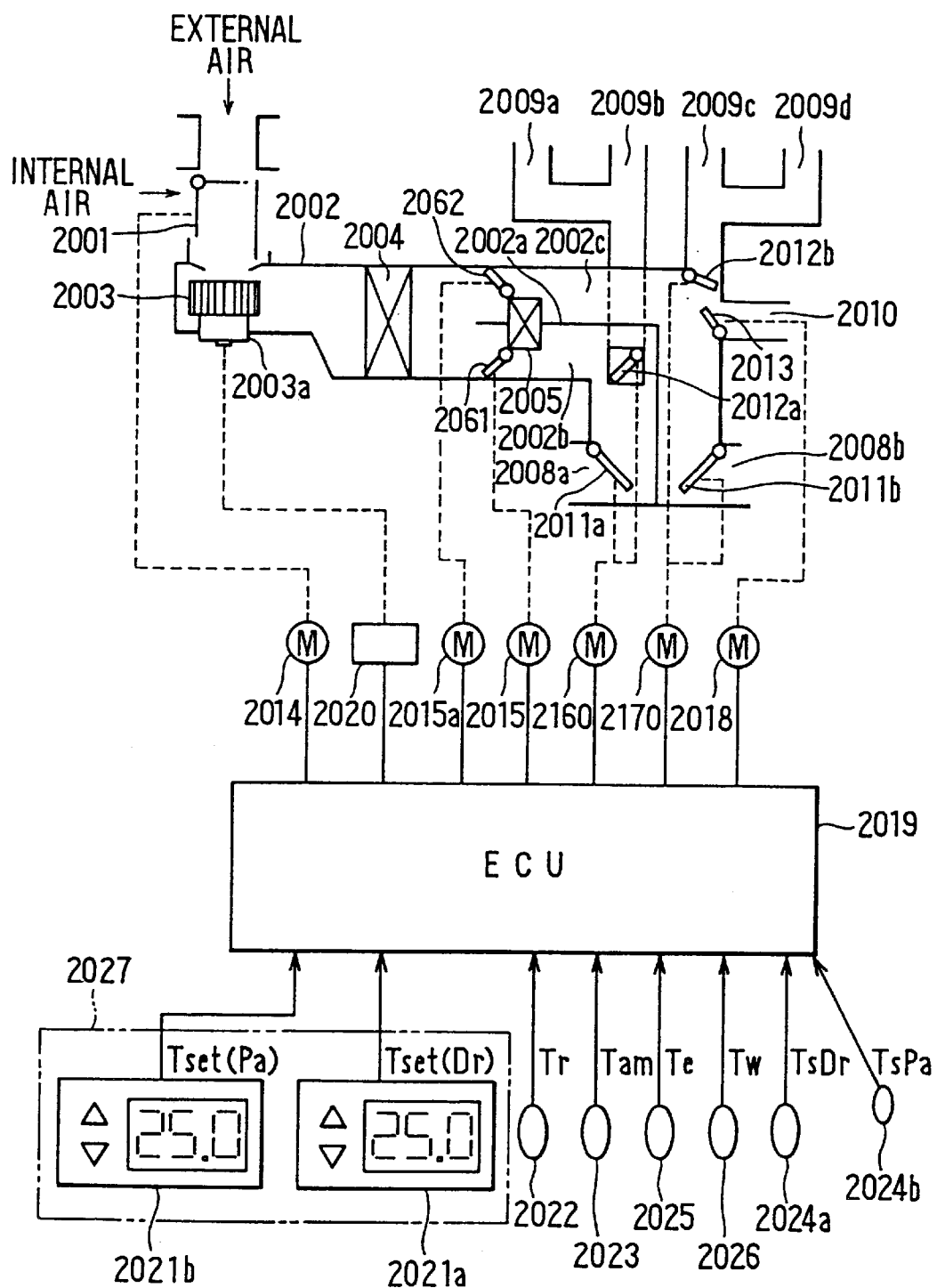
FIG. 30 is a diagram illustrating the constitution of whole system of an air-conditioning device according to a third embodiment of the present invention.

A result shown in FIG. 29 is measured under the following heat load condition. That is, at the start timing of the air-conditioning device, the external air temperature Tam is 10° C., the radiation amount Ts is 500 W/m², initial internal air temperature Tr is 40° C., and the setpoint temperature Tset is 25° C. An air-conditioning load due to both of the external air temperature Tam and the radiation amount Ts is smallest. In this characteristic, the blower voltage (amount on air) starts to decrease at the point the TD=7.5° C.

As described above, the decreasing point of TD during the cool down is set gradually small in proportion to decreasing the air-conditioning load at the start timing of the air-conditioning device. Then, it can determine a suitable period that the blower voltage is set at the maximum value during the cool down, and a feeling of the cooling can be improved.

Here, in FIGS. 26–29, the air amount is based on the temperature difference TD. However, one of the target blow-out temperature TAO, the internal air temperature Tr and so on can be used to determined to the air amount replaced with the temperature difference TD. That is, both the temperature difference TD and the target blow-out temperature Tr change in proportion to the change of the internal air temperature Tr during the cool down. Therefore, another data can be replaceable with the temperature difference TD as long as it changes in proportion to the change of the internal air temperature.

Further, in FIGS. 26–29, the characteristic of the air amount during the cool down in the FACE mode is explained. However, the passenger may manually switch the blow-out port mode to B/L mode during a high heat load condition in summer. Therefore, these characteristics are adaptable to the high heat load condition in the B/L mode.

Here, the neural network has the learning function, which adjusts the link coefficients 2106 (synapse weights) between each neurons in each layers in the neural network automatically to correct its output to be desired data. Therefore, the output at a specific input condition can be adjusted, by changing the teacher signal at the specific input condition and then adjusting the link coefficients 2106 (synapse weights) automatically in advance.

Furthermore, since the neural network adjusts its whole link coefficients 2106 so that the desired outputs at the other input condition are maintained even if the output at the specific input condition is changed. Therefore, the output change at the specific input condition does not influence the outputs at the other input conditions. Consequently, desired characteristic of the air amount can be achieved easily for a wide range of input change due to a change of automobile circumstance condition.

(Third Embodiment)

In this embodiment, the present invention is adopted to an air-conditioning device for automobiles, which is capable of controlling independently between a driver seat (Dr) side air-conditioning zone and a passenger seat (Pa) side air-conditioning zone in a passenger component.

In an air-duct 2002, a partitioning wall 2002a is arranged from the heater core 2005 portion to its downstream side in the air duct 2002 to divide it into a Dr side air passage 2002b and a Pa side air passage 2002c.

A Dr side air-mixing door 2061 is arranged at the upstream side of the heater core 2005 in the Dr side air passage 2002b. The Dr side air-mixing door 2061 adjusts a ratio of two air amount in the Dr side air passage 2002b, an amount of heated air passed through the heater core 2005 and an amount of cooled air by-passed the heater core 2005. A Pa side air-mixing door 2062 is arranged at the upstream of the heater core 2005 in the Pa side air passage 2002c, and adjusts a ratio of two air amount in the Pa side air passage 2002c. Here, the two air amount are an amount of heated air passed through the heater core 2005 and an amount of cooled air by-passed the heater core 2005.

At the most downstream side of the Dr side air passage 2002b, a foot blow-out port 2008a, face blow-out ports 2009a, 2009b are provided. At the most downstream side of the Pa side air passage 2002c, a foot blow-out port 2008b, face blow-out ports 2009c, 2009d are provided. Blowout port change-over doors 2011a, 2012a are arranged to selectively open/close the Dr side foot blow-out port 2008a and the face blow-out ports 2009a, 2009b. Blowout port change-over doors 2011b, 2012b are arranged to selectively open/close the Pa side foot blow-out port 2008b and the face blow-out ports 2009c, 2009d. A defroster blow-out port 2010 and its blow-out port change-over door 13 are provided in the same way as the second embodiment.

The Dr side air-mixing door 2061 and the Pa side air-mixing door 2062 are driven by independent servomotors 2015 and 2015a. The Dr side blow-out port change-over doors 2011a, 2012a and the Pa side blow-out port change-over doors 2011b, 2012b are driven by independent servomotors 2160 and 2170. Each of predetermined blow-out mode, such as a FACE mode (FACE), a BI-LEVEL mode (B/L mode), and a FOOT mode (FOOT) or the like can be set with respective to each ports 2002c, 2002c, independently, by changing the open/close condition of the blow-out port change-over doors 2011a, 2012a, 2011b and 2012b.

A Dr side temperature setter (first temperature setter) 2021a is provided to set a setpoint temperature Tset(Dr) of the Dr side air-conditioning zone relative to the Dr side air passage 2002b, and output the setpoint temperature Tset(Dr) to the ECU 2019. A Pa side temperature setter (second temperature setter) 2021*b* is provided to set a setpoint temperature Tset(Pa) of the Pa side air-conditioning zone relative to the Pa side air passage 2002*c*, and output the setpoint temperature Tset(Pa) to the ECU 2019. Both temperature setters 2021*b*, 2021*c* are provided independently each other.

A Dr side radiation sensor 2024*a* is arranged to detect a radiation amount TsDr to the Dr side air-conditioning zone, and a Pa side radiation sensor 2024*b* is arranged to detect a radiation amount TsPa to the Pa side air-conditioning zone.

As temperature data detectors, an internal air sensor 2022 to is arranged detect an internal air temperature Tr. An external air sensor 2023 is arranged to detect an external air temperature Tam. An evaporator temperature sensor 2025 is arranged to detect a cooling temperature (blow-out air temperature) of the evaporator 2004. A water temperature sensor 2026 is arranged to detect a temperature Tw of hot water flowing into the heater core 2005.

Figure 31:
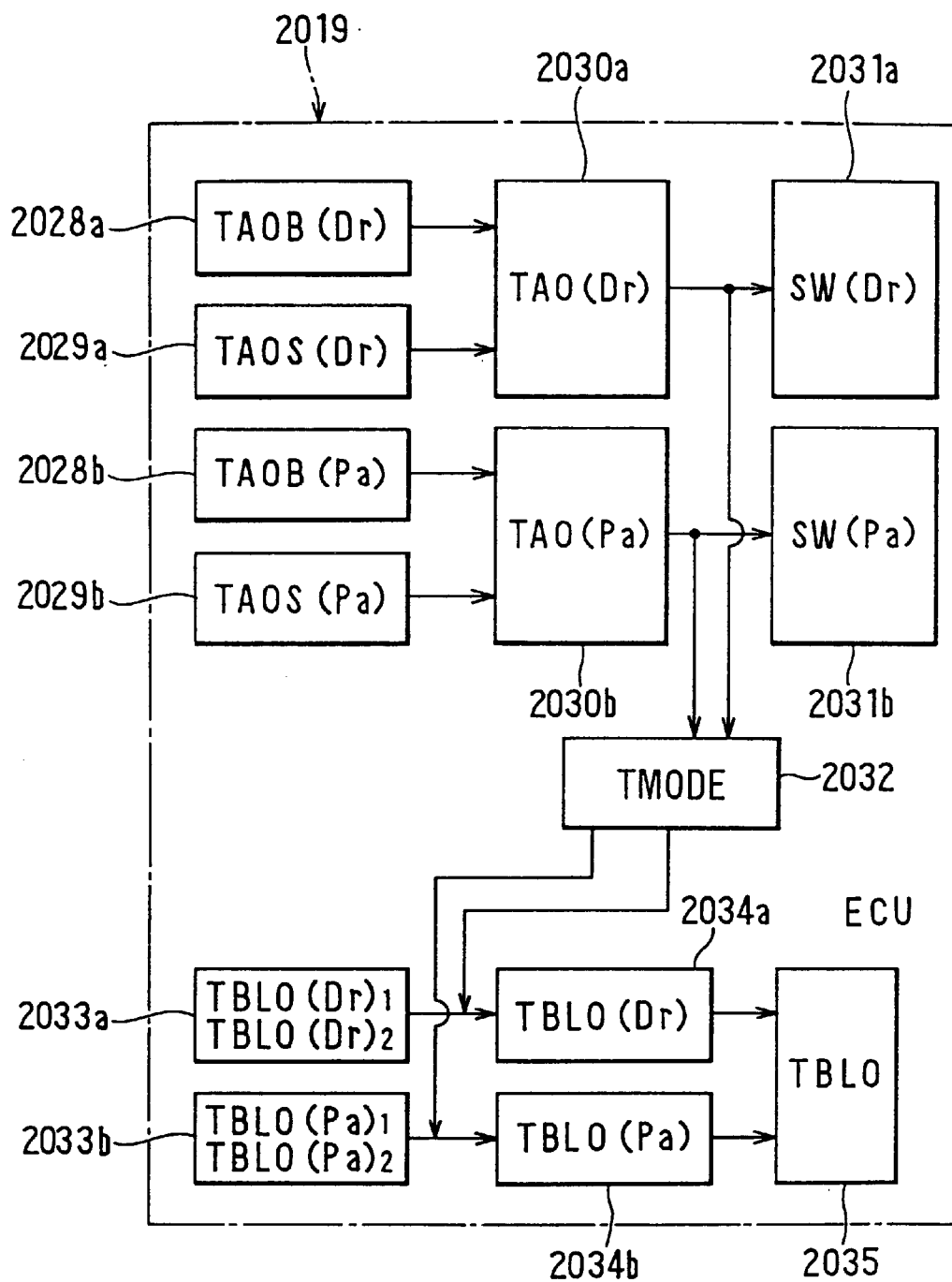
FIG. 31 is a block diagram of main functions of the third embodiment.

Control functions processed by the microcomputer in the ECU 2019 are executed independently between the Dr side and the Pa side as shown in FIG. 31. In this figure, subscript "a" after symbol means Dr side functions, and "b" after symbol means Pa side functions.

In this embodiment, a blow-out port mode signal TMODE common to both of the Dr side and the Pa side, are calculated by a blow-out port mode calculating portion 2032 so that the blow-out port modes of the Dr side and the Pa side are set to be equal.

A blower voltage TBLO, which decides an air amount, calculated as follows. As to the Dr side, a blower voltage level TBLO(Dr)$_1$ in the FACE mode or B/L mode and a blower voltage level TBLO(Dr)$_2$ in the FOOT mode are calculated by an air amount calculating portion 2033*a*. As to the Pa side, a blower voltage level TBLO(Pa)$_1$ in the FACE mode or B/L mode and a blower voltage level TBLO(Pa)$_2$ in the FOOT mode are calculated by an air amount calculating portion 2033*b*. Then, an air amount selecting portion 2034*a* selects one of the blower voltage TBLO(Dr)$_1$ and the blower voltage TBLO(Dr)$_2$ based on the blow-out port mode, and output it as a blower voltage TBLO(Dr). An air amount selecting portion 2034*b* selects one of the blower voltage TBLO(Pa)$_1$ and the blower voltage TBLO(Pa)$_2$ based on the blow-out port mode, and output it as a blower voltage TBLO(Pa). Finally, an average of the blower voltage TBLO (Dr) and the blower voltage TBLO(Pa) are calculated by an air amount deciding portion 2035. The averaged value is output as a final blower voltage TBLO.

Figure 32:
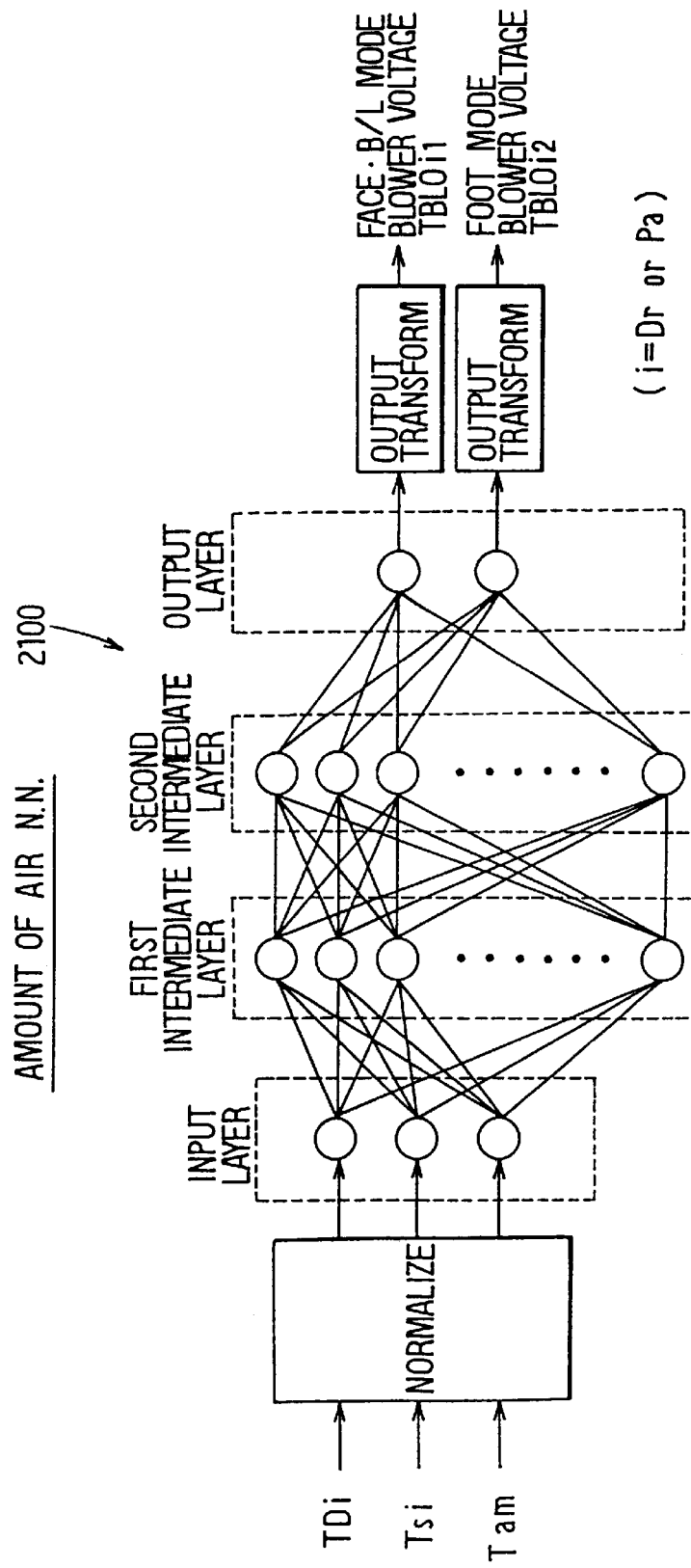
FIG. 32 is a schematic diagram of a neural network of air amount calculating portion of the third embodiment.

As shown in FIG. 32, a neural network 2100, which constitutes each the Dr side air amount calculating portion 2033*a* and the Pa side air amount calculating portion 2033*b*, inputs temperature differences TDi of each the Dr side and the Pa side, and radiation amount Tsi of each the Dr side and the Pa side.

Figure 33:
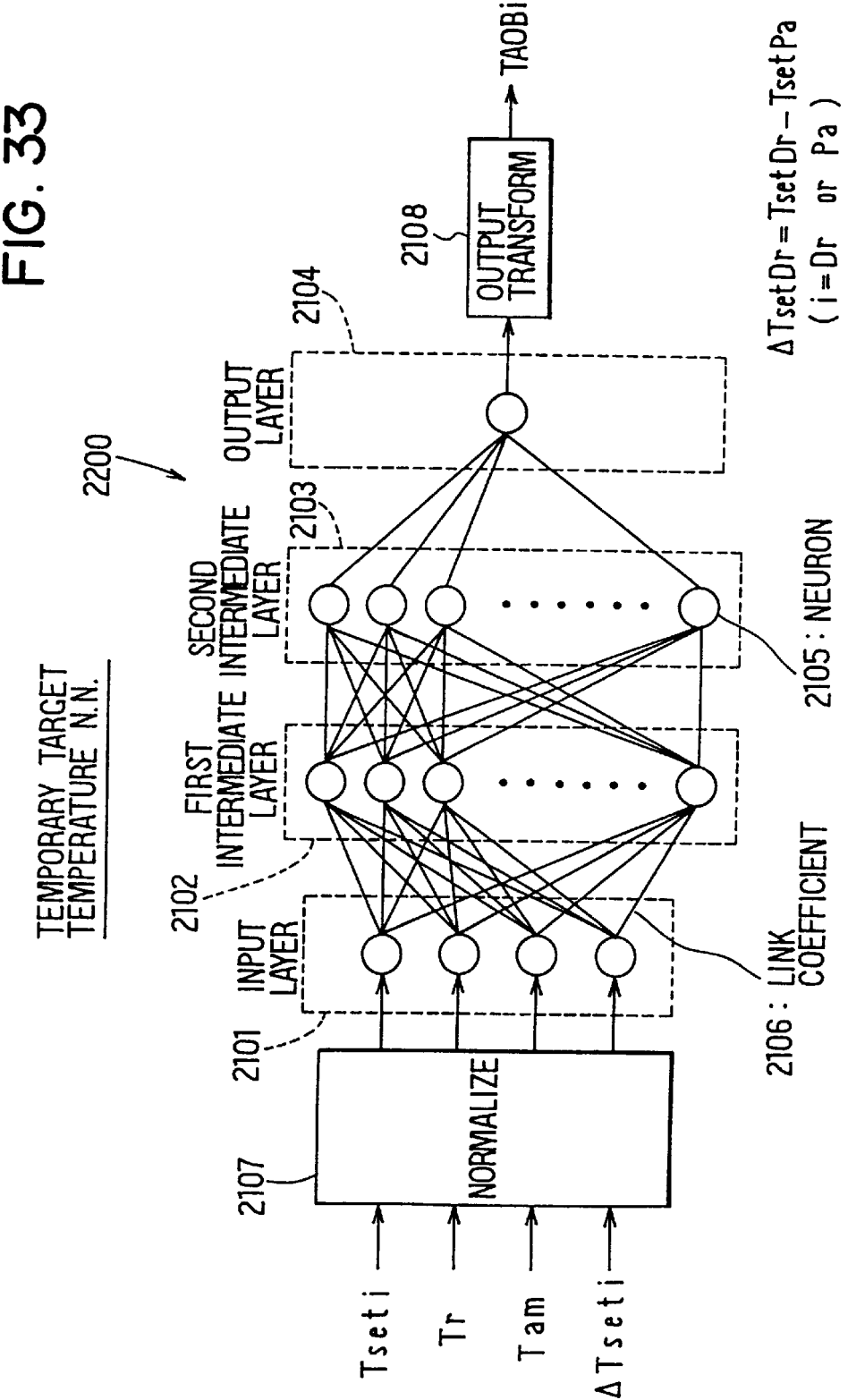
FIG. 33 is a schematic diagram of a neural network of temporary target temperature calculating portion of the third embodiment.

As shown in FIG. 33, a neural network 2200, which constitutes each a Dr side temporary target temperature calculating portion 2028*a* and a Pa side temporary target temperature calculating portion 2028*b*, inputs setpoint temperatures Tset(Dr) and Tset(Pa) of each the Dr side and the Pa side, and further inputs a difference (ΔTset) between the setpoint temperatures Tset(Dr) and Tset(Pa). By inputting the difference (ΔTset), it can restrict a temperature interference between the first air-conditioning zone and in the second air-conditioning zone.

Figure 34:
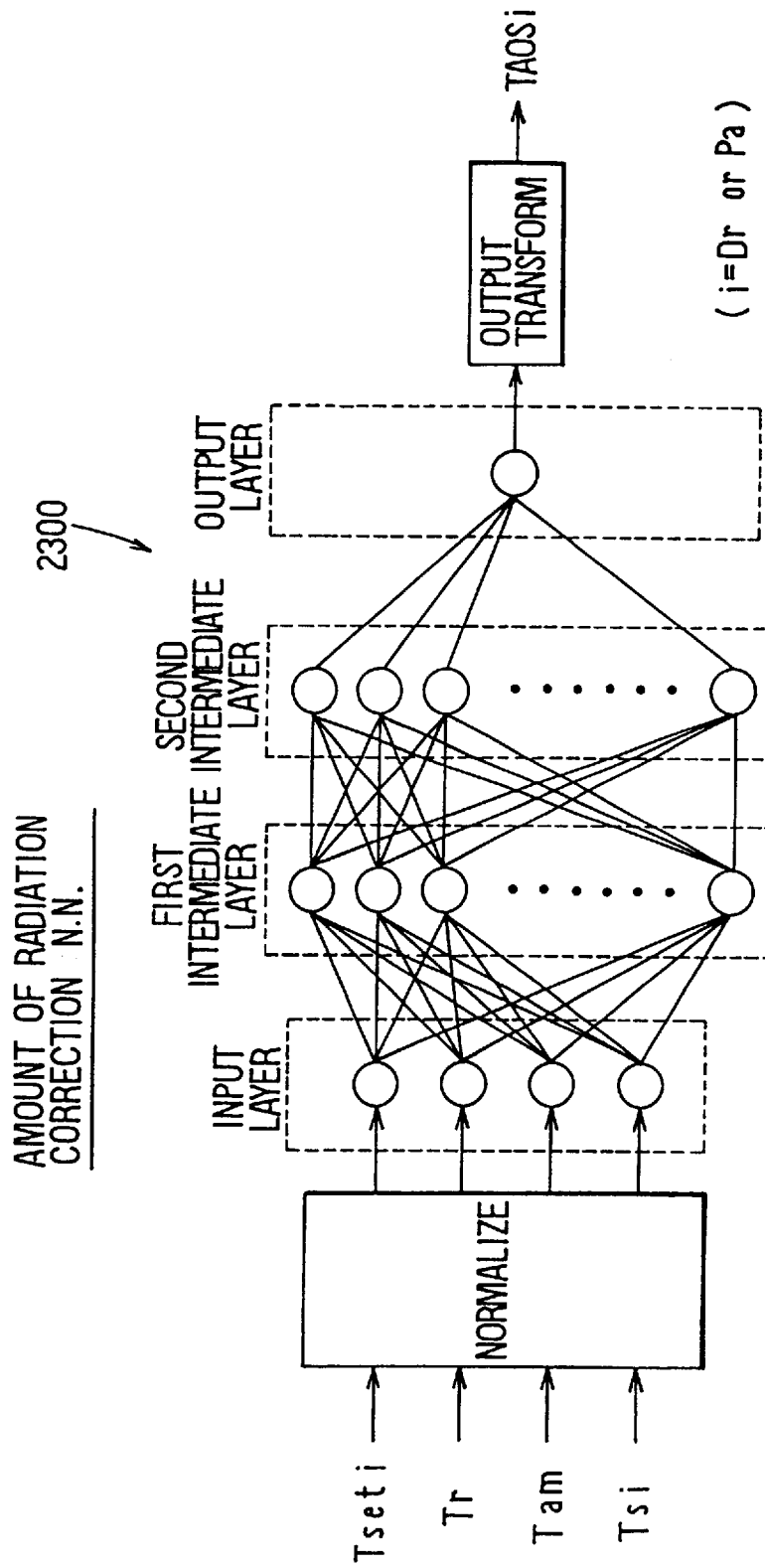
FIG. 34 is a schematic diagram of a neural network of radiation amount correction calculating portion of the third embodiment.

As shown in FIG. 34, a neural network 2300, which constitutes each a Dr side radiation amount correction calculating portion 2029*a* and a Pa side radiation amount correction calculating portion 2029*b*, inputs setpoint temperatures Tset(Dr) and Tset(Pa) of each the Dr side and the Pa side, and further input the Dr side radiation amount TsDr and the Pa side radiation amount TsPa.

Figure 35:
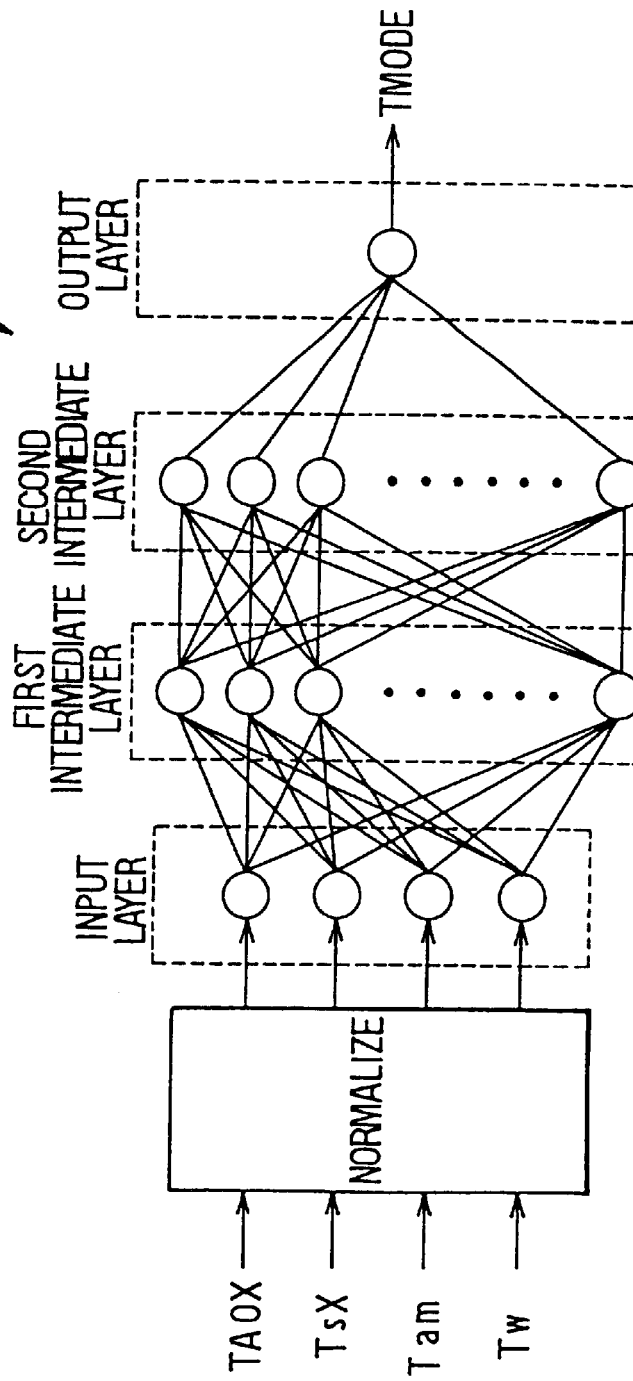
FIG. 35 is a schematic diagram of a neural network of blow-out port mode calculating portion of the third embodiment.

As shown in FIG. 35, a neural network 2400, which constitutes a blow-out port mode calculating portion 2032, inputs an average TAOX, which is an averaged value of a Dr side target blow-out temperature TAO(Dr) and a Pa side target blow-out temperature TAO(Pa), and further input an average TsX, which is an averaged value of the Dr side radiation amount TsDr and the Pa side radiation amount TsPa. Then, the neural network 2400 calculates the blow-out port mode signal TMODE.

Figure 36:
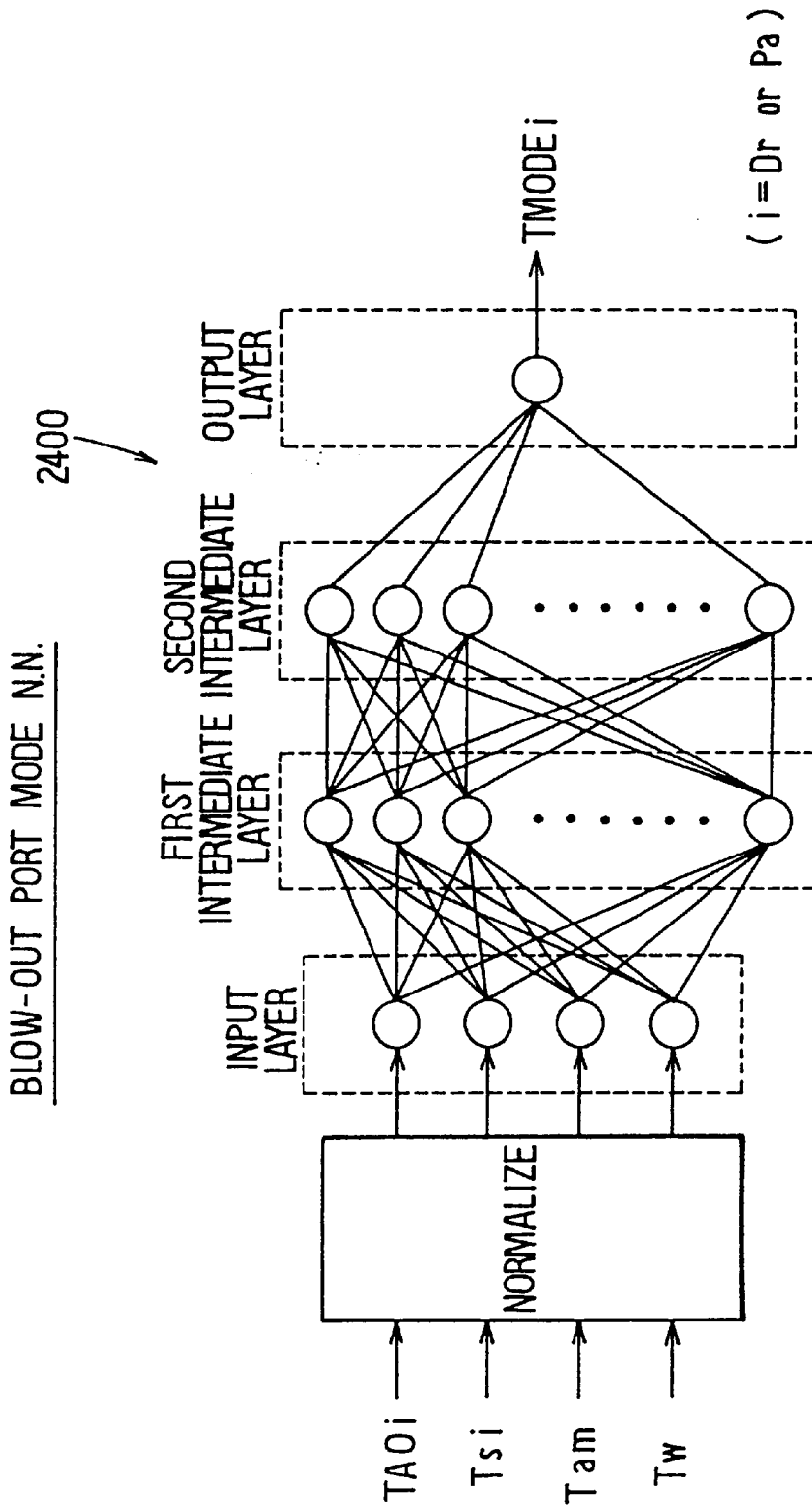
FIG. 36 is a schematic diagram of an another neural network of blow-out port mode calculating portion of the third embodiment.

Here, in this embodiment, it is acceptable to control the Dr side blow-out port mode and the Pa side blow-out port mode independently. In this case, the blow-out port mode calculating portion 2032 is divided into plurality of blow-out port mode calculating portions including a Dr side blow-out port mode calculating portion 2032*a* and Pa side blow-out port mode calculating portion 2032*b*. As shown in FIG. 36, the neural network 2400, which constitutes each the blow-out port mode calculating portions 2032*a*, 2032*b*, inputs the Dr side target blow-out temperature TAO(Dr) or the Pa side target blow-out temperature TAO(Pa), and further inputs the Dr side radiation amount TsDr or the Pa side radiation amount TsPa. Then, each neural network 2400 calculates a Dr side blow-out port mode signal TMODE(Dr) and a Pa side blow-out port mode signal TMODE(Pa), independently.

Then, the air amount selecting portions 2034*a*, 2034*b*, shown in FIG. 31, select the blower voltage TBLO(Dr) and the blower voltage TBLO(Dr) based on each the Dr side blow-out port or the Pa side blow-out port mode. Finally, an average of the blower voltage TBLO(Dr) and the blower voltage TBLO(Pa) are calculated by an air amount deciding portion 2035. The averaged value is output as a final blower voltage TBLO.

The second and third embodiments can be also modified as follows.

(1) In the above-described embodiment, the temporary target blow-out temperature TAOBi, the radiation amount correction TAOSi and the blow-out port mode TMODEi are calculated via the neural networks 2200, 2300, 2400. However, it is acceptable to calculate one of the temporary target blow-out temperature TAOBi, the radiation amount correction TAOSi and the air amount by conventional calculation without neural networks.

(2) The learning method of the neural network can be replaceable with Semi Newton method or the like instead of the above-mentioned back propagation method.

(3) The air-mixing doors 2006, 2061, 2062 are arranged to adjust the mix ratio of cooled air and heated air as the temperature adjuster. However, it is replaceable with a hot water valve to control an amount of hot water flowing into the heater core 2005 or a temperature of the hot water.

(4) In the third embodiment, the average of the blower voltage TBLO(Dr) and the blower voltage TBLO(Pa) are calculated by the air amount deciding portion 2035. The averaged value is output as the final blower voltage TBLO. However, it is acceptable to calculate the final blower voltage TBLO by putting an adequate weight to each the blower voltage TBLO(Dr) and the blower voltage TBLO (Pa) and adding or subtracting them.

(5) In the third embodiment, the blower 3 can be arranged in each Dr side and Pa side independently. Further, an air provider can be arranged in each the Dr side air passage 2002*b* and the Pa side air passage 2002*c* to adjust each air amount, independently, so that each Dr side air amount and Pa side air amount can be controlled, independently.

(6) The temperature difference TD can be obtained by using just Tr and Tset to calculate (Tr−Tset), or using another factor in addition to Tr and Tset.

(7) As the temperature setter 2021, 2021a, 2021b for setting the temperature of the air-conditioning zones, it can be used an analog display in which indicates the temperature without digital figures, e.g., the temperature is indicated by colors.

(8) To adjust the air amount, the blower 3 is controlled by the voltage level applied thereto to control the its rotation speed. However, it is acceptable to control the rotation speed by a pulse wave modulation (PWM) method, which changes a duty ratio of a pulse voltage applied to the blower motor 3a.

(9) The present invention can be adaptable to another air-conditioning device, which has plurality of air-conditioning zone, and is needed to control each of temperature of blow-out air to each zones independently.

(10) The neural networks 2100–2400 are replaceable with recurrent type neural networks.

(Fourth Embodiment)

Figure 37:
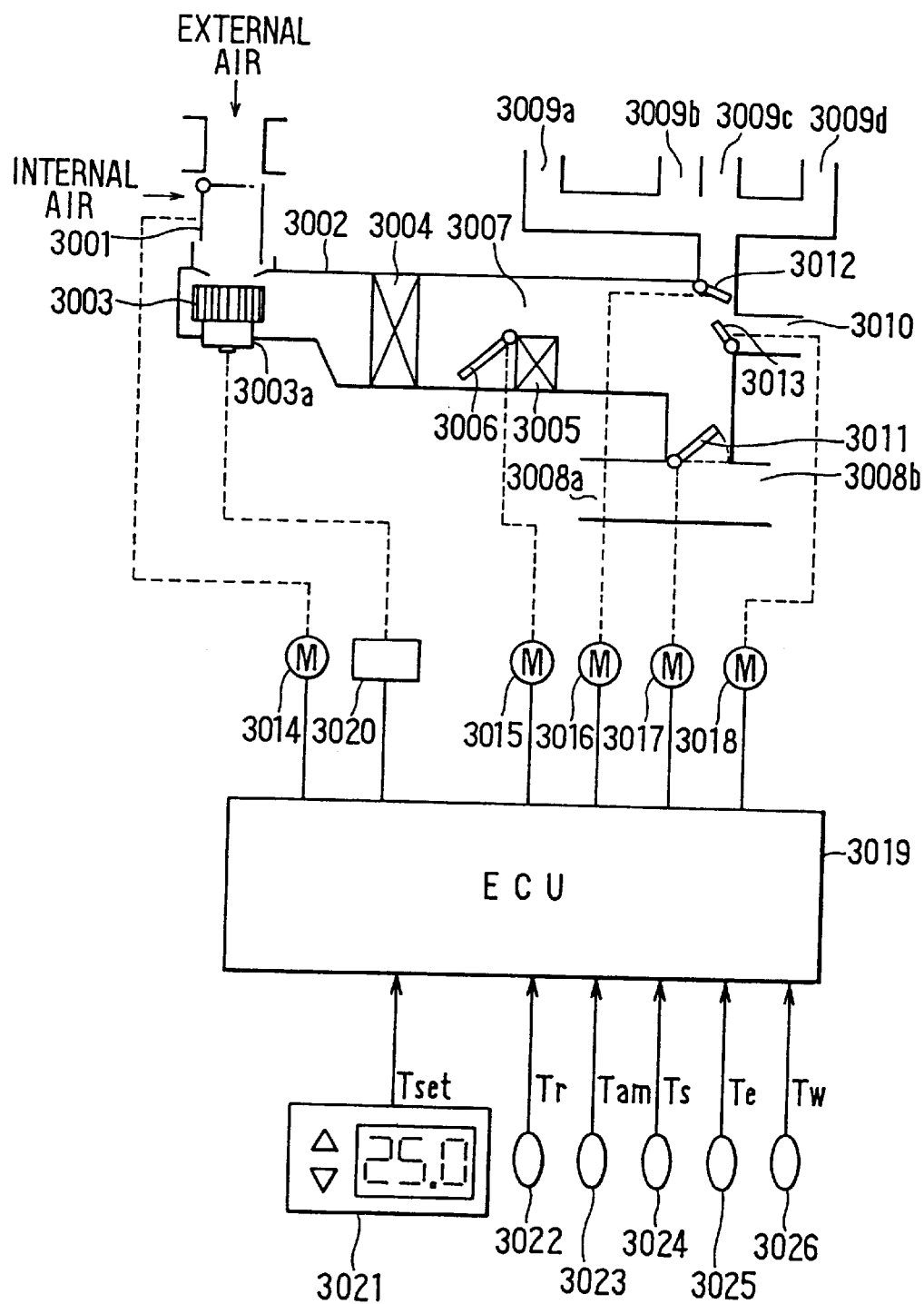
FIG. 37 is a diagram illustrating the constitution of whole system of an air-conditioning device according to a fourth embodiment of the present invention.

A fourth embodiment of the present invention will be described hereinafter with reference to FIGS. 37–45 and 47C–50. FIG. 37 is a diagram illustrating the constitution of whole system of an air-conditioning device for automobiles. In FIG. 37, an internal air/external air change-over door 3001 is arranged at the most upstream side of air flow in the air-conditioning device for automobiles. One of an external air and an internal air is selectively introduced into an air duct 3002 by moving the door 3001.

The air duct 3002 constitutes an air passage of the air-conditioning device. A blower 3003, an evaporator 3004 and a heater core 3005 are arranged from upstream side to downstream side in the air duct 3002. The evaporator 3004 is a cooling heat exchanger for cooling an air by absorbing an evaporating latent heat of a refrigerant in a refrigerating cycle from the air. The heater core 3005 is a heating heat exchanger for heating air with heat from a hot water (engine coolant) from a vehicle engine (not shown).

An air-mixing door 3006 as a temperature adjuster is arranged at the upstream of the heater core 3005. The air-mixing door 3006 adjusts a ratio of two air amount, an amount of heated air passed through the heater core 3005 and an amount of cooled air by-passed the heater core 3005. The adjusting the ratio of heated air and cooled air can adjusts the blow-out air temperature to a passenger component of the automobile.

At the most downstream side of the air duct 3002, foot blow-out ports 3008a, 3008b, face blow-out ports 3009a–3009d, and a defroster blow-out port 3010 are provided. Here, the foot blow-out ports 3008a, 3008b are provided to blow the conditioned air onto the feet of the passengers. The face blow-out ports 3009a–3009d are provided at each of center portion and side portion in the passenger component to blow the conditioned air to the upper half of the body of the passengers. The defroster blow-out port 3010 is provided to blow the conditioned air to a windshield.

At the most downstream side of the air duct 3002, blow-out port change-over doors 3011–3013 are arranged to selectively open/close the blow-out ports 3008a, 3008b and 3009a–3009d. Each of predetermined blow-out modes, such a FACE mode (FACE), a BI-LEVEL mode (B/L), a FOOT mode (FOOT), and a defroster mode or the like can be set by changing the open/close condition of the doors 3011–3013.

Here, a control system for controlling the air-conditioning device will be explained. The internal air/external air changing door 3001, the air-mixing door 3006, and the blow-out port change-over doors are driven by servomotors 3014–3018. The servomotors 3014–3018 are controlled by outputs of an air-conditioning electric control device 3019 (hereinafter, called "ECU 3019"). A motor 3a of the blower 3003 is also controlled by the output of the ECU 3019 via a motor control circuit (motor applied voltage control circuit) 3020.

An air amount blown by the blower 3003 is adjusted by the motor control circuit 3020 by way of changing a rotation speed of the motor with an applied voltage to the motor. The ECU 3019 includes a microcomputer and its peripheral circuits.

A temperature setter 3021 is provided to set a setpoint temperature Tset of the passenger component, which is input to the ECU 3019. The temperature setter 3021 is arranged an air-conditioning control panel, and is manually controlled by users.

As temperature data detectors, the following sensors are provided. That is, an internal air sensor 3022 is provided to detect an internal air temperature Tr. An external air sensor 3023 is provided to detect an external air temperature Tam. A radiation sensor 3024 is provided to detect a radiation amount Ts to the passenger component. An evaporator temperature sensor 3025 is provided to detect a cooling temperature Te (blow-out air temperature) of the evaporator 3004. A water temperature sensor 3026 is provided to detect a water temperature Tw of hot water flowing into the heater core 3005.

Figure 38:
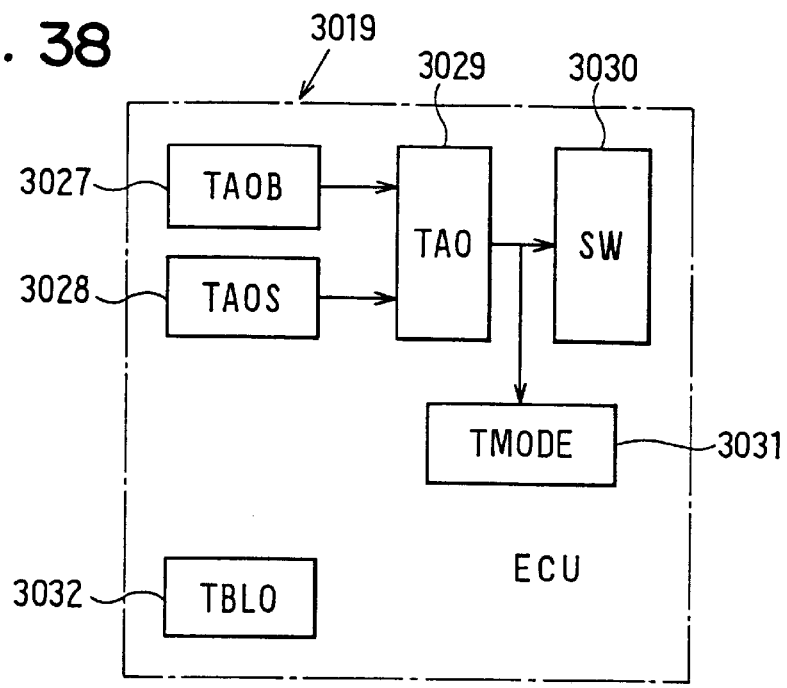
FIG. 38 is a block diagram of main functions of the fourth embodiment.

Control functions processed by the microcomputer in the ECU 3019 is generally divided as shown in FIG. 38. The ECU 3019 includes a temporary target temperature calculating portion 3027, a radiation amount correction calculating portion 3028, a target temperature calculating portion 3029, an air-mixing door opening degree calculating portion 3030, a blow-out port mode calculating portion 3031, and an air amount calculating portion 3032.

Here, the temporary target temperature calculating portion 3027 calculates a temporary target blow-out temperature, and includes a neural network 3200 as shown in FIG. 41. The temporary target temperature calculating portion 3027 inputs signals including the setpoint temperature Tset, the internal air temperature Tr and the external air temperature Tam, and calculates the temporary target blow-out temperature TAOB based on the input signals via the neural network 3200.

Figure 42:
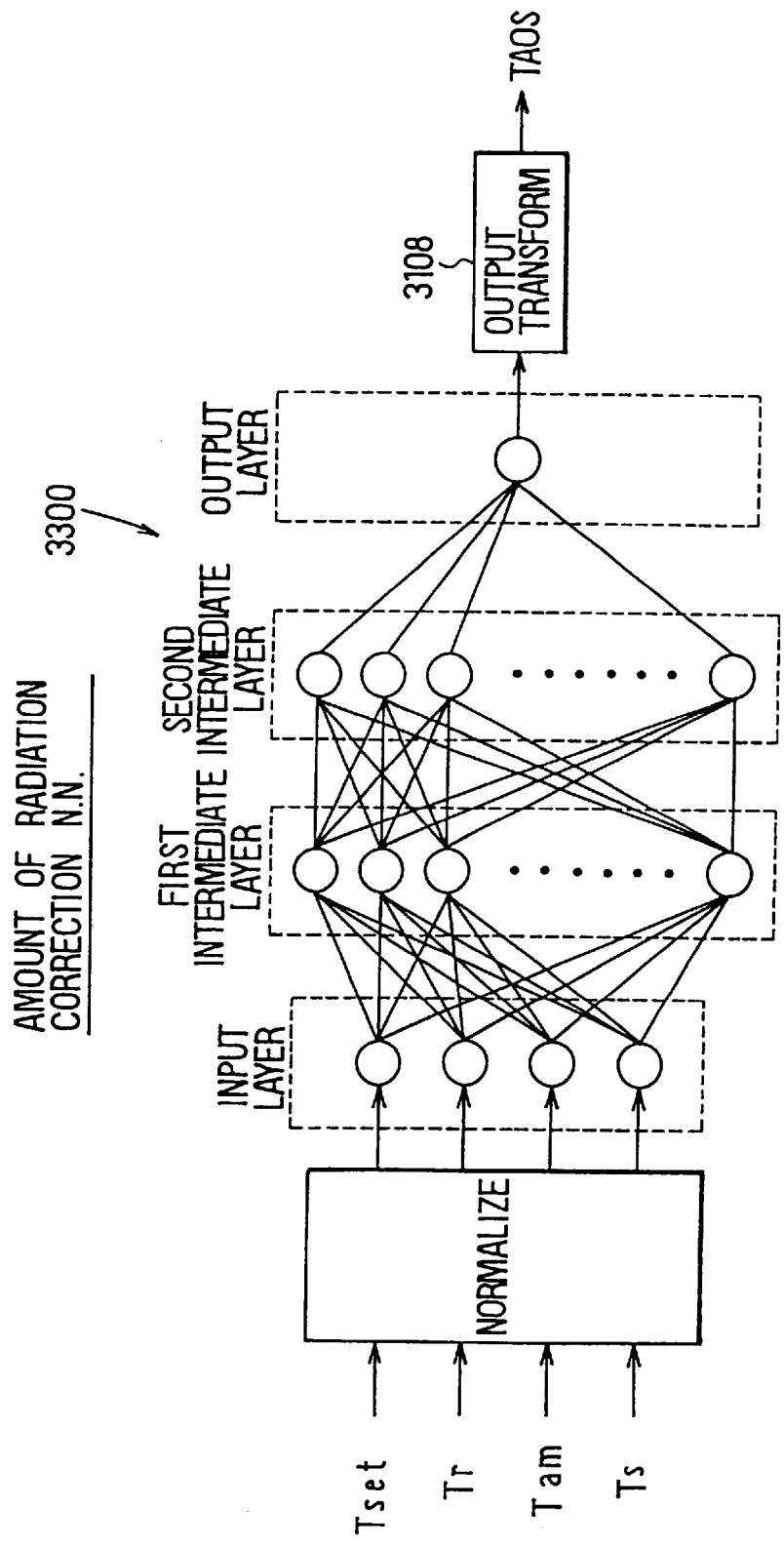
FIG. 42 is a schematic diagram of a neural network of radiation amount correction calculating portion of the fourth embodiment.

The radiation amount correction calculating portion 3028 calculates a radiation amount correction TAOS, and includes a neural network 3300 as shown in FIG. 42. The radiation amount correction calculating portion 3028 inputs signals including the setpoint temperature Tset, the internal air temperature Tr, the external air temperature Tam and the radiation amount Ts (output signal of the radiation sensor 3024). Then the, radiation amount correction calculating portion 3028 calculates the radiation amount correction TAOS based on the input signals via the neural network 3300.

The target temperature calculating portion 3029 calculates the final target blow-out temperature TAO based on the output signals from the temporary target temperature calculating portion 3027 and the radiation amount correction calculating portion 3028.

The air-mixing door opening degree calculating portion 3030 calculates an air-mixing door opening degree SW based on the final target blow-out temperature TAO from the target temperature calculating portion 3029.

The blow-out port mode calculating portion 3031 calculates a blow-out port mode TMODE, and includes a neural network 3100 as shown in FIG. 39. The blow-out port mode calculating portion 3031 inputs the final target blow-out temperature TAO from the target temperature calculating portion 3029 and the detected information, which is the environment factor to influence a temperature sensitively of the passenger such as the radiation amount Ts, the external air temperature Tam and the water temperature Tw. Then the blow-out port mode calculating portion 3031 calculates the blow-out port mode TMODE via the neural network 3100.

Figure 43:
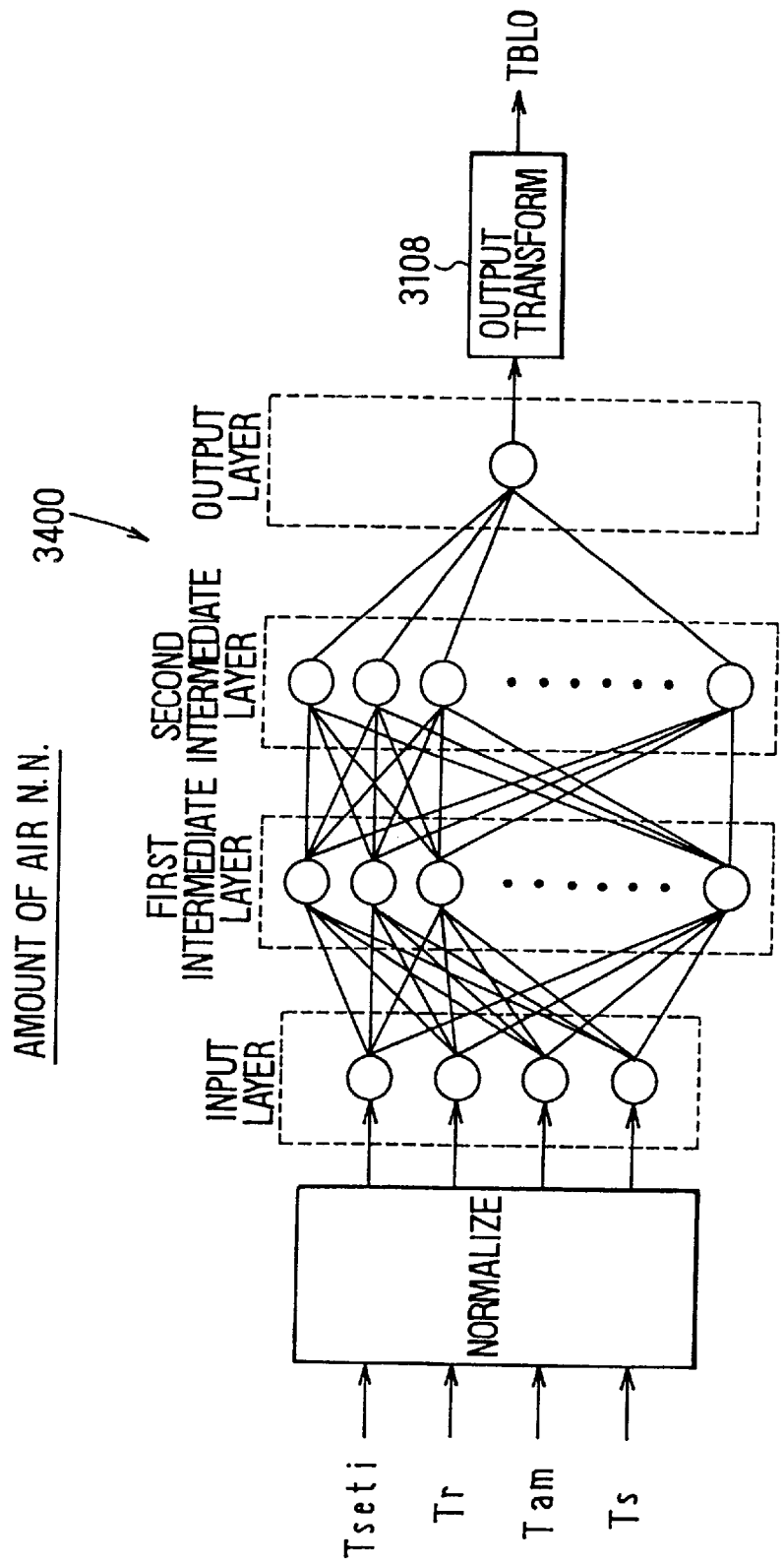
FIG. 43 is a schematic diagram of a neural network of air amount calculating portion of the fourth embodiment.

The air amount calculating portion 3032 includes a neural network 3400 as shown in FIG. 43. The air amount calculating portion 3032 inputs signals including the setpoint temperature Tset, the internal air temperature Tr, the external air temperature Tam and the radiation amount. Then the air amount calculating portion 3032 calculates a blower voltage, which decides an air amount via the neural network 3400.

The constitutions of the neural networks 3100–3400 will be explained. Since the constitutions of the neural networks 3100–3400 are substantially same, these constitutions is explained based on the neural network 3100 with reference to FIGS. 39, 40A, 40B.

As shown in FIG. 39, the neural network 3100 includes an input layer 3101, a first intermediate layer 3102, a second intermediate layer 3103, and output layer 3104. Each of the input layer 3101, the first and the second intermediate layers 3102, 3103 has a plurality of neurons 3105, and output layer has one neuron 3105. Each of neurons 3105 in the input layer 3101 is connected to each of neurons 3105 in the first intermediate layer 3102 with a certain link coefficient 3106 (synapse weight). Similarly, each of neurons 3105 in the first intermediate layer 3102 is connected to each of neurons 3105 in the second intermediate layer 3103 with a certain link coefficient 3106. Each of neurons 3105 in the second intermediate layer 3103 is connected to the neuron 3105 in the output layer 3104 with a certain link coefficient 3106. These neurons 3105 are formed by memories in the ECU 3019 in an actual circuit, and the neural network 3100 is formed by combined memories.

The neural network 3100, which is a network having a layered structure, has a Back Propagation Learning Function. The Back Propagation Learning Function can automatically correct the link coefficients 3106 between each neurons among the input layer 3101, the first and second intermediate layers 3102, 3103, and output layer, so as to adjust its output to a desired value (teacher signal) related to input signals such as TD, Ts, Tam, Tw.

When the teacher signal is changed, the link coefficients 3106 are adjusted by repeatedly "learning" so as to correct the output to be the changed teacher signal related to the input signals. In other words, based on a large number of desired data (teacher signals), a correlation function (link coefficients 3106) is automatically generated. The teacher signals are determined to desired values obtained by an experience or the like (desired output for the input signals).

In the layered structure neural network 3100, there is no connection among each of the neurons 3105 in an identical layer, but the neurons 3105 in each layer are connected to only neurons 3105 in forward and backward layers. The clink coefficients 3106 between each neuron 3105 in each layer represent a weight of connection (magnitude). The larger the weight of connection, the larger an amplitude of signal, which is output from each neuron 3105 and propagated to neurons 3105 in backward layer.

Here, the input signals (TD, Ts, Tam, Tw) are normalized to 0–1 value before inputting to the neural network 3100 by a normalize portion 3107. The output signal from the neural network 3100 is transformed in reverse procedure of the normalize portion 3107 by an output transform portion 3108. For example, actual detected internal temperature Tr detected by the internal air sensor is normally in a range from 0° C. to 50° C. This detected value is assigned to a certain value in a range from 0 to 1 in the normalize portion 3107, and is output to the input layer 3101 in the neural network 3100. Since the output signal from the output layer 3104 is a value in the range from 0 to 1, this output signal is transformed to the actual value corresponding to the sensor signal in the reverse procedure by using a predetermined transformation map in the output transform portion 3108. Here, since the neural network 3100 in FIG. 39 outputs the blow-out port signal TMODE, it does not need to reverse transform the output from the output layer 3104. Therefore, this neural network 3100 does not have the output transform portion 3108.

The environment conditions, of which the air-conditioning device for vehicle faces, are variable, as described above. Therefore, the number of the teacher signals, which are desired values related to the various environment conditions, will be enormously.

Therefore, in a designing process of the ECU 3019, the learning is executed by a high-speed calculator including a neural network, which is the same as the neural network 3100, before mounted to the vehicle. The high-speed calculator calculates the link coefficients 3106 so that the output of the neural network is to be desired teacher signals for various input signals. Then, the calculated coefficients 3106 are memorized in a memory portion (ROM) corresponding to each neural network 3100, 3200, 3300, 3400 in each of the calculating portions of the ECU 3019 shown in FIG. 38.

Therefore, when the ECU 3019 is mounted on the vehicle, the link coefficients 3106 among the neurons 3105 in each layer of the neural networks 3100–3400 are set to predetermined value.

Figure 40A:
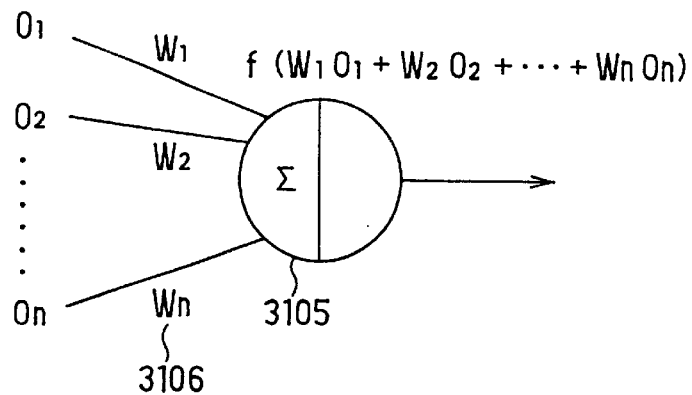
FIGS. 40A, 40B are diagram and graph for explaining an output calculating procedure of neural network.
Figure 40B:
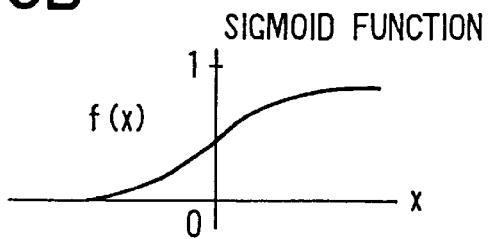

After mounted on the vehicle, the neural networks 3100–3400 in each layer calculate an output for input signals as shown in FIG. 40A. Specifically, in each of the neurons 3105, each of the input signals $O_1$–$O_n$ is multiplied by each of the corresponding coefficients 3106 ($W_1$–$W_n$), and multiplied value are adapted to a so-called sigmoid function as shown FIG. 40B. The calculated results of the sigmoid function are output to the neurons 3105 in backward layer. These calculations are repeated between each layer to decide a final output.

Since the neural network 3100 in each calculating portion of mounted ECU 3019 is previously set so that the desired value for the various input signals $O_1$–$O_n$ can be obtained, learning for correction of the link coefficients is not needed.

Therefore, the neural networks 3100 as shown in FIG. 39 of the blow-out port mode calculating portion 3031 calculates and outputs the desired value as the blow-out port mode signal TMODE (=0–1) related to the changes of input signals (TAO, Ts, Tam, Tw).

The neural network 3200 of the temporary target temperature calculating portion 3027 outputs the desired teacher signals as the temporary target blow-out temperature TAOB in relation to the change of the input signals (Tset, Tr, Tam).

The neural network 3300 of the radiation correction calculating portion 3028 outputs the desired teacher signals as the radiation amount correction TAOS in relation to the change of the input signals (Tset, Tr, Tam, TS).

The neural networks 3100 of the air amount calculating portion 3032 calculates and outputs the desired value as the blower voltage level TBLO in relation to the changes of input signals (Tset, Tr, Tam, Ts).

In the target temperature calculating portion 3029, the final target blow-out temperature TAO is calculated by the following equation:

$$TAO = TAOB - TAOS \quad (5)$$

In the air-mixing door opening degree calculating portion 3030, the air-mixing door opening degree SW is calculated based on the TAO from the target temperature calculating portion 3029, the temperature Te of the evaporator 3004, and the water temperature Tw of the heater core 3005, by using the following equation:

$$Sw(\%) = (TAO - Te)/(Tw - Te) \times 100 \quad (6)$$

The control flow according to the preferred embodiment will be explained with reference to a flow chart shown in FIG. 44. This control routine starts from a control switch signal, which starts the air-conditioning device.

At step 3510, the air-conditioning ECU 3019 is reset. At step 3520, the ECU 3019 inputs the output signals from each sensor such as the internal air temperature Tr, the external air temperature Tam, and the signals from the temperature setter 3021.

At step 3530, the temporary target blow-out temperature TAOB is calculated via the neural network 3200, shown in FIG. 41. The step 3530 corresponds to the temporary target temperature calculating portion 3027 in FIG. 38.

At step 3540, the radiation amount correction TAOS is calculated via the neural network 3300, shown in FIG. 42. The step 3540 corresponds to the radiation amount correction calculating portion 3028 in FIG. 38.

At step 3550, the final target blow-out temperature TAO is calculated by the equation (5). The step 3550 corresponds to the second target temperature calculating portion 3030 in FIG. 38.

At step 3560, the air-mixing door opening degree SW is calculated by the equation (6). The step 3560 corresponds to the air-mixing door opening degree calculating portion 3030 in FIG. 38.

Figure 45:
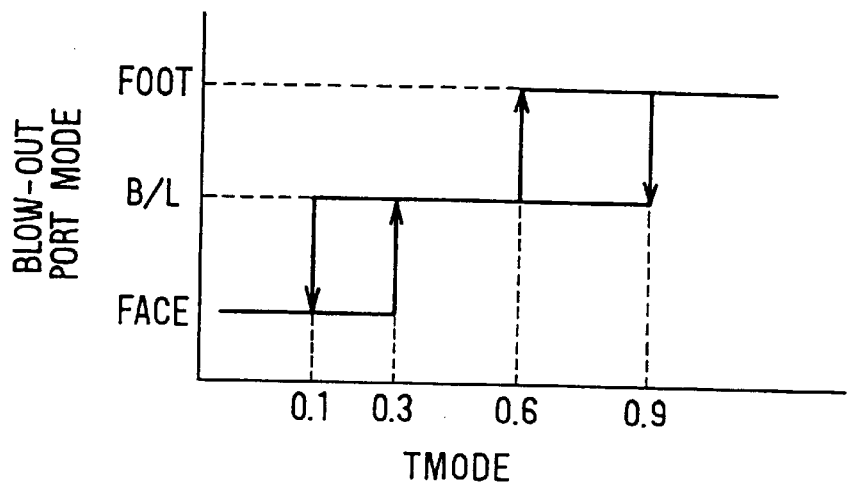
FIG. 45 is a diagram of characteristics illustrating a calculation of the blow-out port mode according to the fourth embodiment.
Figures 46A, 46B:
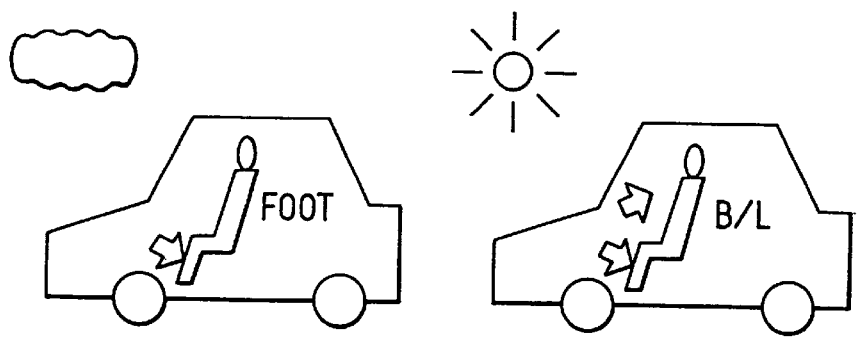
Figure 46C:
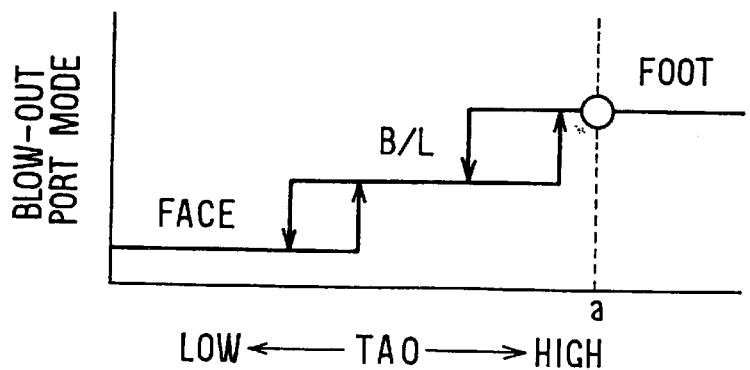

At step 3570, the blow-out port mode signal TMODE is calculated via the neural network 3100, shown in FIG. 39. The step 3570 corresponds to the blow-out port mode calculating portion 3031 in FIG. 38. Here, outputs in the blow-out port mode signal TMODE have characteristics that this output increases in proportion to an increasing of the target blow-out temperature TAO. One of a face mode (FACE), a bi-level mode (B/L), and a foot mode (FOOT), which are shown in FIG. 45, is determined based on the output TMODE from the neural network 3300.

Figure 44:
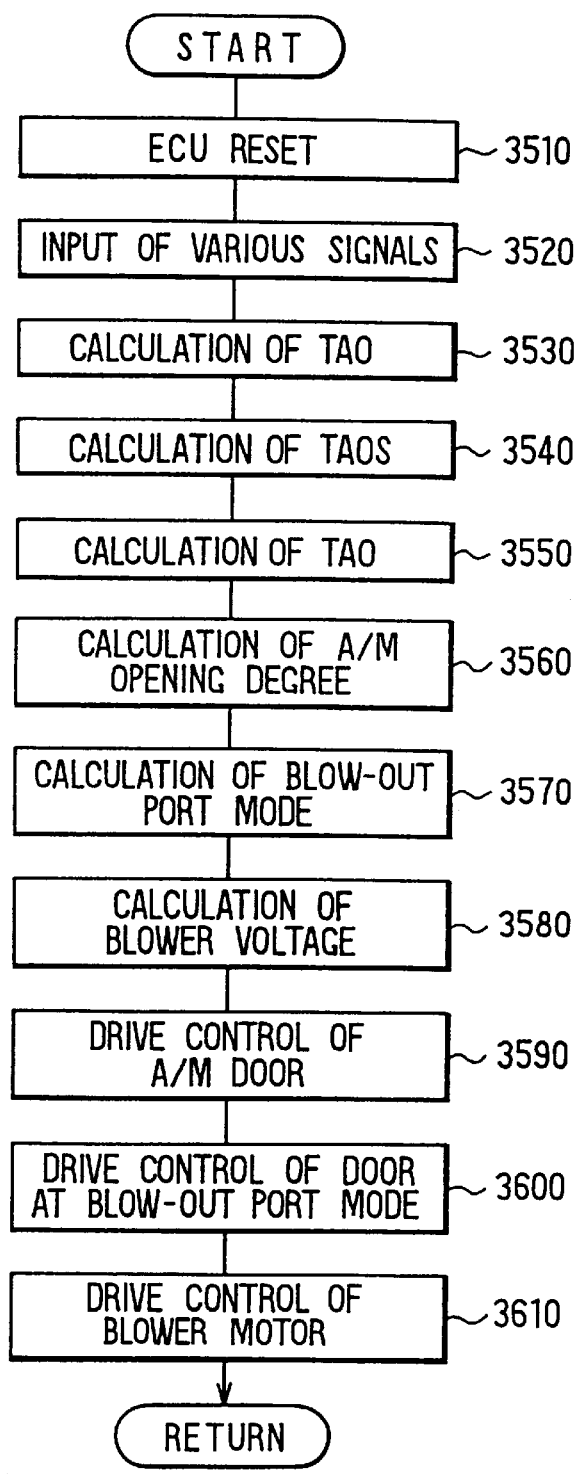
FIG. 44 is a flow chart illustrating a control flow according to the fourth embodiment.

At step 3580, the blower voltage TBLO is calculated via the neural network 3400, shown in FIG. 44. The step 3580 corresponds to the air amount calculating portion 3032 in FIG. 38.

At steps 3590–3610, each of actuators such as motors 3014–3018 and the motor applied voltage control circuit 3020 as shown in FIG. 37 are controlled so as to correspond to the above-mentioned calculated values.

Figures 48, 49:
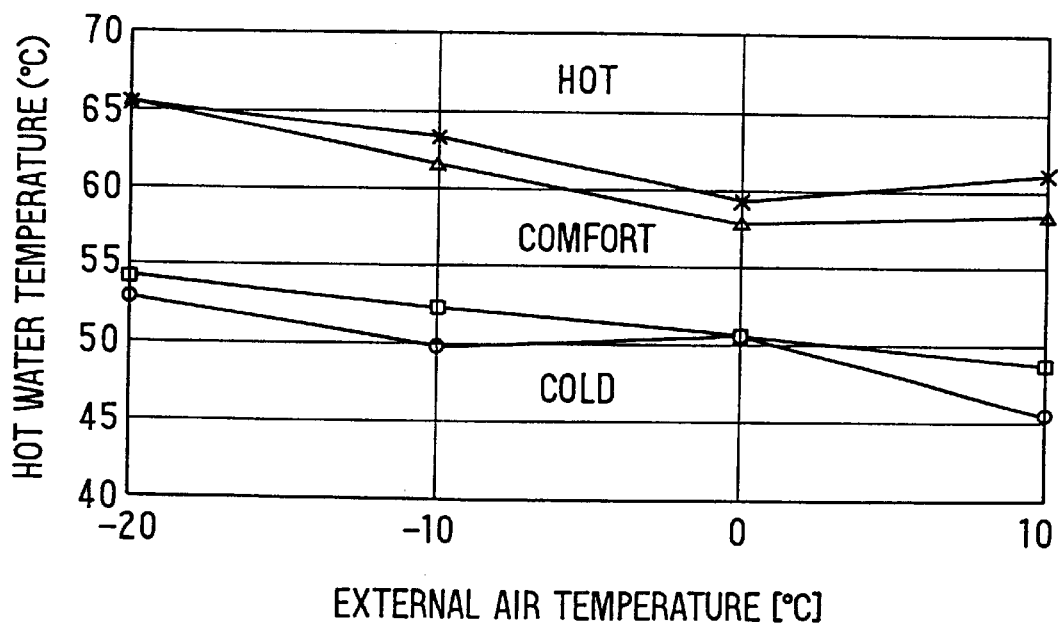
FIG. 48 is a diagram of characteristic illustrating a relationship between input conditions and a blow-out port mode signal output.
FIG. 49 is a diagram of characteristic illustrating a relationship between a comfort in a B/L mode and an external air temperature and a temperature of hot water.

The procedure of calculation of the blow-out port mode signal TMODE via the neural network 3100 will be explained in detail. In FIG. 48, which is a diagram of characteristic illustrating a relationship between inputs 1–4 and the output (teacher signal), the inputs 1–4 and the output correspond to TAO, Ts, Tam, Tw and TMODE. When the input conditions are as follows, that is TAO=48° C., Ts=1000 W/$^2$, Tam=0° C., Tw=80° C. (i.e., there is the radiation Ts and the external air temperature Tam is low), and output is 0.95, the blow-out port mode TMODE is set the FOOT mode as shown in 47A. In this case, the passenger may feel hot to the head portion.

Then, the output signal (teacher signal) is changed from 0.95 to 0.5 at above described input conditions.

Here, the neural network has the learning function, which adjusts the link coefficients (synapse weights) 3106 between each neurons in each layers in the neural network automatically to correct its output to be desired data (teacher signal). Therefore, the output at a specific input condition can be adjusted, by changing the teacher signal at the specific input condition and then adjusting the link coefficients (synapse weights) 3106 automatically in advance.

By changing the output (TMODE=0.95→0.5), it enable to set the blow-out port mode to the B/L mode so as to blow-out the cooled air to the upper body of the passenger, and enable to reduce the hot feeling due to the radiation to improve the air-conditioning feeling of the passenger.

Furthermore, since the neural network adjusts its whole link coefficients so that the desired outputs at the other input condition are maintained even if the output at the specific input condition is changed. Therefore, the output change at the specific input condition does not influence the outputs at the other input conditions. Hence, in no radiation condition, it enable to set the blow-out port mode to the FOOT mode so as to blow-out the heated air to the foot area of the passenger, and enable to improve the air-conditioning feeling of the passenger.

Furthermore, since the correction of the link coefficients 3106 are adjusted automatically by using the learning function of the neural network, it will not be essential for the engineers to construct a complicated control logic such that the desired output can be obtained only at specific input condition. Hence, engineer's process can be eliminated substantially.

Since the complicated process does not needed, a capacitance of a memory (ROM) of a computer, which constitutes an air-conditioning electric control device, can be decreased.

Here, when the B/L mode is selected in the radiation condition at low temperature as shown in FIG. 47B, it is desirable to set an upper limitation (A/M limiter) for the air-mixing door opening degree as shown in FIG. 47C.

That is, as shown in FIG. 47C, in a B/L mode extension area d in which TAO is "a" or more, it is desirable to restrict a blowing of the heated air from the face blow-out ports 3009a–3009d. In order to meet this desire, an actual blow-out temperature to the passenger component is restricted to a predetermined temperature by setting the upper limitation of the air-mixing door opening degree. Here, in this figure, a line "b" represents the face blow-out temperature and a line "c" represents the foot blow-out temperature.

Next, the switching control of the blow-out port mode in the following condition will be explained. That is, the condition that the air-conditioning device starts just after the vehicle engine starts at a low external temperature in winter will be explained. After the engine starts, the temperature of an engine coolant (the temperature of the hot water to the heater core 3005) rises. Then, the temperature of the blow-out air of the heater core 3005 rises. Further, the temperature of blow-out air to the passenger component rises. Here, the voltage applied to the motor of the blower is adjusted so that the air amount to the passenger component increases in proportion to the rising of the hot water temperature.

Here, when the blow-out port mode to the passenger component is maintained to the FOOT mode, it may take long time to warm up the upper body of the passenger because the body of the passenger is warmed up from his/her lower body. Hence, the passenger may not feel comfort.

Therefore, it is desirable to set the blow-out port mode to the FOOT mode initially, then set it to the B/L mode in proportion to the rising of the hot water temperature. By setting to the B/L mode, it enables to blow-out air to the upper body of the passenger from the face blow-out port so as to warm up the upper body early. Here, when the air-conditioning device starts at low external temperature, the control of the air-conditioning device is set to a maximum heating. That is, the air-mixing door opening degree SW is set to its maximum degree (100%) so that an air passage to the heater core 3005 is set to be full opened.

FIG. 49 shows a result of an experience to investigate a condition that the passenger feels the B/L mode comfort when the air-conditioning device starts at low external temperature. In this experience was conducted on monitor people. According to the experience, the following results were obtained. As shown in this figure, there are certain ranges of the hot water temperature in which the passenger feels comfort (comfort range) in the B/L mode for each the external air temperatures. The comfort ranges of the B/L mode (ranges between a line Δ—Δ and a line □—□ in figure) are related to the external air temperature and the hot water temperature. Specifically, the comfort ranges rise in proportion to falling of the external air temperatures. Here, ranges upper a line ×—× are that the passenger feels hot, and ranges lower a line ○—○ are that the passenger feels cold. Each the range between the line ×—× and the line Δ—Δ, and ranges between the line □—□ and the line ○—○ are intermediate ranges that the passenger can not determine whether comfort or not.

Here, the temperature of air actually blown to the passenger component is lowered to around 90% of the hot water due to a heat transfer efficient between the hot water of the heater core 3005 and air.

Figures 50, 53:
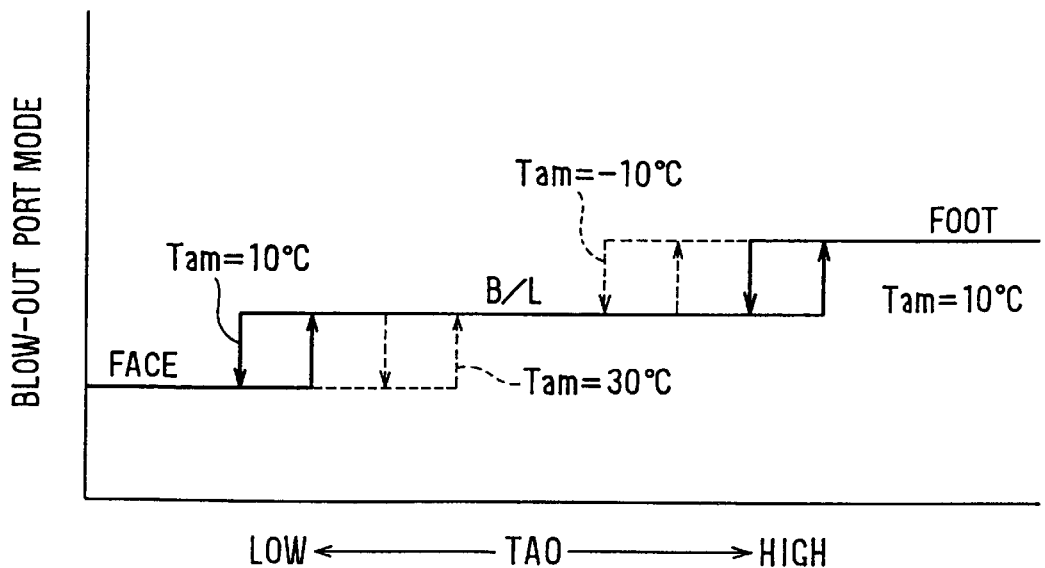
FIG. 50 is a diagram of characteristic illustrating a relationship between input conditions and a blow-out port mode signal output.
FIG. 53 is a diagram of characteristic illustrating a relationship between input a blow-out port mode and a target blow-out temperature according to a seventh embodiment.
Figure 54:
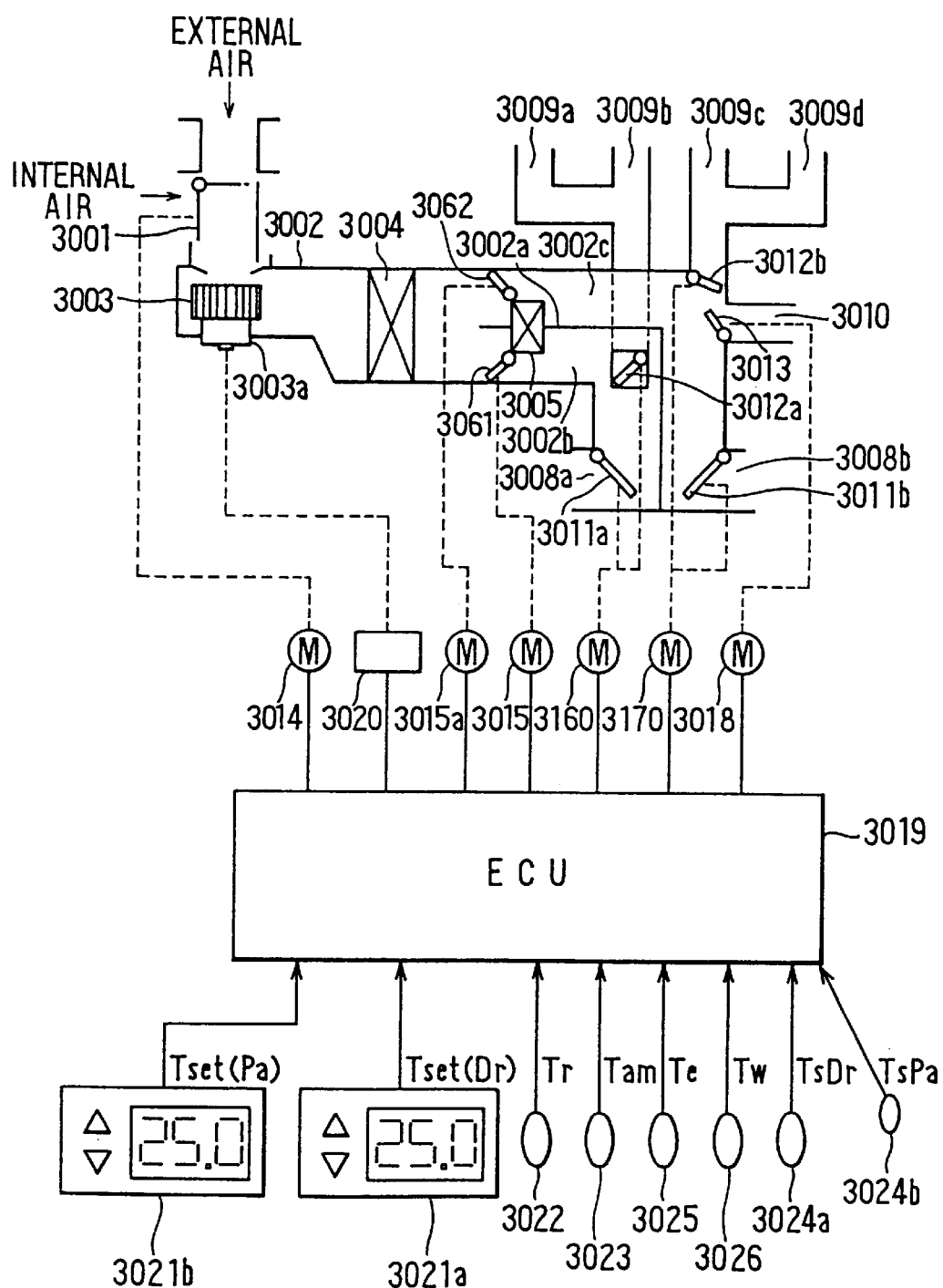
FIG. 54 is a diagram illustrating the constitution of whole system of an air-conditioning device according to a eighth embodiment of the present invention.
Figure 55:
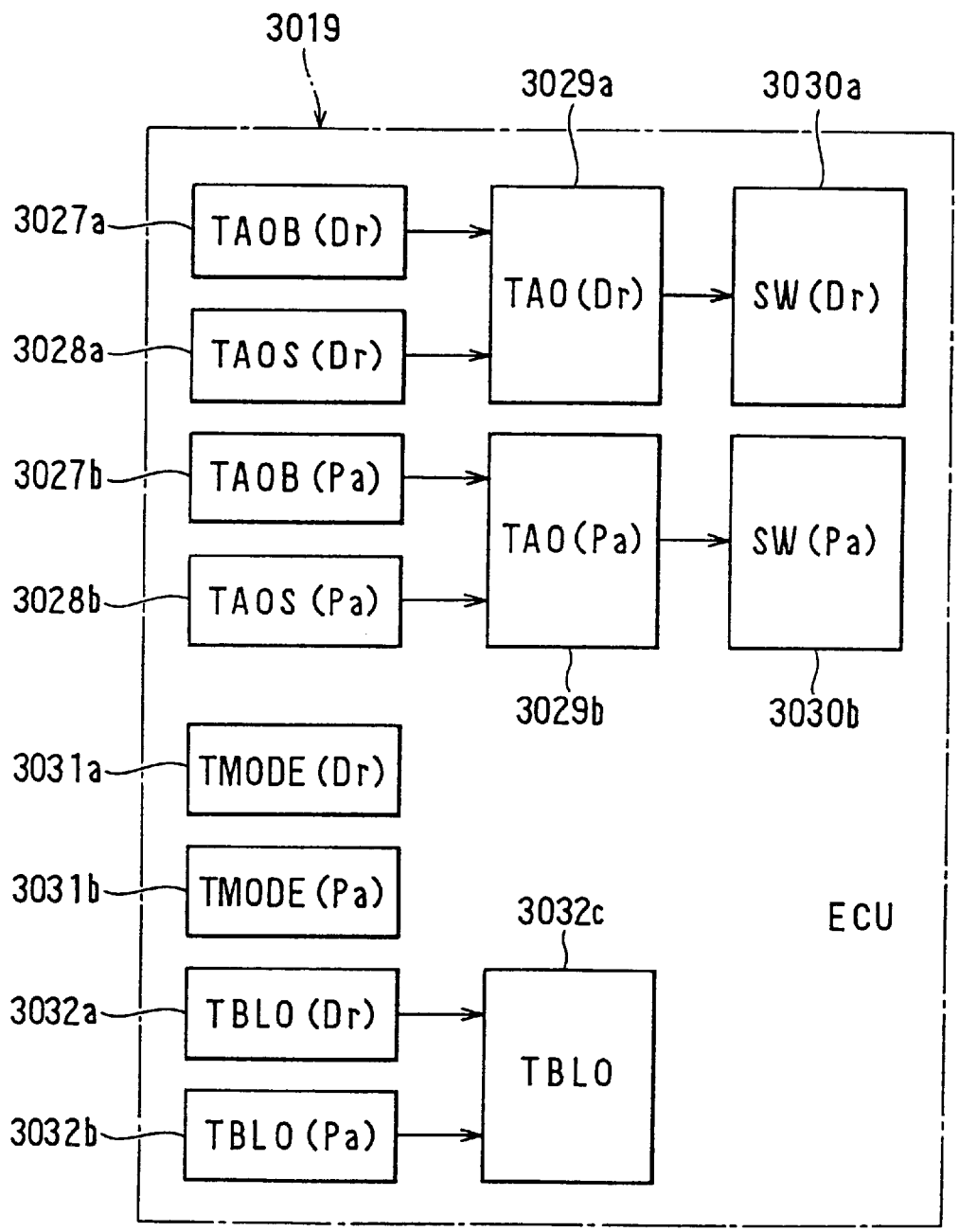
FIG. 55 is a block diagram of main functions of the eighth embodiment.

Based on the experience, this embodiment provides the following control for the relationship between the inputs 1–4 of the neural network 3100 and the output TMODE. That is, as shown in FIG. 50, when the inputs 1–4 are TAO=80° C., Ts=0 W/m², Tam=−10° C., and when the Tw is within a range of 53° C. to 62° C., the output is changed from 0.95 to 0.5. Therefore, it enables to change the blow-out port mode from the FOOT mode to the B/L mode. Consequently, it enables to warm up the upper body of the passenger early within the range of Tw so as to improve the air-conditioning feeling and a driving safety.

In the other water temperature range, since the blow-out port mode can be set to the FOOT mode by maintaining the output 0.95, it can prevent over-cooling to the foot area in the B/L mode when the water temperature is low. Also, it can prevent over-heating to the upper body in the B/L mode when the water temperature is high.

(Fifth embodiment)

In the fourth embodiment, in the start timing at the low external temperature, the blow-out port mode is set to the B/L mode when the hot water temperature is within the certain range. However, when the internal air temperature Ts is already risen up due to radiation or the like, it is desirable to change the blow-out port mode from the B/L mode to the FOOT mode early so as to prevent occurring the over-heating to the upper body in the B/L mode.

Therefore, in this embodiment, the neural network 3100 further inputs the internal air temperature Tr as its input as shown in FIG. 51. A changing timing, at which the blow-out port mode is changed from the B/L mode to the FOOT mode, is changed to early timing when the internal air temperature rises over a predetermined temperature. Hence, it can restrain occurring the over-heating to the upper body in the B/L mode in advance. That is, even if the external air temperature is equal, when the internal air temperature Tr rises over the predetermined temperature, a threshold value (hot water temperature), at which the blow-out port mode is changed from the B/L mode to the FOOT mode, is changed to low temperature side.

(Sixth embodiment)

The neural network 3100 of the fifth embodiment input the internal air temperature Tr as an additional input. In this embodiment, the neural network 3100 inputs a skin temperature signal Th, which is output from a skin temperature detecting sensor (not shown) for detecting a skin temperature of the passenger, replace with the internal air temperature as shown in FIG. 52.

According to this embodiment, when the skin temperature Th of the passenger rises over a predetermined temperature due to the radiation or the like, a threshold value (hot water temperature), at which the blow-out port mode is changed from the B/L mode to the FOOT mode, is changed to low temperature side. Hence, it can restrain occurring the over-heating to the upper body in the B/L mode in advance.

(Seventh embodiment)

The seventh embodiment is modification of the fourth embodiment. In this embodiment, the neural network 3100 is equal to that shown in FIG. 39, which inputs the external air temperature Tam as an additional input. In this embodiment, a changing point of the blow-out port mode is changed with respect to the external air temperature Tam.

When the TAO is in a high temperature side (heating area), the changing point (between the B/L mode and the FOOT mode) at the low external air temperature (Tam=−10° C.) is set low than that at the high external air temperature (Tam=10° C.) with respect to the TAO. Hence, it can enlarge a FOOT mode area so as to perform the foot heating positively. Consequently, in can improve the heating feeling in the low external air temperature.

When the TAO is in a low temperature side (cooling area), the changing point (between the B/L mode and the FACE mode) at the high external air temperature (Tam=30° C.) is set high than that at the low external air temperature (Tam=10° C.) with respect to the TAO. Hence, it can enlarge a FACE mode area so as to perform the face cooling positively. Consequently, in can improve the cooling feeling in the high external air temperature.

(Eighth embodiment)

In this embodiment, the present invention is adopted to an air-conditioning device for automobiles, which is capable of controlling independently between a driver seat (Dr) side air-conditioning zone and a passenger seat (Pa) side air-conditioning zone in a passenger compartment.

In an air-duct 3002, a partitioning wall 3002*a* is arranged from the heater core 3005 portion to its downstream side in the air duct 3002 to divide it into a Dr side air passage 3002*b* and a Pa side air passage 3002*c*.

A Dr side air-mixing door 3061 is arranged at the upstream side of the heater core 3005 in the Dr side air passage 3002*b*. The Dr side air-mixing door 3061 adjusts a ratio of two air amount in the Dr side air passage 3002*b*, an amount of heated air passed through the heater core 3005 and an amount of cooled air by-passed the heater core 3005. A Pa side air-mixing door 3062 is arranged at the upstream of the heater core 3005 in the Pa side air passage 3002*c*, and adjusts a ratio of two air amount in the Pa side air passage 3002*c*. Here, the two air amount are an amount of heated air passed through the heater core 3005 and an amount of cooled air by-passed the heater core 3005.

At the most downstream side of the Dr side air passage 3002*b*, a foot blow-out port 3008*a*, face blow-out ports 3009a, 3009b are provided. At the most downstream side of the Pa side air passage 3002c, a foot blow-out port 3008b, face blow-out ports 3009c, 3009d are provided. Blowout port change-over doors 3011a, 3012a are arranged to selectively open/close the Dr side foot blow-out port 3008a and the face blow-out ports 3009a, 3009b. Blowout port change-over doors 3011b, 3012b are arranged to selectively open/close the Pa side foot blow-out port 3008b and the face blow-out ports 3009c, 3009d. A defroster blow-out port 3010 and its blow-out port change-over door 3013 are provided in the same way as the second embodiment.

The Dr side air-mixing door 3061 and the Pa side air-mixing door 3062 are driven by independent servomotors 3015 and 3015a. The Dr side blow-out port change-over doors 3011a, 3012a and the Pa side blow-out port change-over doors 3011b, 3012b are driven by independent servomotors 3160 and 3170. Each of predetermined blow-out mode, such as a FACE mode (FACE), a BI-LEVEL mode (B/L mode), and a FOOT mode (FOOT) or the like can be set with respective to each ports 3002c, 3002c, independently, by changing the open/close condition of the blow-out port change-over doors 3011a, 3012a, 3011b and 3012b.

A Dr side temperature setter (first temperature setter) 3021a is provided to set a setpoint temperature Tset(Dr) of the Dr side air-conditioning zone relative to the Dr side air passage 3002b, and output the setpoint temperature Tset (Dr) to the ECU 3019. A Pa side temperature setter (second temperature setter) 3021b is provided to set a setpoint temperature Tset(Pa) of the Pa side air-conditioning zone relative to the Pa side air passage 3002c, and output the setpoint temperature Tset(Pa) to the ECU 3019. Both temperature setters 3021b, 3021c are provided independently each other.

A Dr side radiation sensor 3024a is arranged to detect a radiation amount TsDr to the Dr side air-conditioning zone, and a Pa side radiation sensor 3024b is arranged to detect a radiation amount TsPa to the Pa side air-conditioning zone.

As temperature data detectors, an internal air sensor 3022 to is arranged detect an internal air temperature Tr. An external air sensor 3023 is arranged to detect an external air temperature Tam. An evaporator temperature sensor 3025 is arranged to detect a cooling temperature (blow-out air temperature) of the evaporator 3004. A water temperature sensor 3026 is arranged to detect a temperature Tw of hot water flowing into the heater core 3005.

Control functions processed by the microcomputer in the ECU 3019 are executed independently between the Dr side and the Pa side as shown in FIG. 31. In this figure, subscript "a" after symbol means Dr side functions, and "b" after symbol means Pa side functions.

A blower voltage TBLO, which decides an air amount, calculated as follows. A Dr side blower voltage level TBLO (Dr) and a Pa side blower voltage level TBLO(Pa) are calculated by an air amount calculating portions 3032a, 3032b. Then, an average of the blower voltage TBLO(Dr) and the blower voltage TBLO(Pa) are calculated by an air amount calculating portion 3032c. The averaged value is output as a final blower voltage TBLO.

Blowout port mode calculating portions 3031a, 3031b are provided to calculate a Dr side blow-out port mode signal TMODE(Dr) and a Pa side blow-out port mode signal TMODE(Pa) independently.

A neural network 3100, which constitutes each the Dr side blow-out port mode calculating portion 3031a and the Pa side blow-out port mode calculating portion 3031b, inputs one of the Dr side target blow-out temperature TAO(Dr) and the Pa side target blow-out temperature TAO(Pa), and further inputs one of the Dr side radiation amount TsDr and the Pa side radiation amount TsPa. Then, one of the Dr side blow-out port mode signal TMODE(Dr) and the Pa side blow-out port mode signal TMODE(Pa) is calculated independently.

A neural network 3200, which constitutes each a Dr side temporary target temperature calculating portion 3027a and a Pa side temporary target temperature calculating portion 3027b, inputs one of setpoint temperatures Tset(Dr) and Tset(Pa) of each the Dr side and the Pa side, and further inputs a difference ($\Delta$Tset) between the setpoint temperatures Tset(Dr) and Tset(Pa). By inputting the difference ($\Delta$Tset), it can restrain a temperature interference between the first air-conditioning zone and in the second air-conditioning zone.

Figure 56:
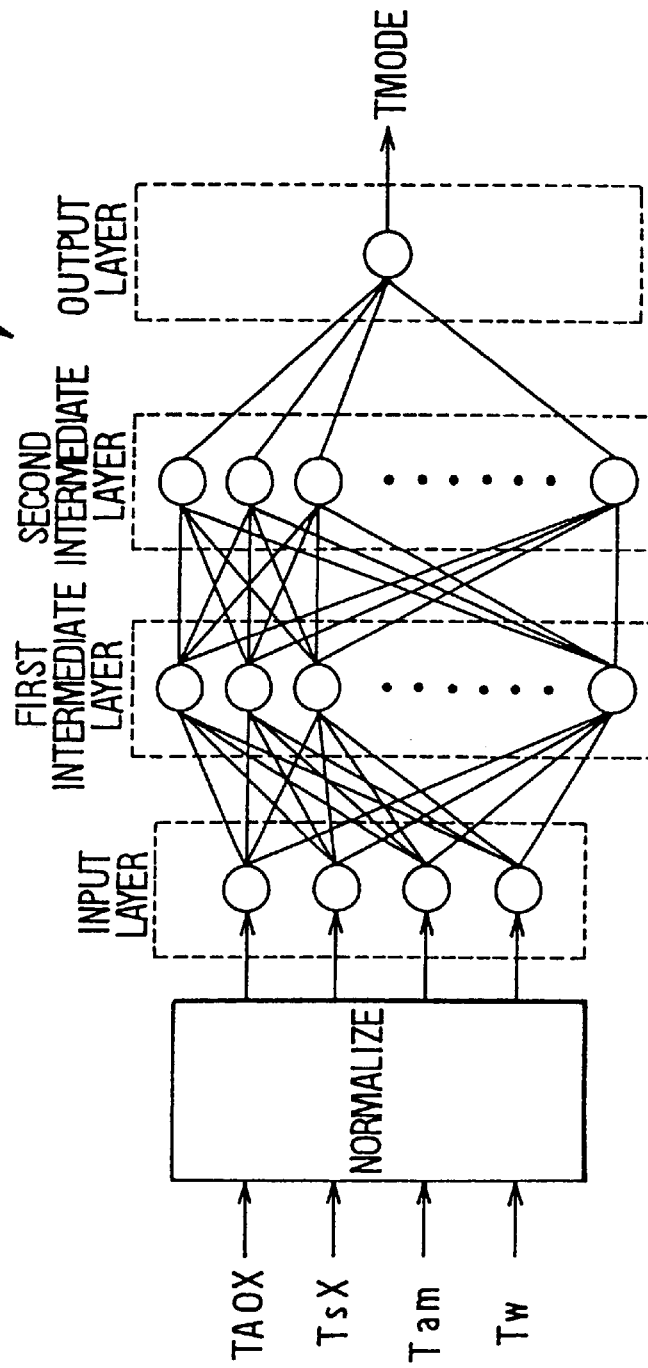
FIG. 56 is a schematic diagram of a neural network of blow-out port mode calculating portion of the eighth embodiment.

Here, in this embodiment, it is acceptable to control both the Dr side blow-out port mode and the Pa side blow-out port mode in the same way. That is, it does not need to control independently. In that case, as shown in FIG. 56, a neural network 3100 inputs an average TAOX, which is an averaged value of a Dr side target blow-out temperature TAO(Dr) and a Pa side target blow-out temperature TAO (Pa), and further input an average TsX, which is an averaged value of the Dr side radiation amount TsDr and the Pa side radiation amount TsPa. Then, the neural network 3100 calculates the blow-out port mode signal TMODE.

The fourth to eighth embodiments can be also modified as follows.

(1) In the above-described embodiment, the target blow-out temperature TAOi, the air amount (blower voltage level) are calculated via the neural networks 3200, 3300, 3400. However, it is acceptable to calculate one of them by conventional calculation without neural networks.

(2) The air-mixing doors 3006, 3061, 3062 are arranged to adjust the mix ratio of cooled air and heated air as the temperature adjuster. However, it is replaceable with a hot water valve to control an amount of hot water flowing into the heater core 3005 or a temperature of the hot water.

(3) In the eighth embodiment, the neural network 3100 inputs the average value of the Dr side target blow-out temperature TAO(Dr) and the Pa side target blow-out temperature TAO(Pa). However, it is acceptable to change weights of one of the Dr side target blow-out temperature TAO(Dr) and the Pa side target blow-out temperature TAO (Pa). That is, it acceptable for neural network 3100 to input a changed target blow-out temperature TAO'. For example, TAO'=TAO(Dr)×80(%)+TAO(Pa)×20%

(4) As the temperature setter 3021, 3021a, 3021b for setting the temperature of the air-conditioning zones, it can be used an analog display in which indicates the temperature without digital figures, e.g., the temperature is indicated by colors.

(5) The present invention can be adaptable to another air-conditioning device, which has plurality of air-conditioning zone, and is needed to control each of temperature of blow-out air to each zones independently.

(6) The neural networks 3100–3400 are replaceable with recurrent type neural networks.

(Ninth Embodiment)

Figure 57:
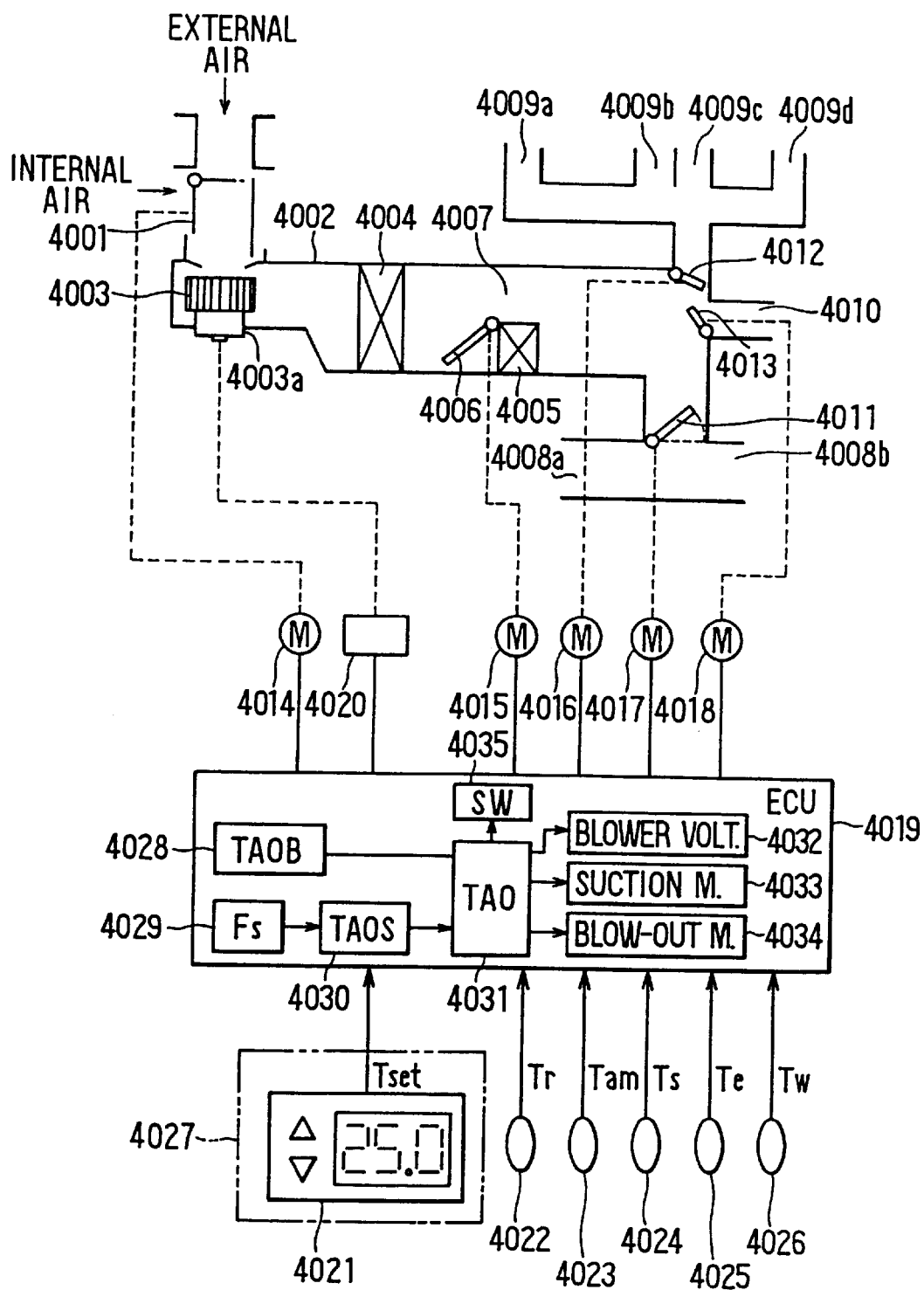
FIG. 57 is a diagram illustrating the constitution of whole system of an air-conditioning device according to a ninth embodiment of the present invention.

A fourth embodiment of the present invention will be described hereinafter with reference to FIGS. 57–64. FIG. 57 is a diagram illustrating the constitution of whole system of an air-conditioning device for automobiles.

In FIG. 57, an internal air/external air change-over door 4001 is arranged at the most upstream side of air flow in the air-conditioning device for automobiles. One of an external air and an internal air is selectively introduced into an air duct 4002 by moving the door 4001.

The air duct 4002 constitutes an air passage of the air-conditioning device. A blower 4003, an evaporator 4004 and a heater core 4005 are arranged from upstream side to downstream side in the air duct 4002. The evaporator 4004 is a cooling heat exchanger for cooling an air by absorbing an evaporating latent heat of a refrigerant in a refrigerating cycle from the air. The heat core 4005 is a heating heat exchanger for heating air with heat from a hot water (engine coolant) from a vehicle engine (not shown).

An air-mixing door 4006 as a temperature adjuster is arranged at the upstream of the heater core 4005. The air-mixing door 4006 adjusts a ratio of two air amount, wherein an amount of heated air passed through the heater core 4005 and an amount of cooled air by-passed the heater core 4005. The adjusting the ratio of heated air and cooled air can adjusts the blow-out air temperature to a passenger component of the automobile.

At the most downstream side of the air duct 4002, foot blow-out ports 4008a, 4008b, face blow-out ports 4009a–4009d, and a defroster blow-out port 4010 are provided. Here, the foot blow-out ports 4008a, 4008b are provided to blow the conditioned air onto the feet of the passengers. The face blow-out ports 4009a–4009d are provided at each of center portion and side portion in the passenger component to blow the conditioned air to the upper half of the body of the passengers. The defroster blow-out port 4010 is provided to blow the conditioned air to a windshield.

At the most downstream side of the air duct 4002, blow-out port change-over doors 4011–4013 are arranged to selectively open/close the blow-out ports 4008a, 4008b and 4009a–4009d. Each of predetermined blow-out modes, such a FACE mode (FACE), a BI-LEVEL mode (B/L mode), a FOOT mode (FOOT), and a defroster mode or the like can be set by changing the open/close condition of the doors 4011–4013.

Here, a control system for controlling the air-conditioning device will be explained. The internal air/external air changing door 4001, the air-mixing door 4006, and the blow-out port change-over doors are driven by servomotors 4014–4018. The servomotors 4014–4018 are controlled by outputs of an air-conditioning electric control device 4019 (hereinafter, called "ECU 4019"). A motor 4003a of the blower 4003 is also controlled by the output of the ECU 4019 via a motor control circuit 4020 (motor applied voltage control circuit).

An air amount blown by the blower 4003 is adjusted by the motor control circuit 4020 by way of changing a rotation speed of the motor with an applied voltage to the motor. The ECU 4019 includes a microcomputer and its peripheral circuits.

A temperature setter 4021 is provided to an air-conditioning control panel 4027 to set a setpoint temperature Tset of the passenger component, which is input to the ECU 4019. The temperature setter 4021 is arranged an air-conditioning control panel, and is manually controlled by users.

As temperature data detectors, the following sensors are provided. That is, an internal air sensor 4022 is provided to detect an internal air temperature Tr. An external air sensor 4023 is provided to detect an external air temperature Tam. A radiation sensor 4024 is provided to detect a radiation amount Ts to the passenger component. An evaporator temperature sensor 4025 is provided to detect a cooling temperature Te (blow-out air temperature) of the evaporator 4004. A water temperature sensor 4026 is provided to detect a water temperature Tw of hot water flowing into the heater core 4005.

Control functions processed by the microcomputer in the ECU 4019 is generally divided as follows. The ECU 4019 includes a temporary target temperature calculating portion 4028, a radiation correction coefficient calculating portion 4029, a radiation amount correction calculation portion 4030, a target temperature calculating portion 4031, an air amount calculating portion 4032, a suction port mode calculating portion 4033, an blow-out port calculating portion 4034, and an air-mixing door opening degree calculating portion 4035.

The temporary target temperature calculating portion 4028 calculates a temporary target blow-out temperature. The temporary target temperature calculating portion 4028 inputs signals including the setpoint temperature Tset, the internal air temperature Tr and the external air temperature Tam, and calculates the temporary target blow-out temperature TAOB based on the input signals by an equation (7) described after.

Figure 58:
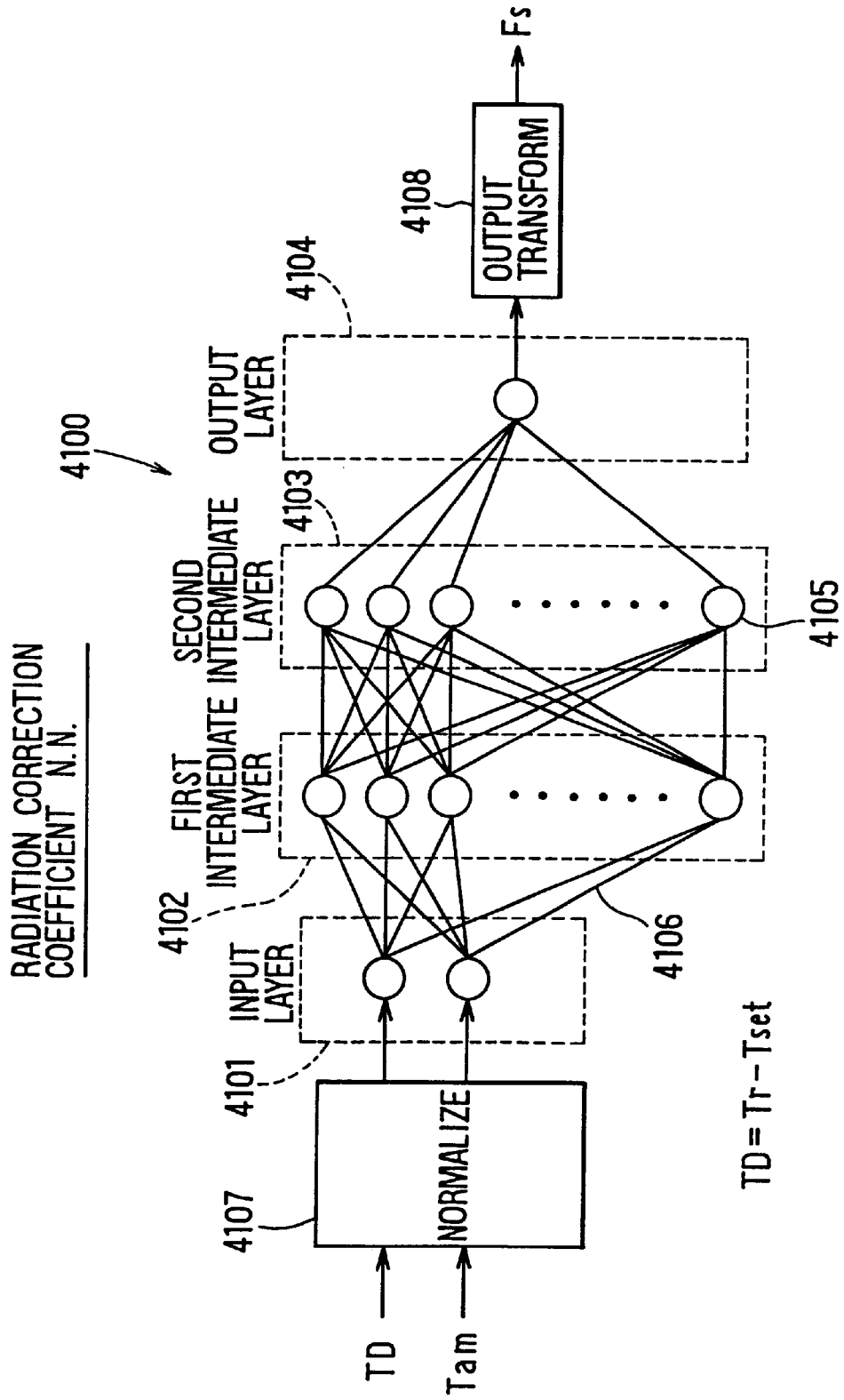
FIG. 58 is a schematic diagram of a neural network of a radiation correction coefficient calculating portion of the ninth embodiment.

The radiation correction coefficient calculating portion 4029 calculates a radiation correction coefficient Fs, and includes a neural network 4100 as shown in FIG. 58. The radiation correction coefficient calculating portion 4029 inputs signals including a temperature difference TD between the setpoint temperature Tset and the internal air temperature Tr, and the external air temperature Tam. Then, the radiation correction coefficient calculating portion 4029 calculates the radiation correction coefficient Fs via the neural network 4100. Then, the radiation amount correction calculating portion 4030 calculates the radiation amount correction TAOS based on the radiation correction coefficient Fs and the amount of (solar) radiation Ts by using an equation described after.

The target temperature calculating portion 4031 calculates the final target blow-out temperature TAO based on the output signals from the temporary target temperature calculating portion 4028 and the radiation amount correction calculating portion 4030.

The air amount calculating portion 4032 inputs the target blow-out temperature TAO and calculates a blower voltage for deciding an mount of air from the blower based on a characteristic of FIG. 61 described after.

Figure 62:
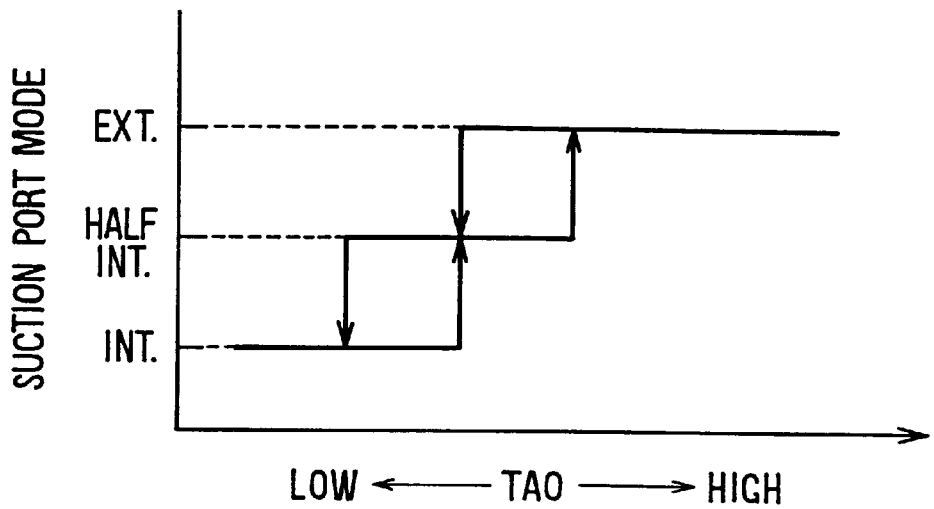
FIG. 62 is a diagram of characteristics illustrating a calculation of a suction port mode according to the ninth embodiment.

The suction port calculating portion 4033 inputs the target blow-out temperature TAO and calculates a suction port mode of internal and external air based on a characteristic of FIG. 62 described after.

Figure 63:
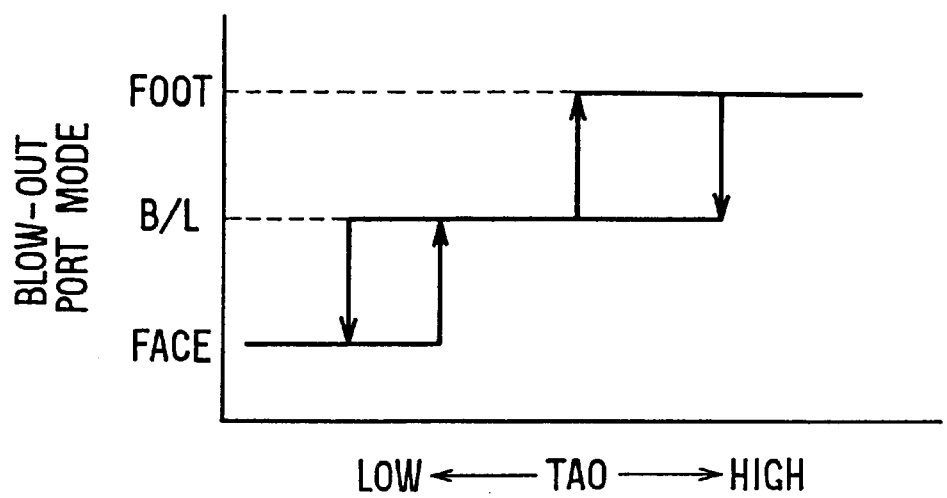
FIG. 63 is a diagram of characteristics illustrating a calculation of a blow-out port mode according to the ninth embodiment.

The blow-out port calculating portion 4034 inputs the target blow-out temperature TAO and calculates a blow-out port mode of internal and external air based on a characteristic of FIG. 63 described after.

The air-mixing door opening degree calculating portion 4035 inputs the target blow-out temperature TAO and calculates an air-mixing door opening degree SW by using an equation (10) described after.

The constitutions of the neural networks 4100, which constitutes the radiation correction coefficient portion 4029, will be explained with reference to FIG. 58.

As shown in FIG. 58, the neural network 4100 includes an input layer 4101, a first intermediate layer 4102, a second intermediate layer 4103, and output layer 4104. Each of the input layer 4101, the first and the second intermediate layers 4102, 4103 has a plurality of neurons 4105, and output layer has one neuron 4105. Each of neurons 4105 in the input layer 4101 is connected to each of neurons 4105 in the first intermediate layer 4102 with a certain link coefficient 4106

(synapse weight). Similarly, each of neurons 4105 in the first intermediate layer 4102 is connected to each of neurons 4105 in the second intermediate layer 4103 with a certain link coefficient 4106. Each of neurons 3405 in the second intermediate layer 4103 is connected to the neuron 4105 in the output layer 4104 with a certain link coefficient 4106. These neurons 4105 are formed by memories in the ECU 4019 in an actual circuit, and the neural network 4100 is formed by combined memories.

The neural network 4100, which is a network having a layered structure, has a Back Propagation Learning Function. The Back Propagation Learning Function can automatically correct the link coefficients 4106 between each neurons among the input layer 4101, the first and second intermediate layers 4102, 4103, and output layer, so as to adjust its output to a desired value (teacher signal) related to input signals such as TD or Tam.

When the teacher signal is changed, the link coefficients 4106 are adjusted by repeatedly "learning" so as to correct the output to be the changed teacher signal related to the input signals. In other words, based on a large number of desired data (teacher signals), a correlation function (link coefficients 4106) is automatically generated. The teacher signals are determined to desired values obtained by an experience or the like (desired output for the input signals).

In the layered structure neural network 4100, there is no connection among each of the neurons 4105 in an identical layer, but the neurons 4105 in each layer are connected to only neurons 4105 in forward and backward layers. The clink coefficients 4106 between each neuron 4105 in each layer represent a weight of connection (magnitude). The larger the weight of connection, the larger an amplitude of signal, which is output from each neuron 4105 and propagated to neurons 4105 in backward layer.

Here, the input signals (TD, Tam) are normalized to 0–1 value before inputting to the neural network 4100 by a normalize portion 4107. The output signal from the neural network 4100 is transformed in reverse procedure of the normalize portion 4107 by an output transform portion 4108. For example, actual detected internal temperature Tr detected by the internal air sensor is normally in a range from −30° C. to 50° C. This detected value is assigned to a certain value in a range from 0 to 1 in the normalize portion 4107, and is output to the input layer 4101 in the neural network 4100. Since the output signal from the output layer 4104 is a value in the range from 0 to 1, this output signal is transformed to the actual value corresponding to the sensor signal in the reverse procedure by using a predetermined transformation map in the output transform portion 4108.

The environment conditions, of which the air-conditioning device for vehicle faces, are variable, as described above. Therefore, the number of the teacher signals, which are desired values related to the various environment conditions, will be enormously.

Therefore, in a designing process of the ECU 4019, the learning is executed by a high-speed calculator including a neural network, which is the same as the neural network 4100, before mounted to the vehicle. The high-speed calculator calculates the link coefficients 4106 so that the output of the neural network is to be desired teacher signals for various input signals. Then, the calculated coefficients 4106 are memorized in a memory portion (ROM) corresponding to the neural network 4100 in the radiation correction coefficient calculating portion 4029 of the ECU 4019 shown in FIG. 57.

Therefore, when the ECU 4019 is mounted on the vehicle, the link coefficients 4106 among the neurons 4105 in each layer are set to predetermined value.

After mounted on the vehicle, the neural network 4100 in ECU 4019 calculate an output for input signals as shown in FIG. 59A. Specifically, in each of the neurons 4105, each of the input signals $O_1$–$O_n$ is multiplied by each of the corresponding coefficients 4106 ($W_1$–$W_n$), and multiplied value are adapted to a so-called sigmoid function as shown FIG. 59B. The calculated results of the sigmoid function are output to the neurons 4105 in backward layer. These calculations are repeated between each layer to decide a final output.

Since the neural network 4100 in each calculating portion of mounted ECU 4019 is previously set so that the desired value for the various input signals $O_1$–$O_n$ can be obtained, learning for correction of the link coefficients does not needed.

Therefore, the neural networks 4100 of the radiation correction coefficient calculating portion 4029, as shown in FIG. 57, calculates and outputs the desired value as the radiation correction coefficient Fs in relation to the changes of input signals (TD, Tam).

Figure 60:
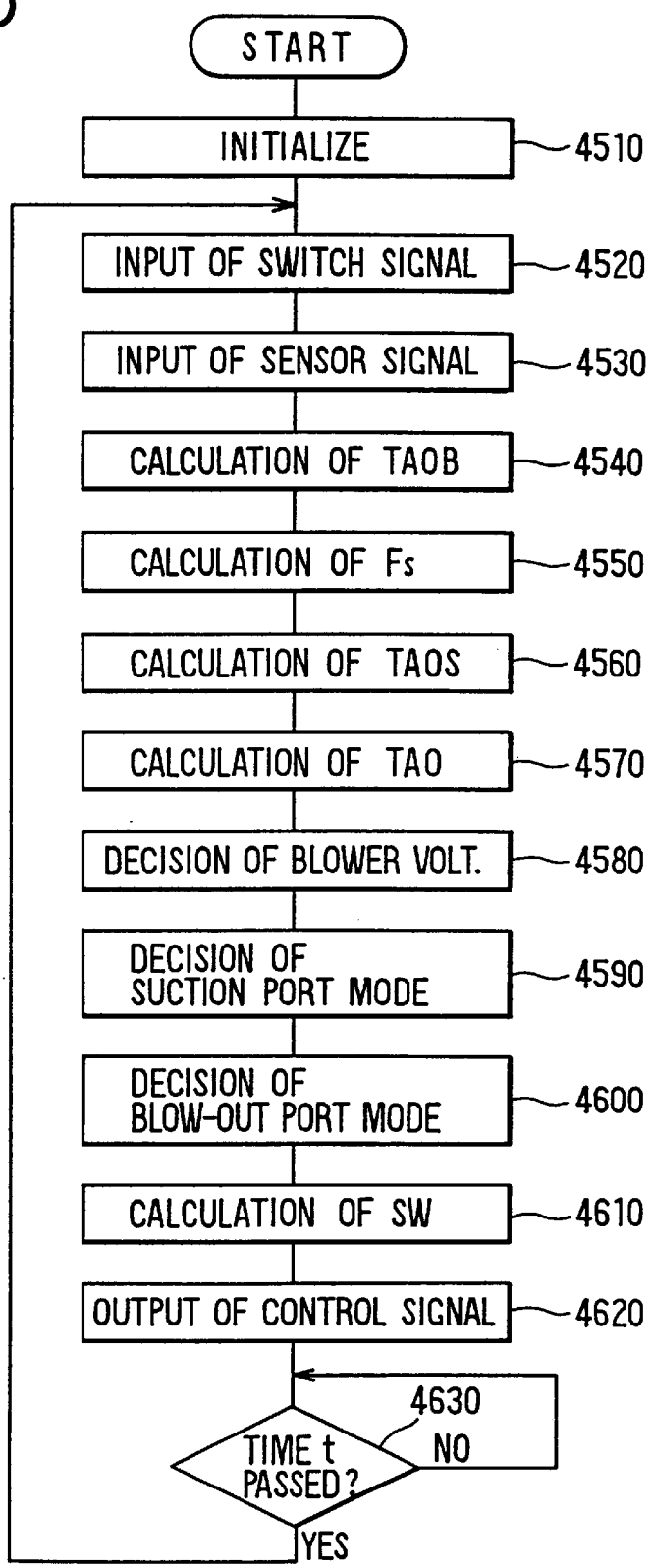
FIG. 60 is a flow chart illustrating a control flow according to the ninth embodiment.

The control flow according to the preferred embodiment will be explained with reference to a flow chart shown in FIG. 60. This control routine starts when the ECU 4019 is powered by turning on an ignition switch (not shown) of the Vehicle.

At step 4510, a memory or the like in the ECU 4019 are initialized. At step 4520, the ECU 4019 inputs signals from control switches including the temperature setter 4021 of the air-conditioning control panel 4027 and so on.

At step 4530, the ECU 4019 inputs sensor signals from the sensors (4022–4026).

At step 4540, the temporary target blow-out temperature TAOB is calculated by eliminating a radiation term in the following equation (7). The step 4540 corresponds to the temporary target temperature calculating portion 4028 in FIG. 57.

$$TAOB = Kset \times Tset - Kr \times Tr - Kam \times Tam + C \qquad (7)$$

Here, Tset is the setpoint temperature, Tr is the internal air temperature, Tam is the external air temperature, Kset is a temperature set gain, Kr is an internal air temperature gain, Kam is an external air temperature gain, and C is an correction constant value.

At step 4550, the ECU 4019 inputs external air temperature and the temperature difference TD between the setpoint temperature Tset, and calculates the radiation correction coefficient Fs. The step 4550 corresponds to the radiation correction coefficient calculating portion 4029 in FIG. 57.

At step 4560, the radiation amount correction TAOS is calculated by multiplying the radiation correction coefficient Fs, the radiation Ts from the radiation sensor 4024, and a radiation correction proportional gain Ks. The step 4560 corresponds to the radiation amount correction calculating portion 4030 in FIG. 57.

$$TAOS = Ks \times Fs \times Ts \qquad (8)$$

Here, the radiation amount correction TAOS can be adjusted by adjusting the radiation correction proportional gain Ks in the equation (8). Therefore, when the radiation amount TAOS needs to be adjusted based on an air-conditioning feeling result of actual running test, the radiation amount correction TAOS can be adjusted by the radiation correction proportional gain Ks without changing the radiation correction coefficient Fs. Therefore, it does not need to have the neural network learn again to adjust the radiation amount correction TAOS.

At step 4570, the target blow-out temperature TAO is calculated based on the temporary target blow-out temperature TAOB And the radiation amount correction TAOS by using the following equation (9). The step 4570 corresponds to the target blow-out temperature calculating portion 4031 in FIG. 57.

$$TAO=TAOB-TAOS \tag{9}$$

At step 4580, the blower voltage is calculated based on the target blow-out temperature TAO with reference to a relationship (map) shown in FIG. 61. The step 4580 corresponds to the air amount calculating portion 4032 in FIG. 57.

At step 4590, the suction port modes of each the internal air, the external air, and the half internal air are calculated based on the target blow-out temperature TAO with reference to a relationship (map) shown in FIG. 62. The step 4590 corresponds to the suction port mode calculating portion 4033 in FIG. 57.

At step 4600, the blow-out port mode including FACE, B/L, FOOT mode is calculated based on the target blow-out temperature TAO with reference to a relationship (map) shown in FIG. 63. The step 4600 corresponds to the blow-out port mode calculating portion 4034 in FIG. 57.

Here, the relationships (maps) of FIGS. 61–63 are memorized previously in memories in the ECU 4019.

At step 4610, the air-mixing door opening degree SW is calculated based on the target blow-out temperature TAO, the temperature Te of the evaporator 4004, and a hot water temperature Tw of the heater core 4005 by using the following equation (10). The step 4610 corresponds to the air-mixing door opening degree calculating portion 4035 in FIG. 57.

$$SW(\%)=(TAO-Te)/(Tw-Te)\times 100 \tag{10}$$

At step 4620, the ECU 4019 outputs the values calculated at the steps 4580–4610 as control signals to each of actuators such as motors 4014–4018 and the motor applied voltage control circuit 4020 as shown in FIG. 57. Then, at step 4630, the ECU 4019 wait for passing a certain time "t". After the time "t" is over, it returns to the step 4520.

In this embodiment, the radiation correction coefficient Fs is calculated via the neural network 4100, and the radiation amount correction TAOS is calculated by multiplying the radiation correction coefficient FS, radiation signal Ts, and radiation correction proportional gain Ks. A merit of calculation using the above-mentioned procedure will be explained hereinafter.

Figure 64:
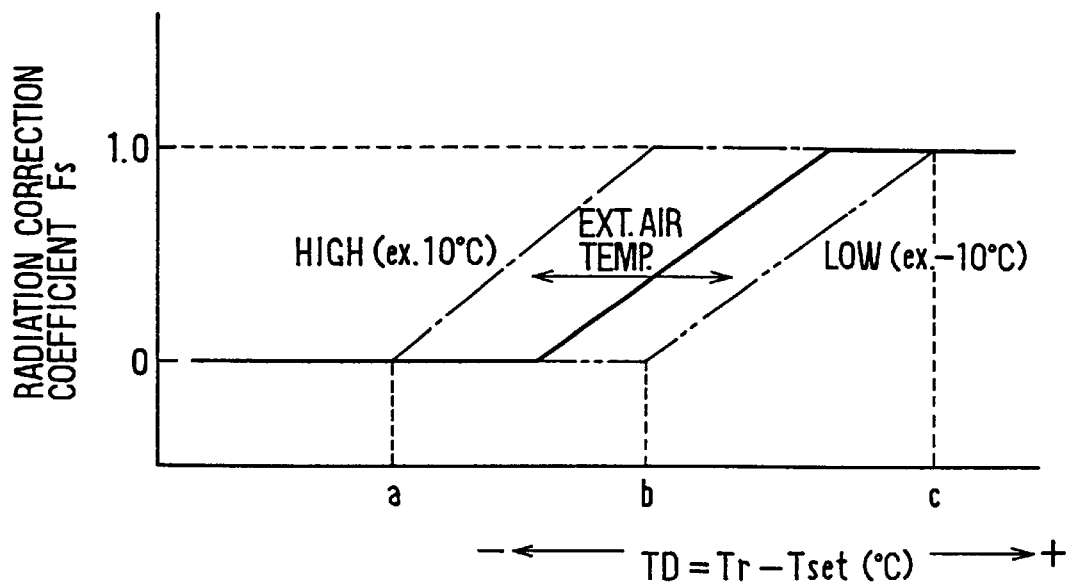
FIG. 64 is a diagram of characteristics illustrating a calculation of a radiation correction coefficient according to the ninth embodiment.

FIG. 64 shows a calculating procedure of the radiation correction coefficient Fs in a start timing of heating in winter. The abscissa represents a temperature difference TD (=Tr−Tset) between the internal air temperature Tr in the passenger component and the setpoint temperature Tset. This difference TD is in a minus because the internal air temperature Tr is lower than the setpoint temperature Tset.

When the external air temperature Tam is rather high (ex. 10° C.), the radiation correction is started from the point TD=−a. That is, the radiation correction efficient Fs starts to rise from 0 from the point TD=−a (at a point the internal air temperature is lower than the setpoint temperature by temperature "a"). When the external air temperature Tam is rather low (ex. −10° C.), the radiation correction is started from the point TD=−b. That is, the radiation correction efficient Fs starts to rise from 0 from the point TD=−b (at a point the internal air temperature is lower than the setpoint temperature by temperature "b").

In this way, the start point of radiation correction is delayed as the external air temperature is low. That is, the radiation correction is delayed until the internal air temperature reaches the setpoint temperature substantially. This delaying can keep the target blow-out temperature high in the start timing of heating in winter. That is, even if the temperature difference is equal value, the warm-up time can be shortened by decreasing the radiation amount correction so as to keep the TAO high when the external air temperature is low.

(Tenth Embodiment)

Figure 65A:
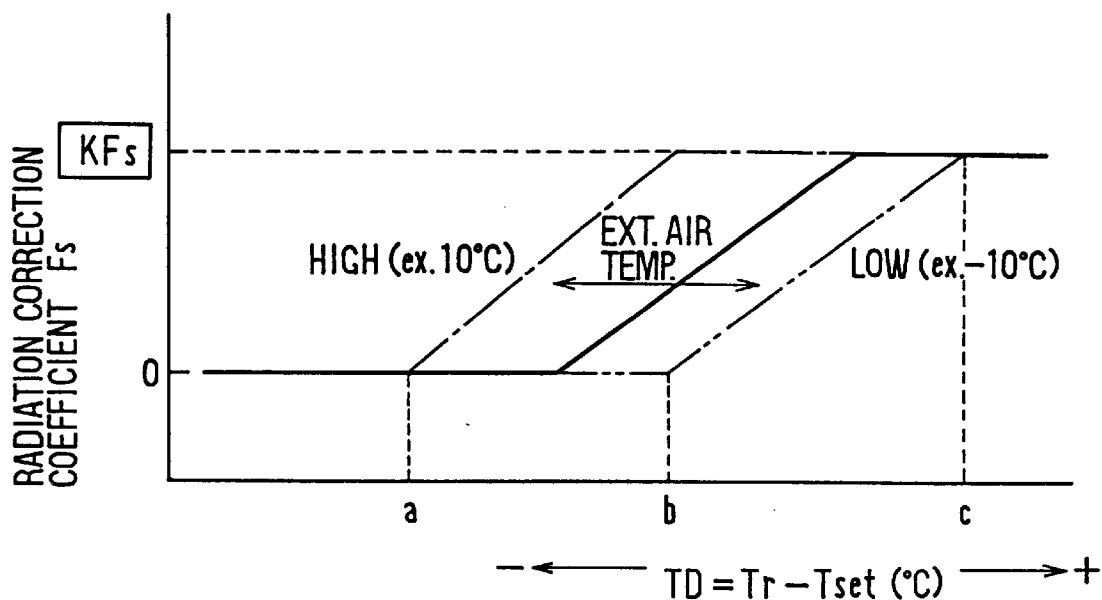
FIGS. 65A, 65B are diagrams of characteristics illustrating calculations of a radiation correction coefficient according to the tenth embodiment.
Figure 65B:
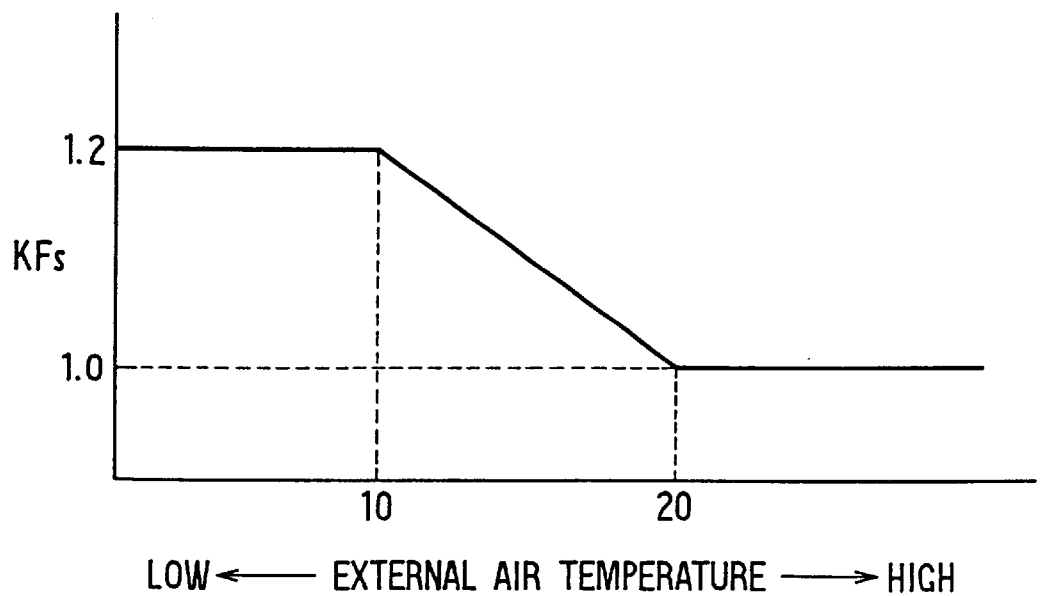

FIGS. 65A, 65B correspond to FIG. 64, and show a characteristic of a radiation correction according to the tenth embodiment. FIG. 65A is substantially equal to FIG. 64. In FIG. 65A, KFs represents a maximum value of the radiation correction coefficient Fs. FIG. 65B shows that the maximum value KFs of the radiation correction coefficient Fs is further changed in proportion to the external air temperature Tam.

As shown in FIG. 65A, the maximum value KFs is set in normal operation region of heating mode, when the temperature difference TD reaches zero as the internal air temperature reaches the setpoint temperature Tset in a start timing of heating in winter. Here, since an angle of the sun is rather small in winter, the solar radiation is likely to be radiated to upper body of the passenger. Then, the passenger may feel hot due to the radiation.

Therefore, in this embodiment, during the normal operation, the maximum value KFs is increased from 1.0 to 1.2 as the external air temperature Tam falls from 20° C. so as to increase the radiation amount correction. Hence, the TAO can be set to low temperature so as to set the blow-out port mode to B/L mode to blow cooled air from a face blow-out port. Then, the air-conditioning feeling can be improved.

(Eleventh Embodiment)

Figure 66:
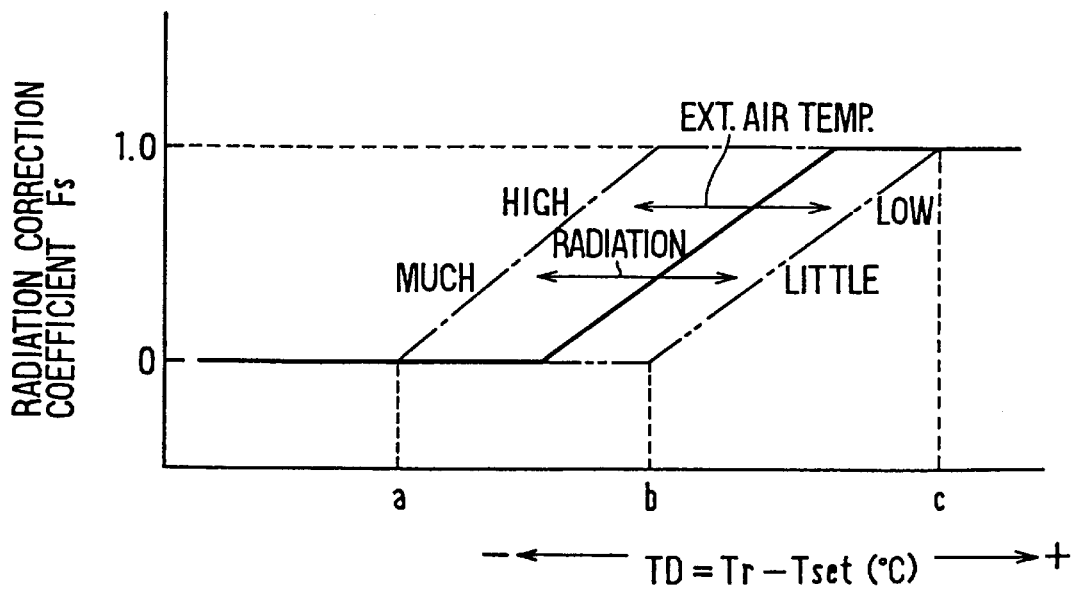
FIG. 66 is a diagram of characteristics illustrating a calculation of a radiation correction coefficient according to the eleventh embodiment.

The radiation correction coefficient Fs according to the eleventh embodiment is shown in FIG. 66. As shown in FIG. 67, the neural network 4100 of the radiation correction coefficient calculating portion 4029 inputs the radiation amount Ts in addition to the temperature difference TD and the external air temperature Tam.

In this embodiment, the start point of the radiation correction is delayed as the external air temperature Tam is low. Furthermore, when there is little radiation amount, the start point of the radiation correction is further delayed. Since this embodiment decides the radiation correction efficient Fs based on both the external air temperature Ts and the radiation amount Ts, the radiation amount correction can be calculated more accurately. Then, the warm-up time in the start timing of heating in winter can be shortened.

In this embodiment, it is acceptable that the maximum value KFs is increase as the external air temperature Tam falls so as to increase the radiation amount correction like the characteristic shown in FIG. 65B. Then, the air-conditioning feeling in the normal operation can be improved.

Figure 68:
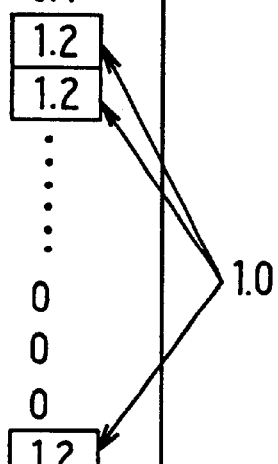
FIG. 68 is a diagram of characteristic illustrating a relationship between input conditions and a radiation correction coefficient output of the eleventh embodiment.

FIG. 68 is a diagram illustrating a relation between inputs 1–3 and an output (teacher signal) Fs of the neural network 4100. As shown in FIG. 68, when the temperature difference TD as the input1 is equal (−5° C., 0° C.), and the radiation amount Ts as the input 3 is equal (500 W/m$^2$), and the external air temperature is 10° C., the maximum value KFs is increased from 1.0 to 1.2 so as to obtain a desired radiation correction coefficient Fs and the desired radiation amount correction TAOS.

Here, the neural network has the learning function, which adjusts the link coefficients (synapse weights) 4106 between each neurons in each layers in the neural network automatically to correct its output to be desired data (teacher signal).

Therefore, the output at a specific input condition can be adjusted, by changing the teacher signal at the specific input condition and then adjusting the link coefficients 4106 automatically in advance.

By above-mentioned changing of output (change of the Fs from 1.0 to 1.2), the heat feeling of the passenger (user) due to the radiation to the his/her upper bodies can be reduced so as to improve the air-conditioning feeling of the passenger.

Furthermore, since the neural network adjusts its whole link coefficients 4106 so that the desired outputs (teacher signal) at the other input condition are maintained even if the output at the specific input condition is changed. Therefore, the output change at the specific input condition does not influence the outputs at the other input conditions.

Furthermore, since the correction of the link coefficients 4106 are adjusted automatically by using the learning function of the neural network, it will not be essential for the engineers to construct a complicated control logic such that the desired output can be obtained only at specific input condition. Hence, engineer's process can be eliminated substantially.

Since the complicated process does not needed, a capacitance of a memory (ROM) of the ECU 4019, which constitutes an air-conditioning electric control device, can be decreased.

Furthermore, in this embodiment, the temperature difference TD (=Tr−Tset) between the setpoint temperature Tset and the internal air temperature Tr is calculated, and then the calculated value is input to the neural network 4100. Therefore, the number of input to the neural network 4100 can be decreased compared to an input way inputting both of the Tset and the Tr.

Here, it may need to input both of the setpoint temperature Tset and the internal air temperature Tr to detect whether the operation area is in a transition area, which is just after the air-conditioning device starts (the internal air temperature is changing to the setpoint temperature), or the normal operation area. However, in this embodiment, this condition (the operation area is in the normal operation area) can be detected from the fact that the temperature difference TD between the internal air temperature Tr and the setpoint temperature Tset reaches substantially zero. Therefore, this embodiment can easily detect whether the transition area or the normal operation by inputting the temperature difference TD.

Since the number of input is decreased, the number of the layer in the neural network can be also decreased, the link coefficient can be decreased by about 25%, and the total learning time for calculating the link coefficient 4106 can be decreased largely.

It is acceptable to input both the setpoint temperature Tset and the internal air temperature Tr replaced with the temperature difference TD to the neural network 4100, if an increasing of the number of the input would be less than allowable condition.

(Twelfth Embodiment)

Figure 69:
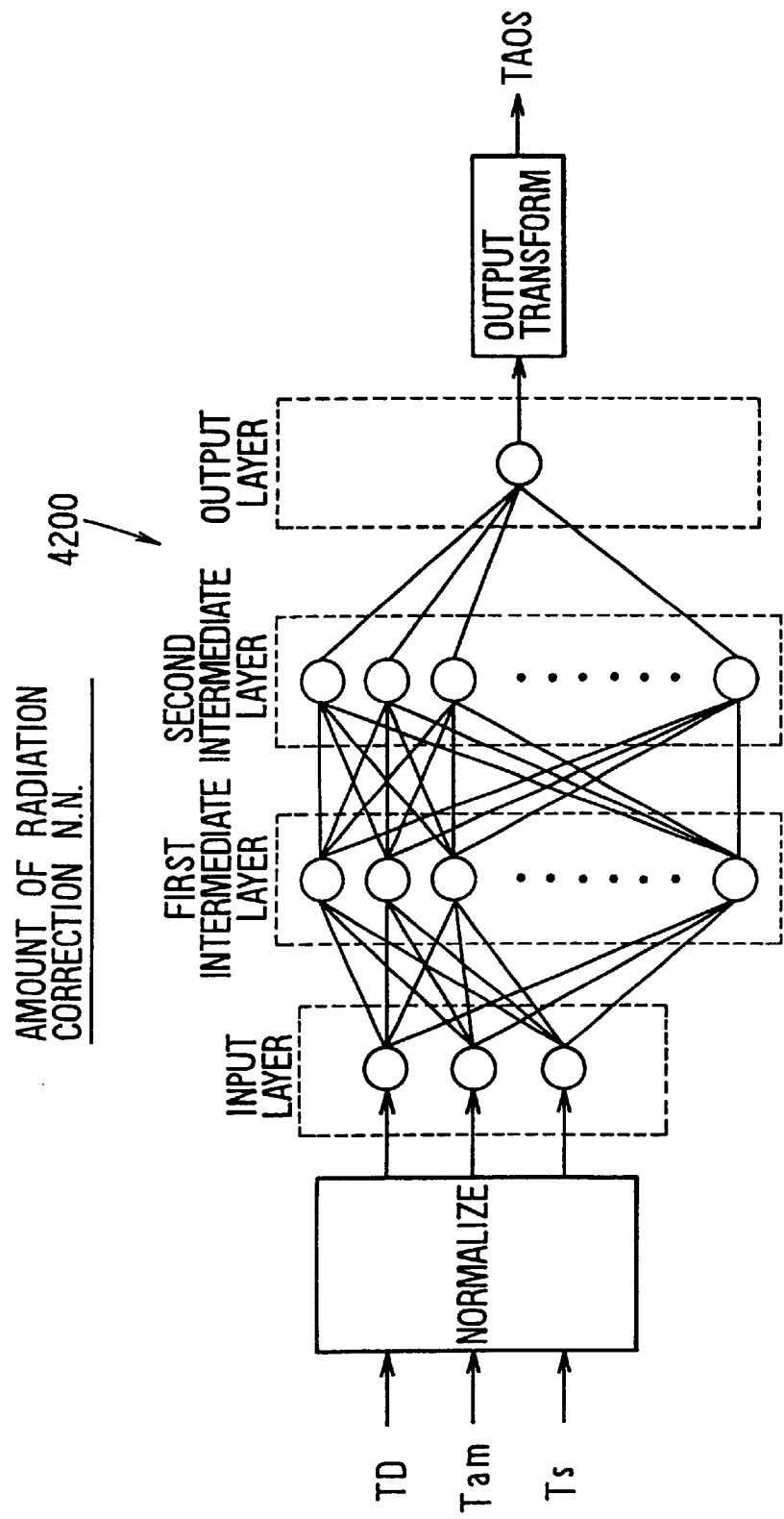
FIG. 69 is a schematic diagram of a neural network of a radiation correction coefficient calculating portion of the twelfth embodiment.

The twelfth embodiment will be explained with reference to FIG. 69. In this embodiment, the radiation correction coefficient calculating portion 4029 shown in FIG. 57 and the radiation amount correction calculating portion 4030 are combined, and the combined calculating portion is formed by one neural network 4200. That is, the neural network 4200 inputs signals including the temperature difference TD, the external air temperature Tam and the radiation amount Ts, and outputs the radiation amount correction TAOS directly.

(Thirteenth embodiment)

Figure 70:
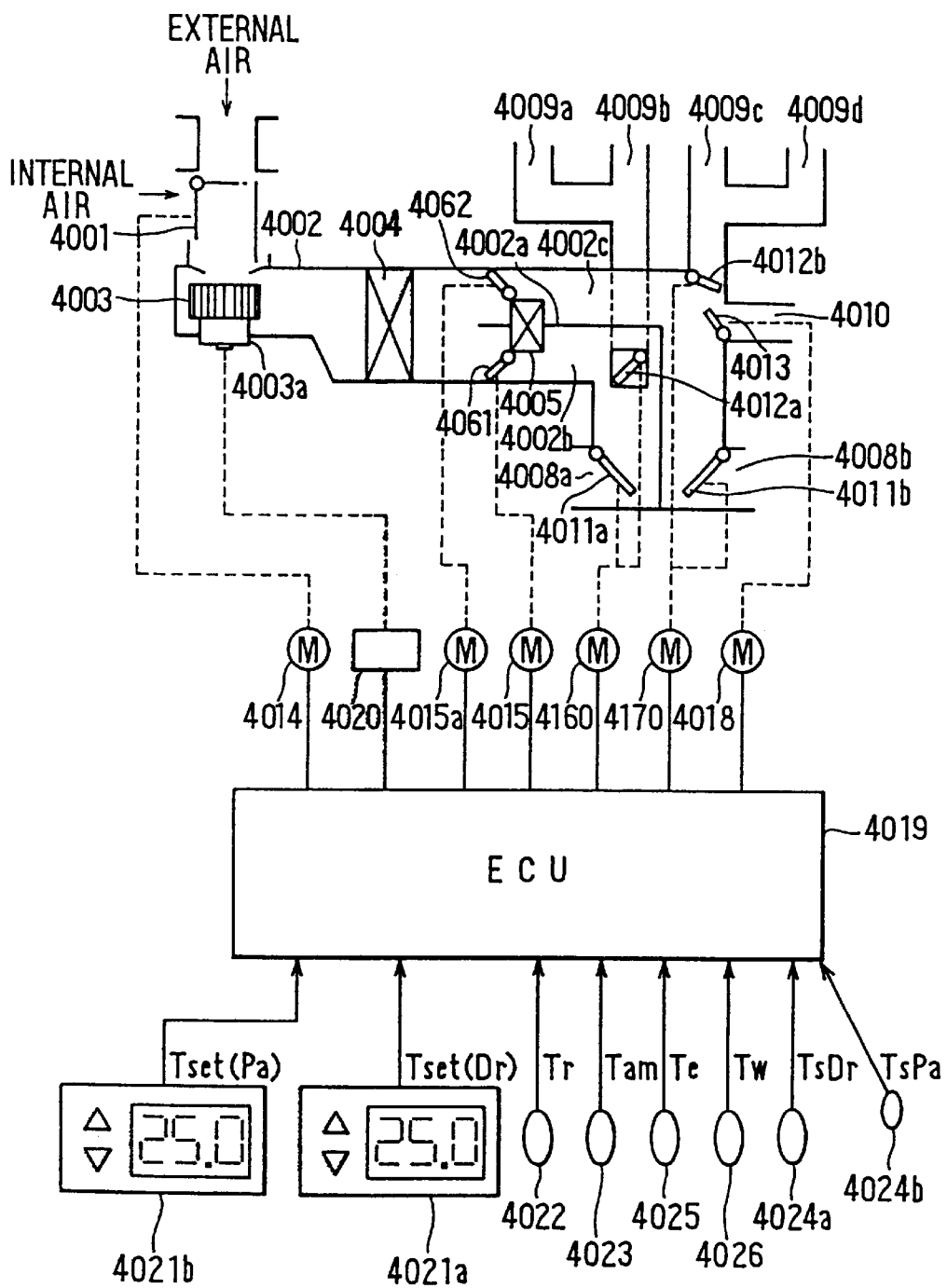
FIG. 70 is a diagram illustrating the constitution of whole system of an air-conditioning device according to a thirteenth embodiment of the present invention.

In this embodiment, as shown in FIG. 70, the present invention is adopted to an air-conditioning device for automobiles, which is capable of controlling independently between a driver seat (Dr) side air-conditioning zone and a passenger seat (Pa) side air-conditioning zone in a passenger compartment.

In an air-duct 4002, a partitioning wall 4002a is arranged from the heater core 4005 portion to its downstream side in the air duct 4002 to divide it into a Dr side air passage 4002b and a Pa side air passage 4002c.

A Dr side air-mixing door 4061 is arranged at the upstream side of the heater core 4005 in the Dr side air passage 4002b. The Dr side air-mixing door 4061 adjusts a ratio of two air amount in the Dr side air passage 4002b, an amount of heated air passed through the heater core 4005 and an amount of cooled air by-passed the heater core 4005. A Pa side air-mixing door 4062 is arranged at the upstream side of the heater core 4005 in the Pa side air passage 4002c, and adjusts a ratio of two air amount in the Pa side air passage 4002c. Here, the two air amount are an amount of heated air passed through the heater core 4005 and an amount of cooled air by-passed the heater core 4005.

At the most downstream side of the Dr side air passage 4002b, a foot blow-out port 4008a, face blow-out ports 4009a, 4009b are provided. At the most downstream side of the Pa side air passage 4002c, a foot blow-out port 4008b, face blow-out ports 4009c, 4009d are provided. Blowout port change-over doors 4011a, 4012a are arranged to selectively open/close the Dr side foot blow-out port 4008a and the face blow-out ports 4009a, 4009b. Blowout port change-over doors 4011b, 4012b are arranged to selectively open/close the Pa side foot blow-out port 4008b and the face blow-out ports 4009c, 4009d. A defroster blow-out port 4010 and its blow-out port change-over door 4013 are provided in the same way as the ninth embodiment.

The Dr side air-mixing door 4061 and the Pa side air-mixing door 4062 are driven by independent servomotors 4015 and 4015a. The Dr side blow-out port change-over doors 4011a, 4012a and the Pa side blow-out port change-over doors 4011b, 4012b are driven by independent servomotors 4160 and 4170. Each of predetermined blow-out mode, such as a FACE mode (FACE), a BI-LEVEL mode (B/L mode), and a FOOT mode (FOOT) or the like can be set with respective to each ports 4002b, 4002c, independently, by changing the open/close condition of the blow-out port change-over doors 4011a, 4012a, 4011b and 4012b.

A Dr side temperature setter (first temperature setter) 4021a is provided to set a setpoint temperature Tset(Dr) of the Dr side air-conditioning zone relative to the Dr side air passage 4002b, and output the setpoint temperature Tset(Dr) to the ECU 4019. A Pa side temperature setter (second temperature setter) 4021b is provided to set a setpoint temperature Tset(Pa) of the Pa side air-conditioning zone relative to the Pa side air passage 4002c, and output the setpoint temperature Tset(Pa) to the ECU 4019. Both temperature setters 4021b, 4021c are provided independently each other.

A Dr side radiation sensor 4024a is arranged to detect a radiation amount TsDr to the Dr side air-conditioning zone, and a Pa side radiation sensor 4024b is arranged to detect a radiation amount TsPa to the Pa side air-conditioning zone.

As temperature data detectors, an internal air sensor 4022 is arranged detect an internal air temperature Tr. An external air sensor 4023 is arranged to detect an external air temperature Tam. An evaporator temperature sensor 4025 is arranged to detect a cooling temperature (blow-out air temperature) of the evaporator 4004. A water temperature sensor 4026 is arranged to detect a temperature Tw of hot water flowing into the heater core 4005.

Control functions processed by the microcomputer in the ECU 4019 are executed independently between the Dr side and the Pa side. The control functions include Dr side and Pa side temporary target temperature calculating portions 4028, Dr side and Pa side radiation correction coefficient calculating portions 4029, Dr side and Pa side radiation amount correction calculating portions 4030, Dr side and Pa side target blow-out temperature calculating portions 4031, Dr side and Pa side blow-out port mode calculating portions 4034, Dr side and Pa side air-mixing door opening degree calculating portions and so on.

Therefore, one of the neural networks 4100, which constitute each Dr side radiation correction coefficient calculating portion 4029, inputs signals including the external air temperature Tam, Dr side temperature difference TDDr (=Tset(Dr)–TrDr), and Dr side radiation amount TsDr, and calculates Dr side radiation correction coefficient FsDr. Similarly, another of the neural networks 4100, which constitute each Pa side radiation correction coefficient calculating portion 4029, inputs signals including the external air temperature Tam, Pa side temperature difference TDPa (=Tset(Pa)–TrPa), and Pa side radiation amount TsPa, and calculates Pa side radiation correction coefficient FsPa.

Here, in this embodiment, it is acceptable to control both the Dr side blow-out port mode and the Pa side blow-out port mode in the same way. That is, it does not need to control independently. In that case, the blow-out port mode signal TMODE is calculated based on an average TAOX, which is an averaged value of a Dr side target blow-out temperature TAO(Dr) and a Pa side target blow-out temperature TAO(Pa). Similarly, the Dr side suction port mode and the Pa side suction port mode are controlled in the same way by using the same calculating procedure.

The ninth to thirteenth embodiments can be also modified as follows.

(1) In the above-described embodiment, in addition to the radiation correction coefficient calculating portion 4029, it is acceptable to form the other calculating portions by neural networks. Here, the other calculating portions include such as the temporary target temperature calculating portion 4028, the target blow-out temperature calculating portion 4031, the air amount calculating portion 4032, the suction port mode calculating portion 4034.

(2) The learning method of the neural network can be replaceable with Semi Newton method or the like instead of the above-mentioned back propagation method.

(3) The temperature difference TD can be obtained by using just Tr and Tset to calculate (Tr–Tset), or using another factor in addition to Tr and Tset.

(4) The air-mixing doors 4006, 4061, 4062 are arranged to adjust the mix ratio of cooled air and heated air as the temperature adjuster. However, it is replaceable with a hot water valve to control an amount of hot water flowing into the heater core 4005 or a temperature of the hot water.

(5) As the temperature setter 4021, 4021a, 4021b for setting the temperature of the air-conditioning zones, it can be used an analog display in which indicates the temperature without digital figures, e.g., the temperature is indicated by colors.

(6) The present invention can be adaptable to another air-conditioning device, which has plurality of air-conditioning zone, and is needed to control each of temperature of blow-out air to each zones independently.

(7) The neural networks 3100–3400 are replaceable with recurrent type neural networks.

What is claimed is:

1. An air-conditioning device, comprising:
   an air passage in which air flows;
   a blower disposed in the air passage;
   a heat exchanger disposed in the air passage, for exchanging heat with air flowing through the air passage;
   a face blow-out port arranged at a downstream side of the air passage, for blowing air in a FACE mode;
   a foot blow-out port arranged at a downstream side of the air passage, for blowing air in a FOOT mode;
   a temperature setter to set a room setpoint temperature;
   a temperature data detector to detect temperature data including a room internal air temperature and a room external air temperature;
   a radiation amount detector to detect a radiation amount to the room; and
   an air amount calculating portion including a neural network, for calculating an air amount blown by the blower,
   wherein the air amount calculating portion receives input signals including the room setpoint temperature, the room internal air temperature, the room external air temperature and the radiation amount, independently calculates an air amount in the FACE mode and an air amount in the FOOT mode via the neural network, selects one of the air amount in the FACE mode and the FOOT mode, and outputs a final air amount based on a mode signal input thereto.

2. An air-conditioning device according to claim 1, wherein both of the face blow-out port and the foot blow-out port output air in a B/L mode, and
   a control characteristic of the air amount at the B/L mode is equal to that of the FACE mode.

3. An air-conditioning device according to claim 1, wherein the neural network inputs a previously calculated temperature difference between the room internal air temperature and the room setpoint temperature.

4. An air-conditioning device according to claim 1, wherein the foot blow-out port outputs air to the foot of a passenger, and the face blow-out port outputs air to an upper body of the passenger.

5. An air-conditioning device according to claim 1, wherein:
   the air passage includes a driver seat side air passage for a driver seat side air-conditioning zone and a passenger seat side air passage for a passenger seat side air-conditioning zone,
   a driver seat side temperature adjuster and a passenger seat side temperature adjuster are arranged in the driver seat side air passage and the passenger seat side air passage, respectively,
   the face blow-out port and the foot blow-out port are arranged in both of the driver seat side air passage and the passenger seat side air passage, respectively, and
   temperatures of the first and the second air-conditioning zones are controlled independently by air blown from both the driver seat side air passage and the passenger seat side air passage.

6. An air-conditioning device, comprising:
   an air passage in which air flows;
   a blower disposed in the air passage;
   a heat exchanger disposed in the air passage, for exchanging heat with air;

a face blow-out port disposed at a downstream side of the air passage, for blowing air in a FACE mode;

a foot blow-out port disposed at a downstream side of the air passage, for blowing air in a FOOT mode;

a temperature setter to set a room setpoint temperature;

a temperature data detector to detect temperature data including a room internal air temperature and a room external air temperature;

a radiation amount detector to detect a radiation amount to the room; and an air amount calculating portion for calculating an air amount blown from the blower, wherein the air amount calculating portion receives input signals including the room setpoint temperatures, the room internal air temperature, the room external air temperature and the radiation amount, reduces the air amount blown by the blower in proportion to lowering of the room internal air temperature, wherein:

when an air-conditioning load based on the room external air temperature and the radiation amount is large, a decreasing point, at which the amount of air blown by the blower starts to decrease from a maximum area to the small amount area, is set to a high temperature side with respect to the room internal air temperature, and when an air-conditioning load based on the room external air temperature and the radiation amount is small, the decreasing point is set to a low temperature side with respect to the room internal air temperature.

7. An air-conditioning device according to claim 6, wherein the air amount calculating portion includes a neural network.

8. An air-conditioning device, comprising:

an air passage in which air flows;

a first and second blow-out port disposed at a downstream side in the air passage, for blowing conditioned air;

a temperature setter to set a room setpoint temperature;

a surrounding data detector to detects a surrounding physical quantity data in the room;

an air amount calculating portion includes a neural network, for calculating an air amount blown to the room, wherein the air amount calculating portion receives the surrounding physical quantity data as input data, and independently calculates an air amount to be supplied to the first and the second air passages, via the neural network.

9. An air-conditioning device, comprising:

an air passage in which air flows;

a blower disposed in the air passage;

a heat exchanger disposed in the air passage, to exchange heat with air;

a plurality of blow-out ports disposed at a downstream side in the air passage, to blow air to different directions;

a blow-out port changer to control an opening and a closing of each of the blow-out ports;

a temperature adjuster to adjust temperatures of air blown from the blow-out ports;

a temperature setter to set a room setpoint temperature;

a temperature data detector to detect temperature data including a room internal air temperature and a room external air temperature;

a target blow-out temperature calculating portion that receives the room setpoint temperature and the temperature data, and calculates a target blow-out temperature of air blown to the room;

a blow-out port mode calculating portion including a neural network, that receives the target blow-out temperature and a heat indication factor that influences a heating condition as input data, and calculates a blow-out port mode signal to control the blow-out port changer via the neural network.

10. An air-conditioning device according to claim 9, wherein the heat indication factor includes a radiation amount in the room.

11. An air-conditioning device according to claim 9, wherein:

the heat exchanger includes a heating heat exchanger for heating air by using hot water, and the heat indication factor includes the room external air temperature and a hot water temperature.

12. An air-conditioning device according to claim 9, wherein the heat indication factor includes the room internal air temperature.

13. An air-conditioning device according to claim 9, wherein the heat indication factor includes user skin temperature.

14. An air-conditioning device according to claim 9, wherein the signal indicating surrounding factor includes the room external air temperature.

15. An air-conditioning device for automobile, comprising:

an air passage in which air flows;

a blower disposed in the air passage;

a heat exchanger disposed in the air passage, to exchange heat with air;

a foot blow-out port disposed at a downstream side in the air passage, for blowing air in a FOOT mode;

a face blow-out port disposed at a downstream side in the air passage, for blowing air in a FACE mode;

a blow-out port changer to control an opening and a closing of each the blow-out ports;

a temperature adjuster to adjust temperatures of air blown from the blow-out ports;

a temperature setter to set a room setpoint temperature;

a temperature data detector to detects temperature data including a room internal air temperature and a room external air temperature;

a target blow-out temperature calculating portion that receives the room setpoint temperature and the temperature data, and calculates a target blow-out temperature of air blown to the room; and a blow-out port mode calculating portion includes a neural network, that receives the target blow-out temperature and a heat indication factor that influences a heating condition, and calculates a blow-out port mode signal to control the blow-out port changer via the neural network, wherein the blow-out port mode signal includes a FOOT mode signal for blowing air from the foot blow-out port, a FACE mode signal for blowing air from the face blow-out port, and a B/L mode signal for blowing air from both the foot blow-out port and the face blow-out port.

* * * * *